(12) United States Patent
Katsumata et al.

(10) Patent No.: US 10,945,000 B2
(45) Date of Patent: Mar. 9, 2021

(54) FILE GENERATION APPARATUS AND FILE GENERATION METHOD AS WELL AS REPRODUCTION APPARATUS AND REPRODUCTION METHOD

(71) Applicant: SONY CORPORATION, Tokyo (JP)

(72) Inventors: Mitsuru Katsumata, Tokyo (JP); Mitsuhiro Hirabayashi, Tokyo (JP); Toshiya Hamada, Saitama (JP)

(73) Assignee: SONY CORPORATION, Tokyo (JP)

( * ) Notice: Subject to any disclaimer, the term of this patent is extended or adjusted under 35 U.S.C. 154(b) by 268 days.

(21) Appl. No.: 16/067,505

(22) PCT Filed: Feb. 8, 2017

(86) PCT No.: PCT/JP2017/004532
§ 371 (c)(1),
(2) Date: Jun. 29, 2018

(87) PCT Pub. No.: WO2017/145757
PCT Pub. Date: Aug. 31, 2017

(65) Prior Publication Data
US 2019/0028744 A1 Jan. 24, 2019

(30) Foreign Application Priority Data

Feb. 22, 2016 (JP) .............................. JP2016-030860

(51) Int. Cl.
*H04N 21/234* (2011.01)
*H04L 29/06* (2006.01)
(Continued)

(52) U.S. Cl.
CPC ....... *H04N 21/23412* (2013.01); *G06T 15/04* (2013.01); *H04L 65/607* (2013.01);
(Continued)

(58) Field of Classification Search
CPC ............ H04N 21/23412; H04N 21/643; G06T 15/04; H04L 65/607
(Continued)

(56) References Cited

U.S. PATENT DOCUMENTS

2013/0162773 A1* 6/2013 Tian ....................... H04N 19/70
348/43
2013/0235152 A1 9/2013 Hannuksela et al.

FOREIGN PATENT DOCUMENTS

CN 103907347 A 7/2014
CN 105230024 A 1/2016
WO WO 2015/010056 A1 1/2015

OTHER PUBLICATIONS

Oct. 23, 2018, European Search Report issued for related EP Application No. 17756198.2.
(Continued)

*Primary Examiner* — Hee-Yong Kim
(74) *Attorney, Agent, or Firm* — Paratus Law Group, PLLC

(57) ABSTRACT

There is provided a file generation apparatus and a file generation method as well as a reproduction apparatus and a reproduction method by which a file in which quality information of a depth-related image at least including a depth image is efficiently stored can be managed. An MPD file generation unit generates an MPD file. The MPD file is a management file that manages a file in which quality information representative of quality of a plurality of depth-related images including at least a depth image is disposed in a form divided in a plurality of tracks or subsamples and the management file in which a correspondence relationship between the respective tracks and associationID that specifies the depth-related images is described. The present disclosure can be applied when a segment file and an MPD (Continued)

file of a video content are distributed, for example, in a method that complies with MPEG-DASH.

17 Claims, 40 Drawing Sheets

(51) Int. Cl.
    *H04N 21/643*   (2011.01)
    *G06T 15/04*   (2011.01)
    *H04N 5/91*   (2006.01)
    *H04N 5/76*   (2006.01)
    *H04N 13/00*   (2018.01)
    *H04N 13/20*   (2018.01)
    *H04N 21/845*   (2011.01)
    *H04N 21/4402*   (2011.01)
    *H04N 21/854*   (2011.01)
    *H04N 21/81*   (2011.01)
    *H04N 21/262*   (2011.01)
    *H04N 21/218*   (2011.01)

(52) U.S. Cl.
    CPC .................. *H04N 5/76* (2013.01); *H04N 5/91* (2013.01); *H04N 13/00* (2013.01); *H04N 13/20* (2018.05); *H04N 21/21805* (2013.01); *H04N 21/26258* (2013.01); *H04N 21/44029* (2013.01); *H04N 21/643* (2013.01); *H04N 21/816* (2013.01); *H04N 21/8456* (2013.01); *H04N 21/85406* (2013.01)

(58) Field of Classification Search
    USPC .......................................................... 348/46
    See application file for complete search history.

(56) References Cited

OTHER PUBLICATIONS

Thang et al., Improved Relations for Advanced Media Components, International Organisation for Standardisation ISO/IEC JTC1/SC29/WG11 MPEG2013/M30274, Coding of Moving Pictures and Audio, Aug. 2013, pp. 1-5, Vienna, Austria.

* cited by examiner

FIG. 6

```
aligned(8) class QualityMetricsSampleEntry() extends MetadataSampleEntry ('vqme') {
    QualityMetricsConfigurationBox();
} aligned(8) class QualityMetricsConfigurationBox
    extends FullBox('vqmC', version=0, 0) {
    unsigned int(8) field_size_bytes;
    unsigned int(8) metric_count;
    for (i = 1; i <= metric_count ; i++){
        unsigned int(32) metric_code;
    }
}
```

FIG. 7

| field name | semantics |
|---|---|
| field_size_bytes | DATA SIZE PER 1 Quality INCLUDED IN SAMPLE<br>IN CASE WHERE ACTUAL SIZE IS SMALLER THAN field_size_bytes, PADDING IS ADDED |
| metric_count | NUMBER OF KINDS OF Quality |
| metric_code | INFORMATION INDICATIVE OF KIND OF Quality |

FIG. 8

| CONTENTS | metric_code | bytes |
|---|---|---|
| Peak Signal to Noise Ratio (PSNR) | 'psnr' | unsigned 16bit integer |
| SSIM | 'ssim' | unsigned 8-bit integer |
| MS-SSIM | 'msim' | unsigned 8-bit integer |
| VQM (ITU-T Recommendation J.144) | 'j144' | unsigned 8-bit integer |
| PEVQ (ITU-T Recommendation J.247) | 'j247' | unsigned 8-bit integer |
| MOS | 'mops' | unsigned 8-bit integer |
| Frame significance (FSIG) | 'fsig' | unsigned 8-bit integer |
| EFFECTIVE RANGE OF OCCLUSION REGION | 'ocer' | 0x0100 IN CASE WHERE 16bit fixed point 8.8 number ex 1.0 % IS REPRESENTED |
| PSNR OF OCCLUSION REGION ONLY | 'ocpr' | unsigned 16-bit integer |

FIG. 9

| | segment1 | segment2 | segment3 | segment4 | |
|---|---|---|---|---|---|
| texture representation1 (Bitrate=8Mbps) | | | | | |
| texture representation1 (Bitrate=4Mbps) | | | | | |
| depth representation1 (Bitrate=2Mbps) | | | | | |
| depth representation2 (Bitrate=1Mbps) | | | | | |
| occlusion representation (Bitrate=1Mbps) | | | | | |
| quality1(depth) representation | | | | | |
| quality2(occlusion) representation | | | | | |

FIG. 10

```xml
<MPD>
<Period>
<AdaptationSet mime-type="video/mp4">
    <Representation id="vt1" bandwidth="8192000"><BaseURL>texture1.mp4</BaseURL></Representation>
    <Representation id="vt2" bandwidth="4096000"><BaseURL>texture2.mp4</BaseURL></Representation>
</AdaptationSet>

<AdaptationSet mime-type="video/mp4">
    <EssentialProperty schemeIdUri="urn:mpeg:dash:depth:2015"/>
    <Representation id="vd1" bandwidth="2048000" associationId="vt1"><BaseURL>depth1.mp4</BaseURL></Representation>
    <Representation id="vd2" bandwidth="1024000" associationId="vt1 vt2"><BaseURL>depth2.mp4</BaseURL></Representation>
</AdaptationSet>

<AdaptationSet mime-type="video/mp4">
    <EssentialProperty schemeIdUri="urn:mpeg:occlusion:2015"/>
    <Representation id="vo1" bandwidth="1024000" associationId="vd1 vd2"><BaseURL>occlusion1.mp4</BaseURL></Representation>
</AdaptationSet>

<AdaptationSet mime-type="application/mp4" codecs="vqme_psnr">
    <SupplementalProperty schemeIdUri="urn:mpeg:dash:quality:playback:combination:2015" value="vt1"/>
    <SupplementalProperty schemeIdUri="urn:mpeg:dash:quality:playback:combination:2015" value="vt1 vd1"/>
    <SupplementalProperty schemeIdUri="urn:mpeg:dash:quality:playback:combination:2015" value="vt1 vd2"/>
    <SupplementalProperty schemeIdUri="urn:mpeg:dash:quality:playback:combination:2015" value="vt1 vd1 vo1"/>
    <SupplementalProperty schemeIdUri="urn:mpeg:dash:quality:playback:combination:2015" value="vt1 vd2 vo1"/>
    <SupplementalProperty schemeIdUri="urn:mpeg:dash:quality:playback:combination:2015" value="vt2"/>
    <SupplementalProperty schemeIdUri="urn:mpeg:dash:quality:playback:combination:2015" value="vt2 vd2"/>
    <Representation id="vq1" associationId="vd1"><BaseURL>quality1.mp4</BaseURL>
        <SubRepresentation level="1" associationId="vd1"/>
        <SubRepresentation level="2" associationId="vd2"/>
    </Representation>
    <Representation id="vq2" associationId="vo1"><BaseURL>quality2.mp4</BaseURL>
    </Representation>
</AdaptationSet>
</Period>
</MPD>
```

FIG. 18

```
<MPD>
 <Period>
  <AdaptationSet mime-type="video/mp4">
   <Representation id="vt1" bandwidth="6192000"> <BaseURL> texture1.mp4</BaseURL> </Representation>
   <Representation id="vt2" bandwidth="4096000"> <BaseURL> texture2.mp4</BaseURL> </Representation>
  </AdaptationSet>

<AdaptationSet mime-type="video/mp4">
   <EssentialProperty schemeIdUri="urn:mpeg:dash:depth:2015">
   <Representation id="vd1" bandwidth="2048000" associationId="vt1" ><BaseURL> depth1.mp4</BaseURL> </Representation>
   <Representation id="vd2" bandwidth="1024000" associationId="vt2" > <BaseURL> depth2.mp4</BaseURL> </Representation>
  </AdaptationSet>

<AdaptationSet mime-type="video/mp4">
   <EssentialProperty schemeIdUri="urn:mpeg:occlusion:2015">
   <Representation id="vo1" bandwidth="1024000" associationId="vd1 vd2"> <BaseURL> occlusion1.mp4</BaseURL> </Representation>
  </AdaptationSet>

<AdaptationSet mime-type="application/mp4" codecs="vgre.psnr" >
   <SupplementalProperty schemeIdUri="urn:mpeg:dash:quality:playback:combination:2015" value="vt1" >
   <SupplementalProperty schemeIdUri="urn:mpeg:dash:quality:playback:combination:2015" value="vt1 vd1" >
   <SupplementalProperty schemeIdUri="urn:mpeg:dash:quality:playback:combination:2015" value="vt1 vd2" >
   <SupplementalProperty schemeIdUri="urn:mpeg:dash:quality:playback:combination:2015" value="vt1 vd1 vo1" >
   <SupplementalProperty schemeIdUri="urn:mpeg:dash:quality:playback:combination:2015" value="vt1 vd2 vo1" >
   <SupplementalProperty schemeIdUri="urn:mpeg:dash:quality:playback:combination:2015" value="vt2" >
   <SupplementalProperty schemeIdUri="urn:mpeg:dash:quality:playback:combination:2015" value="vt2 vd2" >
   <Representation id="vq2" associationId="vt1 vt2">
    <BaseURL> quality1.mp4</BaseURL>
    <SubRepresentation level="1" associationId="vt1 vd1" />
    <SubRepresentation level="2" associationId="vt2 vd2" />
   </Representation>
   <Representation id="vq2" associationId="vt1 vt2">
    <BaseURL> quality2.mp4</BaseURL>
    <SubRepresentation level="1" associationId="vt1 vd1" />
    <SubRepresentation level="2" associationId="vt1 vd2" />
    <SubRepresentation level="3" associationId="vt2 vd2" />
   </Representation>
   <Representation id="vq3" associationId="vt1 vd2 vo1">
    <BaseURL> quality3.mp4</BaseURL>
    <SubRepresentation level="1" associationId="vt1 vd1 vo1" />
    <SubRepresentation level="2" associationId="vt1 vd2 vo1" />
   </Representation>
  </AdaptationSet>
 </Period>
</MPD>
```

FIG. 24

```
<MPD>
<Period>
    <AdaptationSet mime-type="video/mp4">
        <Representation id="vt1" bandwidth="8192000"><BaseURL>texture1.mp4</BaseURL></Representation>
        <Representation id="vt2" bandwidth="4096000"><BaseURL>texture2.mp4</BaseURL></Representation>
    </AdaptationSet>

<AdaptationSet mime-type="video/mp4">
        <EssentialProperty schemeIdUri="urn:mpeg:dash:depth:2015"/>
        <Representation id="vd1" bandwidth="2048000" associationId="vt1"><BaseURL>depth1.mp4</BaseURL></Representation>
        <Representation id="vd2" bandwidth="1024000" associationId="vt1 vt2"><BaseURL>depth2.mp4</BaseURL></Representation>
    </AdaptationSet>

<AdaptationSet mime-type="video/mp4">
        <EssentialProperty schemeIdUri="urn:mpeg:occlusion:2015"/>
        <Representation id="vo1" bandwidth="1024000" associationId="vd1 vd2"><BaseURL>occlusion1.mp4</BaseURL></Representation>
    </AdaptationSet>

<AdaptationSet mime-type="application/mp4" codecs="vqme_osnr">
        <SupplementalProperty schemeIdUri="urn:mpeg:dash:quality:playback:combination:2015" value="vt1"/>
        <SupplementalProperty schemeIdUri="urn:mpeg:dash:quality:playback:combination:2015" value="vt1 vd1"/>
        <SupplementalProperty schemeIdUri="urn:mpeg:dash:quality:playback:combination:2015" value="vt1 vd2"/>
        <SupplementalProperty schemeIdUri="urn:mpeg:dash:quality:playback:combination:2015" value="vt1 vd1 vo1"/>
        <SupplementalProperty schemeIdUri="urn:mpeg:dash:quality:playback:combination:2015" value="vt1 vd2 vo1"/>
        <SupplementalProperty schemeIdUri="urn:mpeg:dash:quality:playback:combination:2015" value="vt2"/>
        <SupplementalProperty schemeIdUri="urn:mpeg:dash:quality:playback:combination:2015" value="vt2 vd2"/>
        <Representation id="vq1" associationId="vd1 vd2 vo1">
            <BaseURL>quality1.mp4</BaseURL>
            <SubRepresentation level="1" associationId="vd1"/>
            <SubRepresentation level="2" associationId="vd2"/>
            <SubRepresentation level="3" associationId="vo1"/>
        </Representation>
    </AdaptationSet>
</Period>
</MPD>
```

FIG. 26

| Sample 1 | Sample 2 | ... | Sample n |
|---|---|---|---|
| Depth1 Quality 1 | Depth1 Quality 2 | ... | Depth1 Quality n |
| Depth2 Quality 1 | Depth2 Quality 2 | ... | Depth2 Quality n |

F I G . 2 8

```
aligned(8) class QualityMetricsConfigurationBox extends FullBox('vqmC', version=0, flag) {
    unsigned int(8) field_size_bytes;
    unsigned int(8) metric_count;
    for (i = 1 ; i <= metric_count ; i++) {
        unsigned int(32) metric_code;
        if (flag&0x000001) {
            unsigned int(1) referenced_track_in_file_flag
            unsigned int(7) reserved;
            if (referenced_track_in_file_flag==1) {
                unsigned int(32) reference_track_id_num;
                for (j=0;j< reference_track_id_num; j++) {
                    unsigned int(32) track_id[i][j];
                }
            }
        }
    }
}
```

FIG. 29

```
aligned(8) class QualityMetricsSampleEntry() extends MetadataSampleEntry ('vqme') {
    QualityMetricsConfigurationBox();
    QualityMetricsReferenceBox(); //optional
} aligned(8) class QualityMetricsReferenceBox extends FullBox('qmrf', version, flags) {
    unsigned int(16) metric_count;
    int i,j;
    for (i=0; j < metric_count; i++) {
        unsigned int(1) referenced_track_in_file_flag
        unsigned int(7) reserved;
        if (referenced_track_in_file_flag==1) {
            unsigned int(32) reference_track_id_num;
            for(j=0;j< reference_track_id_num;j++) {
                unsigned int(32) track_id[i][j];
            }
        }
    }
}
```

FIG. 30

```
aligned(8) class SubSampleInformationBox extends FullBox('subs', version, flags) {
    unsigned int(32) entry_count;
    int i,j;
    for (i=0; i < entry_count; i++) {
        unsigned int(32) sample_delta;
        unsigned int(16) subsample_count;
        if (subsample_count > 0) {
            for (j=0; j < subsample_count; j++) {
                if(version >0) {
                    unsigned int(32) subsample_size;
                }
                else{
                    unsigned int(16) subsample_size;
                }
                if(version>1){
                    unsigned int(6) reserved;
                    unsigned int(1) track_reference_is_exist_flag
                    unsigned int(1) referenced_track_in_file_flag
                    if (track_reference_is_exist_flag && referenced_track_in_file_flag){
                        unsigned int(32) reterence_track_id_num;
                        for(k=0;k< reference_track_id_num;k++){
                            unsigned int(32) track_id[j][k];
                        }
                    }
                }
                unsigned int(8) subsample_priority;
                unsigned int(8) discardable;
                unsigned int(32) reserved = 0;
            }
        }
    }
}
```

FIG. 31

```
aligned(8) class SubSampleReferenceBox extends FullBox( 'subr' , version, flags) {
    unsigned int(32) entry_count;
    int i,j,k;
    for (i=0; i < entry_count; i++) {
        unsigned int(32) sample_delta;
        unsigned int(16) subsample_count;
        if (subsample_count > 0) {
            for (j=0; j < subsample_count; j++) {
                unsigned int(1) referenced_track_in_file_flag
                unsigned int(7) reserved;
                if (referenced_track_in_file_flag==1) {
                    unsigned int(32) reference_track_id_num;
                    for(k=0;k< reference_track_id_num;k++) {
                        unsigned int(32) track_id[j][k];
                    }
                }
            }
        }
    }
}
```

FIG. 32

```
<MPD>
 <Period>
  <AdaptationSet mime-type=" video/mp4">
   <Representation id="vt1" bandwidth="8192000"> <BaseURL> texture1.mp4</BaseURL></Representation>
   <Representation id="vt2" bandwidth="4096000"> <BaseURL> texture1.mp4</BaseURL></Representation>
  </AdaptationSet>

<AdaptationSet mime-type=" video/mp4">
   <EssentialProperty schemeIdUri="urn:mpeg:dash:depth:2015" >
   <Representation id="vd1" associationId="vt1 vt2">
    <BaseURL> depth1.mp4</BaseURL>
    <SubRepresentation level="1" associationId="vt1" />
    <SubRepresentation level="2" associationId="vt1 vt2" />
   </Representation>
  </AdaptationSet>

<AdaptationSet mime-type=" video/mp4">
   <EssentialProperty schemeIdUri="urn:mpeg:occlusion:2015" >
   <Representation id="vo1" associationId="vd1"><BaseURL> occlusion1.mp4</BaseURL></Representation>
  </AdaptationSet>
 </Period>
</MPD>
```

FIG. 34

```
aligned(8) class LevelAssignmentBox extends FullBox( 'leva' , 0, 0){
 unsigned int(8) level_count;
 for (j=1; j <= level_count; j++) {
  unsigned int(32) track_id;
  unsigned int(1) padding_flag;
  unsigned int(7) assignment_type;
  if (assignment_type == 0) {
   unsigned int(32) grouping_type;
  }
  else if (assignment_type == 1) {
   unsigned int(32) grouping_type;
   unsigned int(32) grouping_type_parameter;
  }
  else if (assignment_type == 2) {} // no further syntax elements needed
  else if (assignment_type == 3) {} // no further syntax elements needed
  else if (assignment_type == 4) {
   unsigned int(32) sub_track_id;
  }
  else if (assignment_type == 5) {} // no further syntax elements needed
  // other assignment_type values are reserved
 }
}
```

FIG. 36

```
aligned(8) class LevelAssignmentBox extends FullBox('leva', 0, 0) {
    unsigned int(8) level_count;
    for (j=1; j <= level_count; j++) {
        unsigned int(32) track_id;
        unsigned int(1) padding_flag;
        unsigned int(7) assignment_type;
        if (assignment_type == 0) {
            unsigned int(32) grouping_type;
        }
        else if (assignment_type == 1) {
            unsigned int(32) grouping_type;
            unsigned int(32) grouping_type_parameter;
        }
        else if (assignment_type == 2) {} // no further syntax elements needed
        else if (assignment_type == 3) {} // no further syntax elements needed
        else if (assignment_type == 4) {
            unsigned int(32) sub_track_id;
        }
        else if (assignment_type == 5) {
            bit(24) subsample_flag;
        }
        // other assignment_type values are reserved
    }
}
```

FIG. 38

```
class Sub-sampleGroupEntry() extends SampleGroupDescriptionEntry('sgss')
{
    unsign int(32) codec_parameter;
    bit(24) sub_sample_flags;
    bit(8) reserved=0;
}
```

FILE GENERATION APPARATUS AND FILE GENERATION METHOD AS WELL AS REPRODUCTION APPARATUS AND REPRODUCTION METHOD

CROSS REFERENCE TO PRIOR APPLICATION

This application is a National Stage Patent Application of PCT International Patent Application No. PCT/JP2017/004532 (filed on Feb. 8, 2017) under 35 U.S.C. § 371, which claims priority to Japanese Patent Application No. 2016-030860 (filed on Feb. 22, 2016), which are all hereby incorporated by reference in their entirety.

TECHNICAL FIELD

The present disclosure relates to a file generation apparatus and a file generation method as well as a reproduction apparatus and a reproduction method, and particularly to a file generation apparatus and a file generation method as well as a reproduction apparatus and a reproduction method by which a file for efficiently storing quality information of a depth-related image at least including a depth image can be managed.

BACKGROUND ART

As a technique for implementing stereoscopic vision, a technology that uses a texture image and a depth image is available. The depth image is an image in which a value for representing a position of each pixel in a depthwise direction of an image pickup object is a pixel value.

In such a technology as just described, there is a case in which, in order to implement natural stereoscopic vision, an occlusion image is used as additional information. The occlusion image is a texture image in an occlusion region that is a region of an image pickup object that does not exist in the texture image, namely, of an image pickup object that is invisible from a view point of the texture image (for example, an image pickup object hidden by a nearer image pickup object). By using not only a texture image and a depth image but also an occlusion image, a 3D image that implements stereoscopic vision in the case where peeping in from points of view different from each other or the like is performed can be generated.

The texture image and the depth image can be transmitted, for example, by an existing MPEG-DASH (Moving Picture Experts Group Dynamic Adaptive Streaming over HTTP standard) method (for example, refer to NPL 1).

In this case, a DASH client selects and acquires a depth image having a maximum acceptable bit rate from depth images of a plurality of bit rates stored in a DASH server taking a transmission path and a buffer amount of the DASH client itself into consideration.

However, in the case where the influence of the bit rate of a depth image on the picture quality of a 3D image is less, in the case where the variation amount of a pixel value of a depth image is small or in a like case, the picture quality of a 3D image is not varied very much by the bit rate of a depth image. Accordingly, in this case, if a DASH client selects and acquires a depth image having a maximum acceptable bit rate, then a transmission path and a buffer become useless.

On the other hand, ISO/IEC 23001-10 proposes to store quality information representative of one or more kinds of quality of a texture image into an MP4 file of the ISO base media file format.

CITATION LIST

Non Patent Literature

[NPL 1]
ISO/IEC 23009-1 Dynamic adaptive streaming over HTTP (DASH) Part 1: Media presentation description and segment formats, April 2012

SUMMARY

Technical Problem

As described above, also in regard to a depth-related image at least including a depth image, it is demanded that quality information is stored into a file similarly to a texture image such that a DASH client acquires a depth-related image having an appropriate bit rate using the quality information. However, it is not considered to manage a file which stores quality information of a depth-related image efficiently.

The present disclosure has been made in view of such a situation as described above and makes it possible to generate a file into which quality information of a depth-related image at least including a depth image is stored efficiently.

Solution to Problem

A file generation apparatus of a first aspect of the present disclosure is a file generation apparatus including a file generation unit configured to generate a management file that manages a file in which quality information representative of quality of a plurality of depth-related images including at least a depth image is disposed in a form divided in a plurality of tracks or subsamples and the management file in which a correspondence relationship between the respective tracks or subsamples and depth-related image specification information for specifying the depth-related images is described.

A file generation method of the first aspect of the present disclosure corresponds to the file generation apparatus of the first aspect of the present disclosure.

In the first aspect of the present disclosure, a management file that manages a file in which quality information representative of quality of a plurality of depth-related images including at least a depth image is disposed in a form divided in a plurality of tracks or subsamples and the management file in which a correspondence relationship between the respective tracks or subsamples and depth-related image specification information for specifying the depth-related images is described is generated.

A reproduction apparatus of a second aspect of the present disclosure is a reproduction apparatus including an acquisition unit configured to acquire, on a basis of a management file that manages a file in which quality information representative of quality of a plurality of depth-related images including at least a depth image is disposed in a form divided in a plurality of tracks or subsamples and the management file in which a correspondence relationship between the respective tracks or subsamples and depth-related image specification information for specifying the depth-related images is described, the quality information of at least part of the plurality of depth-related images.

A reproduction method of the second aspect of the present disclosure corresponds to the reproduction apparatus of the second aspect of the present disclosure.

In the second aspect of the present disclosure, on a basis of a management file that manages a file in which quality information representative of quality of a plurality of depth-related images including at least a depth image is disposed in a form divided in a plurality of tracks or subsamples and the management file in which a correspondence relationship between the respective tracks or subsamples and depth-related image specification information for specifying the depth-related images is described, the quality information of at least part of the plurality of depth-related images is acquired.

It is to be noted that the file generation apparatus of the first aspect and the reproduction apparatus of the second aspect of the present disclosure can be implemented by causing a computer to execute a program.

Further, in order to implement the file generation apparatus of the first aspect and the reproduction apparatus of the second aspect of the present disclosure, the program for being executed by the computer can be provided by transmitting the program through a transmission medium or by recording the program on a recording medium.

Advantageous Effects of Invention

With the first aspect of the present disclosure, a file can be generated. Further, with the first aspect of the present disclosure, a file into which quality information of a depth-related image at least including a depth image is stored efficiently can be managed.

With the second aspect of the present disclosure, a reproduction can be performed. Further, with the second aspect of the present disclosure, a reproduction can be performed on the basis of a management file that manages a file in which quality information of a depth-related image at least including a depth image is stored efficiently.

It is to be noted that the effects described here are not necessarily restrictive and the effects may be any one of the effects described in the present disclosure.

BRIEF DESCRIPTION OF DRAWINGS

FIG. 6 is a view depicting an example of a description of QualityMetricsSampleEntry in the first embodiment.

FIG. 7 is a view illustrating description contents of QualityMetricsSampleEntry of FIG. 6.

FIG. 8 is a view depicting an example of metric_code.

FIG. 9 is a view depicting an example of a representation element of the MPD file in the first embodiment.

FIG. 10 is a view depicting an example of description of the MPD file in the first embodiment.

FIG. 18 is a view depicting an example of description of an MPD file in the third embodiment.

FIG. 24 is a view depicting an example of a description of an MPD file in the sixth embodiment.

FIG. 26 is a view depicting an example of a configuration of a sample of a track of FIG. 25.

FIG. 28 is a view depicting an example of a description of QualityMetricsConfigurationBox.

FIG. 29 is a view depicting an example of a description of QualityMetricsSampleEntry in description in QualityMetricsSampleEntry in the seventh embodiment.

FIG. 30 is a view depicting an example of a description of SubsampleInformationBox.

FIG. 31 is a view depicting an example of a description of SubsampleReferenceBox.

FIG. 32 is a view depicting an example of a description of an MPD file in the seventh embodiment.

FIG. 34 is a view depicting a first example of a description of a leva box.

FIG. 36 is a view depicting a second example of a description of the leva box.

FIG. 38 is a view depicting an example of a description of a subsample group entry.

DESCRIPTION OF EMBODIMENTS

In the following, modes for carrying out the present disclosure (hereinafter referred to as embodiments) are described. It is to be noted that the description is given in accordance with the following order.

1. First Embodiment: Information Processing System (FIGS. 1 to 15)
2. Second Embodiment: Information Processing System (FIG. 16)
3. Third Embodiment: Information Processing System (FIGS. 17 to 20)
4. Fourth Embodiment: Information Processing System (FIG. 21)
5. Fifth Embodiment: Information Processing System (FIG. 22)
6. Sixth Embodiment: Information Processing System (FIGS. 23 and 24)
7. Seventh Embodiment: Information Processing System (FIGS. 25 to 32)
8. Eighth Embodiment: Information Processing System (FIGS. 33 and 39)
9. Ninth Embodiment: Computer (FIG. 40)

First Embodiment (Overview of Information Processing System)

Figure 1:
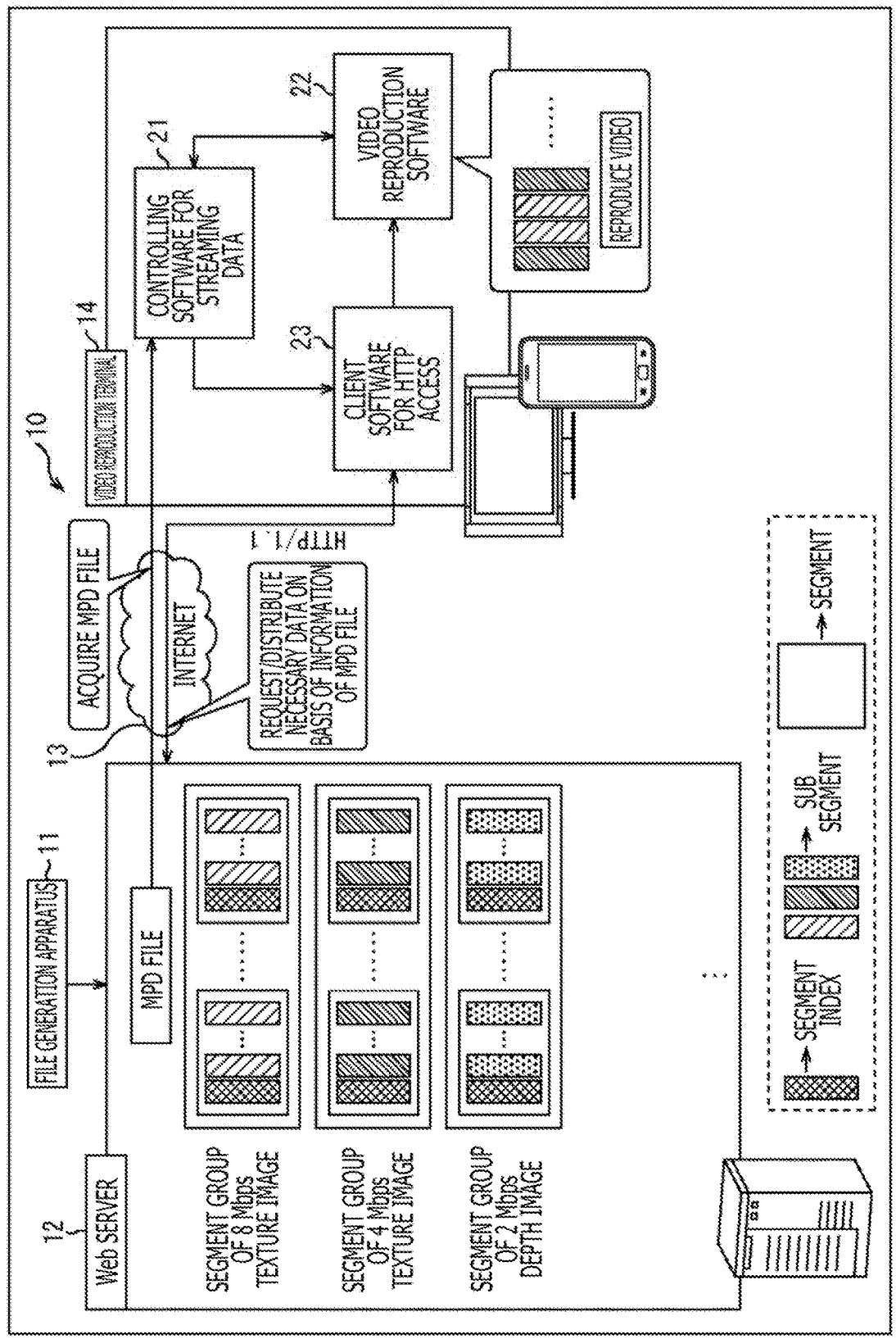
FIG. 1 is a view illustrating an overview of an information processing system according to a first embodiment to which the present disclosure is applied.

FIG. 1 is a view illustrating an overview of an information processing system according to a first embodiment to which the present disclosure is applied.

An information processing system 10 of FIG. 1 is configured by connecting a Web server 12 as a DASH server connected to a file generation apparatus 11 and a video reproduction terminal 14 as a DASH client through the Internet 13.

In the information processing system 10, the Web server 12 distributes a file of a video content generated by the file generation apparatus 11 to the video reproduction terminal 14 by a method that complies with MPEG-DASH.

In particular, the file generation apparatus 11 encodes image data and sound data of a texture image, a depth image, and an occlusion image of a video content, metadata including quality information of the depth image and the occlusion image and so forth with one or more bit rates.

It is assumed that, in the present specification, two bit rates of 8 Mbps and 4 Mbps are available for the texture image; two bit rates of 2 Mbps and 1 Mbps are available for the depth image; and one bit rate of 1 Mbps is available for the occlusion image. Further, in the following description, in the case where the depth image and the occlusion image need not be distinguished from each other specifically, the images are referred to as depth occlusion images.

The file generation apparatus 11 files an encoded stream of image data and sound data of the respective bit rates generated as a result of encoding in a unit of time of several seconds to approximately ten seconds called segment in an ISO base media file format. The file generation apparatus 11 uploads a segment file that is an MP4 file of image data and sound data generated as a result of the process described above to the Web server 12.

Further, the file generation apparatus 11 divides an encoded stream of metadata including quality information of a depth occlusion image in a unit of a segment for each kind of depth occlusion images and files the divisions of the encoded stream in the ISO base media file format. The file generation apparatus 11 uploads the segment files of the metadata generated as a result of the process just described to the Web server 12.

Further, the file generation apparatus 11 generates an MPD (Media Presentation Description) file (management file) for managing a segment file group of a video content. The file generation apparatus 11 uploads the MPD file to the Web server 12.

The Web server 12 stores the segment files and the MPD files uploaded from the file generation apparatus 11 therein. The Web server 12 transmits a stored segment file or MPD file to the video reproduction terminal 14 in response to a request from the video reproduction terminal 14.

The video reproduction terminal 14 (reproduction apparatus) executes controlling software for streaming data (hereinafter referred to as controlling software) 21, video reproduction software 22, client software for HTTP (Hypertext Transfer Protocol) access (hereinafter referred to as access software) 23 and so forth.

The controlling software 21 is software for controlling data to be streamed from the Web server 12. In particular, the controlling software 21 causes the video reproduction terminal 14 to acquire an MPD file from the Web server 12.

Further, the controlling software 21 issues a transmission request for an encoded stream of a segment file of a reproduction target to the access software 23 on the basis of time of a reproduction target designated by the video reproduction software 22 and reproduction target information representative of a bit rate or the like.

The video reproduction software 22 is software for reproducing an encoded stream acquired from the Web server 12. In particular, the video reproduction software 22 designates reproduction target information in which an encoded stream of metadata is a reproduction target to the controlling software 21. Then, when a notification of reception starting of the encoded stream of metadata is received from the access software 23, the video reproduction software 22 decodes the encoded stream of metadata received by the video reproduction terminal 14.

The video reproduction software 22 designates reproduction target information in which an encoded stream of image data or sound data of a predetermined bit rate is a reproduction target to the controlling software 21 on the basis of quality information included in metadata obtained as a result of the decoding, a network bandwidth of the Internet 13 or the like. Then, when a notification of reception starting of the encoded stream of image data or sound data is received from the access software 23, the video reproduction software 22 decodes the encoded stream of image data or sound data received by the video reproduction terminal 14.

The video reproduction software 22 outputs the image data of a texture image obtained as a result of the decoding as it is. Further, the video reproduction software 22 generates and outputs image data of a 3D image using the texture image and the depth image. Further, the video reproduction software 22 generates and outputs image data of a 3D image using the texture image, the depth image, and the occlusion image. Further, the video reproduction software 22 outputs sound data obtained as a result of the decoding.

The access software 23 is software for controlling communication with the Web server 12 through the Internet 13 using HTTP. In particular, in response to an instruction of the controlling software 21, the access software 23 causes the video reproduction terminal 14 to transmit a transmission request for an encoded stream of a segment file of a reproduction target. Further, the access software 23 causes the video reproduction terminal 14 to start reception of an encoded stream transmitted from the Web server 12 in response to the transmission request, and supplies a notification of reception starting to the video reproduction software 22.

It is to be noted that, since the present disclosure is an invention relating to image data and metadata of a video content, in the following, description of storage and reproduction of a segment file of sound data is omitted.

(Description of Occlusion Image)

Figure 2:
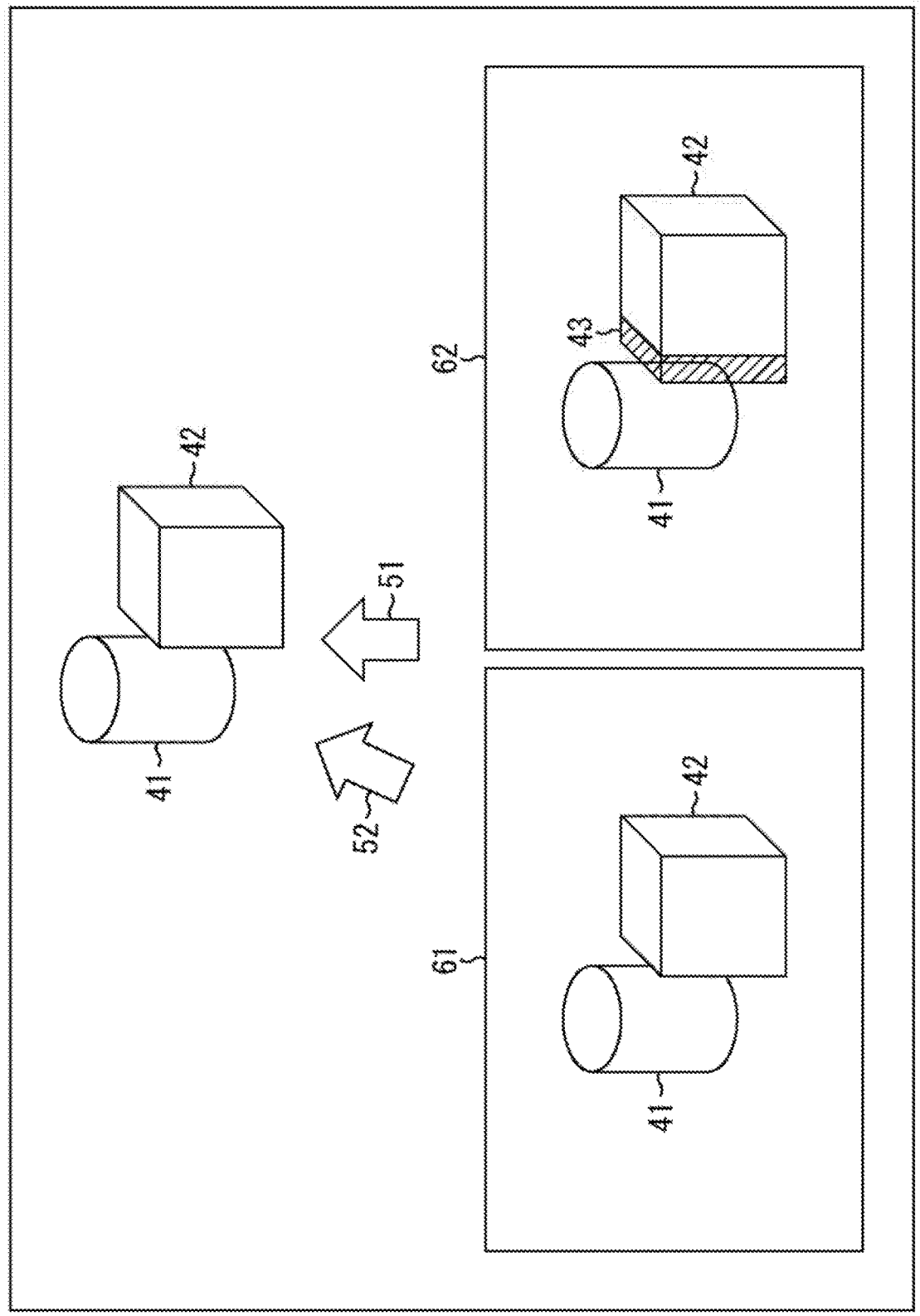
FIG. 2 is a view illustrating an occlusion image.

FIG. 2 is a view illustrating an occlusion image.

If an image of a circular cylinder 41 and a cube 42 on the upper stage of FIG. 2 is picked up from a front direction indicated by an arrow mark 51, then a texture image 61 on the left side on the lower stage of FIG. 2 is obtained.

In the case where a texture image 62 picked up from a direction looking in from the left indicated by an arrow mark 52 is to be generated using the texture image 61 and a depth image of the texture image 61, pixel values of the texture image 61 corresponding to pixels of the texture image 62 are acquired on the basis of the depth image of the texture image 61. Then, the texture image 62 is generated by determining the pixel values of the pixels of the texture image 62 as the pixel values of the texture image 61 corresponding to the pixels.

However, as indicated on the right side on the lower stage of FIG. 2, a corresponding texture image 61 does not exist in the texture image 62. In particular, an occlusion region 43 is generated which is a region of an image pickup object (in the example of FIG. 2, a side face of the cube 42) that is not picked up upon image pickup from a direction indicated by an arrow mark 51 but is picked up upon image pickup from a direction indicated by an arrow mark 52. A texture image of the occlusion region 43 is an occlusion image.

Accordingly, the texture image 62 from a viewpoint different from that of the texture image 61 can be generated by using the texture image 61, depth image of the texture image 61, and texture image of the occlusion region 43. Further, a depth image of the texture image 62 can be generated from the texture image 62 and the depth image of the texture image 61. Therefore, a 3D image from a viewpoint different from that of the texture image 61 can be generated from the texture image 62 and the depth image of the texture image 62.

(Description of MPD File)

Figure 3:
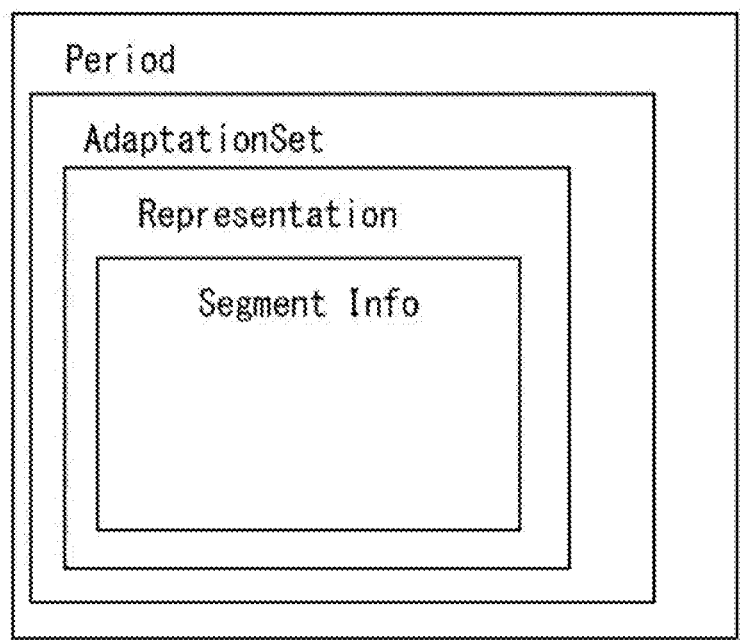
FIG. 3 is a view illustrating a hierarchical structure of an MPD file.

FIG. 3 is a view illustrating a hierarchical structure of an MPD file.

In the MPD file, information of an encoding method and a bit rate of a video content, a size of an image, a language of speech and so forth is described in a hierarchical relationship in the XML format.

In particular, as depicted in FIG. 3, elements such as a period (Period), an adaptation set (AdaptationSet), a representation (Representation), segment information (SegmentInfo) and so forth are included hierarchically in the MPD file.

In the MPD file, a video content managed by the MPD file itself is divided by a predetermined time range (for example, a unit such as a program, a CM (Commercial Message) or the like). The period element is described for each of the divisions of the divided video content. The period element has information of reproduction starting time of a program of the video content (data of a set of image data or sound data synchronized with each other or the like), a URL (Uniform Resource Locator) of the Web server 12 into which a segment file of the video content is to be stored and so forth.

The adaptation set element is included in the period element and groups a representation element corresponding to a segment file group of the same encoded stream of the video content corresponding to the period element. The representation element is grouped, for example, by a kind of data of the corresponding encoded stream. The adaptation set element has a use as a media type, a language, a subtitle, a dubbing and so forth common to the group.

The representation element is included in the adaptation set element for grouping the representation element and is described for each segment file group of the same encoded stream of the video content corresponding to the period element in the upper hierarchy. The representation element has a bit rate, a size of an image and so forth common to the segment file group.

The segment information element is included in the representation element and has information relating to respective segment files of the segment file group corresponding to the representation.

(Example of Configuration of File Generation Apparatus)

Figure 4:
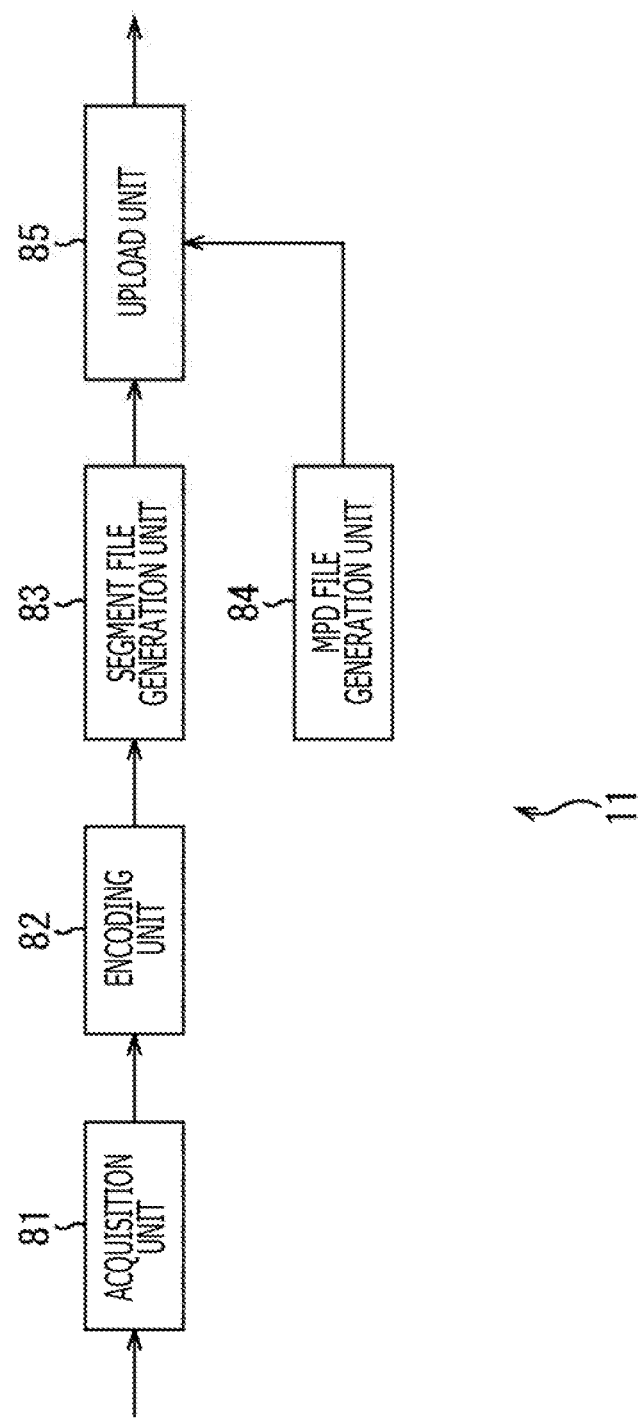
FIG. 4 is a block diagram depicting an example of a configuration of a file generation apparatus of FIG. 1.

FIG. 4 is a block diagram depicting an example of a configuration of the file generation apparatus of FIG. 1.

The file generation apparatus 11 of FIG. 4 is configured from an acquisition unit 81, an encoding unit 82, a segment file generation unit 83, an MPD file generation unit 84, and an upload unit 85.

The acquisition unit 81 of the file generation apparatus 11 acquires and supplies image data of a texture image, a depth image, and an occlusion image of a video content to the encoding unit 82. Further, the acquisition unit 81 acquires and supplies metadata including quality information of encoded streams of depth images of 2 Mbps and 1 Mbps and an occlusion image of 1 Mbps to the encoding unit 82.

The encoding unit 82 encodes the image data of the texture image supplied from the acquisition unit 81 in 8 Mbps and 4 Mbps and encodes the image data of the depth image in 2 Mbps and 1 Mbps. Further, the encoding unit 82 encodes the image data of the occlusion image in 1 Mbps. Furthermore, the encoding unit 82 encodes metadata of the depth images of 2 Mbps and 1 Mbps and the occlusion image of 1 Mbps individually at predetermined bit rates. The encoding unit 82 supplies the encoded streams generated as a result of the encoding to the segment file generation unit 83.

The segment file generation unit 83 files encoded streams of the texture images, depth images, and occlusion image supplied from the encoding unit 82 in a unit of a segment for each bit rate to generate a segment file of image data.

Further, the segment file generation unit 83 (file generation unit) divides the encoded stream of metadata supplied from the encoding unit 82 into two for each kind of depth occlusion image. Then, the segment file generation unit 83 disposes the divisions of the encoded stream of metadata into a different segment file in a unit of a segment to generate a segment file of metadata.

In particular, the segment file generation unit 83 divides the encoded stream of metadata supplied from the encoding unit 82 into an encoded stream of metadata in a unit of a segment of the depth images of 2 Mbps and 1 Mbps and another encoded stream of metadata in a unit of a segment of the occlusion image of 1 Mbps. Then, the segment file generation unit 83 individually files the encoded stream of metadata of a unit of a segment of the depth images of 2 Mbps and 1 Mbps and the encoded stream of metadata of a unit of a segment of the occlusion image of 1 Mbps to generate a segment file of metadata. The segment file generation unit 83 supplies the generated segment file to the upload unit 85.

The MPD file generation unit 84 (file generation unit) generates and supplies an MPD file to the upload unit 85.

The upload unit 85 uploads the segment file supplied from the segment file generation unit 83 and the MPD file supplied from the MPD file generation unit 84 to the Web server 12.

(Example of Segment File)

Figure 5:
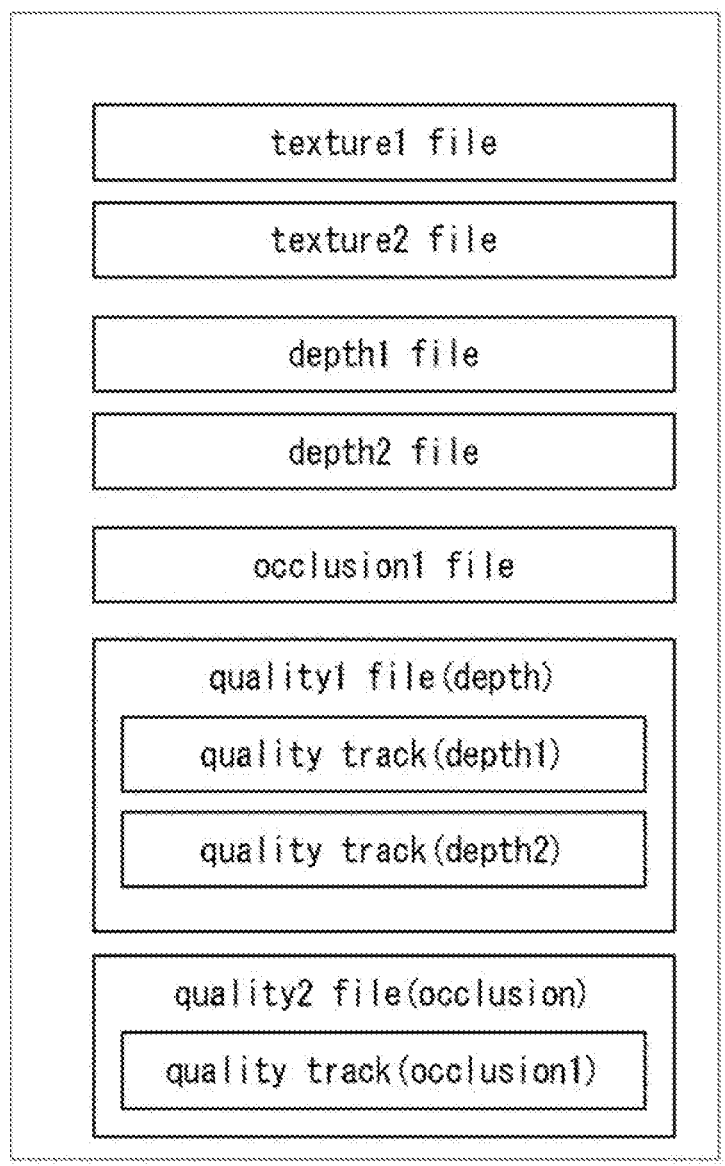
FIG. 5 is a view depicting an example of a segment file in the first embodiment.

FIG. 5 is a view depicting an example of a segment file generated by the segment file generation unit 83 of FIG. 4.

As depicted in FIG. 5, the segment file generation unit 83 generates a segment file of a texture image of 8 Mbps as a texture file (texture1 file) and generates a segment file of a texture image of 4 Mbps as another texture file (texture2 file). Further, the segment file generation unit 83 generates a segment file of a depth image of 2 Mbps as a depth file (depth1 file) and generates a segment file of a depth image of 1 Mbps as a depth file (depth2 file). Further, the segment file generation unit 83 generates a segment file of an occlusion image of 1 Mbps as an occlusion file (occlusion1 file).

Further, the segment file generation unit 83 generates a segment file of metadata including quality information of the depth images of 2 Mbps and 1 Mbps as a quality file (quality1 file). In the quality file (quality1 file), metadata including quality information of the depth image of 2 Mbps and metadata including quality information of the depth image of 1 Mbps are disposed in tracks different from each other (quality track(depth1) and quality track(depth2)).

Furthermore, the segment file generation unit 83 generates a segment file of metadata including quality information of the occlusion image of 1 Mbps as a quality file (quality2 file).

As described above, the segment file generation unit 83 files the encoded stream of metadata including quality information separately for different kinds of depth occlusion images. Accordingly, in the case where the video reproduction terminal 14 generates a 3D image using the texture images and the depth images, desired quality information of the depth images can be acquired readily from the quality file (quality1 file) of the depth image.

In contrast, in the case where encoded streams of quality information of all depth occlusion images are filed collectively, quality information of desired depth images is acquired from a file that includes also quality information of unnecessary occlusion images, and the acquisition efficiency is low.

Further, in the case where encoded streams of quality information of all depth occlusion images are filed separately for each encoded stream, when a plurality of demanded depth occlusion images are acquired, it is necessary to acquire quality information from a plurality of files, and the acquisition efficiency is low.

It is to be noted that, while the acquisition unit 81 does not acquire metadata including quality information of texture images of 8 Mbps and 4 Mbps, otherwise the metadata may be acquired. In this case, the segment file generation unit 83 generates also a segment file in which encoded streams of metadata including quality information of the texture images of 8 Mbps and 4 Mbps are stored collectively in a unit of a segment. Further, metadata of the texture image of 8 Mbps and metadata of the texture image of 4 Mbps are disposed in tracks different from each other.

(Example of Description of QualityMetricsSampleEntry)

FIG. 6 is a view depicting an example of a description of QualityMetricsSampleEntry disposed in a quality file.

As depicted in FIG. 6, in QualityMetricsSampleEntry, QualityMetricsConfigurationBox is disposed. In the QualityMetricsConfigurationBox, field_size_bytes and metric_count are described and the number of metric_count equal to metric_code are described.

As depicted in FIG. 7, field_size_bytes indicates a data size per one kind of quality (Quality) of an encoded stream of quality information included in a sample of a quality file. In the case where the actual size of an encoded stream of a certain kind of quality information is smaller than field_size_bytes, padding is added to the encoded stream of the quality information.

Further, metric_count indicates the number of kinds of quality corresponding to the encoded stream of quality information included in a sample of the quality file. metric_code is information representative of each kind of quality corresponding to the encoded stream of quality information included in a sample of the quality file and is described in order of the encoded stream of quality information disposed in the sample.

(Example of Metric_Code)

FIG. 8 is a view depicting an example of metric_code.

As depicted in FIG. 8, as metric_code, not only psnr, ssim, msim, j144, j247, mops, and fsig defined in ISO/IEC 23001-10 but also ocer and ocpr can be set.

For example, psnr represents that the kind of quality represented by the quality information is PSNR (Peak signal-to-noise ratio) of the entire screen.

Further, ocer and ocpr are set when quality information of an occlusion image is included in the sample. ocer represents that the kind of quality represented by quality information indicates an occlusion region corresponding to the occlusion image with respect to the entire screen of the texture image, namely, a ratio of an effective range of the occlusion region. ocpr represents that the kind of quality represented by the quality information is PSNR only of an occlusion image, namely, PSNR only of an effective range of the occlusion region.

As described above, in the case where quality information of the occlusion image is included in the sample, ocer or ocpr can be set as metric_code. Accordingly, the ratio of the occlusion region and quality information representative of the PSNR can be stored in the sample. Therefore, the video reproduction terminal 14 can select and reproduce an optimum occlusion file on the basis of the quality information.

In particular, since the occlusion image is an image only of an occlusion region within the screen, there is the possibility that the influence on existing quality such as PSNR of the entire screen may be less. Accordingly, quality of an occlusion image cannot be represented sufficiently by existing quality information. Therefore, by making it possible to store quality information representing, as quality, a ratio or a PSNR of the occlusion region having a great influence on quality of the occlusion image into the sample, it is made possible for the video reproduction terminal 14 to select a more suitable occlusion file on the basis of quality information.

(Example of Representation Element)

FIG. 9 is a view depicting an example of a representation element of an MPD file generated by the MPD file generation unit 84 of FIG. 4.

As depicted in FIG. 5, the segment file generation unit 83 generates seven kinds of segment files including a texture file (texture1 file), another texture file (texture2 file), a depth file (depth1 file), another depth file (depth2 file), an occlusion file (occlusion1 file), a quality file (quality1 file(depth)), and another quality file (quality2 file (occlusion)). Accordingly, as depicted in FIG. 9, seven representation elements are included in the MPD file.

(Example of Description of MPD File)

FIG. 10 is a view depicting an example of a description of an MPD file generated by the MPD file generation unit 84 of FIG. 4.

It is to be noted that, in the present specification, it is assumed that the picture quality of a 3D image is not improved even if the depth file (depth1 file) or the occlusion file (occlusion file) is used upon reproduction of the texture file (texture2 file). Accordingly, reproduction of a 3D image for which the texture file (texture2 file) and the depth file (depth1 file) or the occlusion file (occlusion file) are used is not to be performed. Therefore, reproduction patterns 1 to 7 described below are patterns to be reproduced.

Reproduction pattern 1. Reproduction of a texture image of the texture file (texture1 file)

Reproduction pattern 2. Reproduction of a texture image of the texture file (texture2 file)

Reproduction pattern 3. Reproduction of a 3D image for which the texture file (texture1 file) and the depth file (depth1 file) are used Reproduction pattern 4. Reproduction of a 3D image for which the texture file (texture1 file) and the depth file (depth2 file) are used Reproduction pattern 5. Reproduction of a 3D image for which the texture file (texture1 file), depth file (depth1 file), and occlusion file (occlusion file) are used Reproduction pattern 6. Reproduction of a 3D image for which the texture file (texture1 file), depth file (depth2 file), and occlusion file (occlusion file) are used Reproduction pattern 7. Reproduction of a 3D image for which the texture file (texture2 file) and the depth file (depth2 file) are used In the MPD file of FIG. 10, a texture file (texture1 file) group and another texture file (texture2 file) group are grouped by one adaptation set (Adaptation Set).

In the adaptation set element for the texture file, a representation element corresponding to the texture file (texture1 file) group and another representation element corresponding to the texture file (texture2 file) group are described.

The representation element includes Representation id, bandwidth, BaseURL, associationID and so forth. Representation id is an ID unique to the representation element and is information for specifying an encoded stream corresponding to the representation element. bandwidth is information representing a bit rate of the texture file group, and BaseURL is information representing a base of a file name. Further, associationID is Representation id of some other representation element relating to decoding or displaying (reproduction). This associationID is prescribed by ISO/IEC 23009-1 Amendment2.

Accordingly, in the representation element corresponding to the texture file (texture1 file) group, vt1 is described as Representation id, 8192000 representing 8 Mbps as bandwidth, and "texture1.mp4" as BaseURL.

In the representation element corresponding to the texture file (texture2 file) group, vt2 is described as Representation id, 4096000 representing 4 Mbps as bandwidth, and "texture2.mp4" as BaseURL.

It is to be noted that, since the representation elements corresponding to the texture file (texture1 file) group and the texture file (texture2 file) group do not relate to the other representation elements, associationID is not described in the representation elements corresponding to the texture file (texture1 file) group and the texture file (texture2 file) group.

Further, the depth file (depth1 file) group and the depth file (depth2 file) group are grouped by one adaptation set element. In the adaptation set element for the depth files, a representation element corresponding to the depth file (depth1 file) group and another representation element corresponding to the depth file (depth2 file) group are described.

In the representation element corresponding to the depth file (depth1 file), vd1 is described as Representation id, 2048000 representing 2 Mbps as bandwidth, and "depth1.mp4" as BaseURL.

Further, in the reproduction patterns 1 to 7, the texture file group that relates to the depth file (depth1 file) is the texture file (texture1 file) group. Accordingly, in the representation element corresponding to the depth file (depth1 file) group, vt1 that is Representation id of the texture file (texture1 file) group is described as associationID.

In the representation element corresponding to the depth file (depth2 file), vd2 is described as Representation id, 1024000 representing 1 Mbps as bandwidth, and "depth2.mp4" as BaseURL.

Further, in the reproduction patterns 1 to 7, a texture file group of a texture image relating to the depth file (depth2 file) upon displaying is the texture file (texture1 file) group or the texture file (texture2 file) group. Accordingly, in the representation element corresponding to the depth file (depth1 file) group, vt1 that is Representation id of the texture file (texture1 file) group and vt2 that is Representation id of the texture file (texture2 file) group are described as associationID.

Further, the occlusion file (occlusion1 file) group is grouped with one adaptation set element. In the adaptation set element for the occlusion file, a representation element corresponding to the occlusion file (occlusion file) group is described.

In the representation element corresponding to the occlusion file (occlusion file) group, vo1 is described as Representation id, 1024000 representing 1 Mbps as bandwidth, and "occlusion.mp4" as BaseURL.

Further, in the reproduction patterns 1 to 7, a depth file group of the depth image relating to the occlusion file (occlusion file) upon displaying is the depth file (depth1 file) group or the depth file (depth2 file) group. Accordingly, in the representation element corresponding to the occlusion file (occlusion file) group, vd1 that is Representation id of the depth file (depth1 file) group and vd2 that is Representation id of the depth file (depth2 file) group are described as associationID.

Further, the quality file (quality1 file) group and the quality file (quality2 file) group are grouped by one adaptation set element.

In the adaptation set element for the quality file, schemeIdUri="urn:mpeg:dash:quality:playback:combination:2015" can be described which is schemeIdUri for representing a combination of images to be reproduced from among the texture image, the depth image, and the occlusion image, namely, a combination of images that are made use candidates upon reproduction, using SupplementalProperty. Representation id of imaged configuring the combination is described as value of schemeIdUri="urn:mpeg:dash:quality:playback:combination:2015."

In particular, as information representative of a texture image to be used for reproduction of the reproduction pattern 1 described above, <SupplementalProperty schemeIdUri="urn:mpeg:dash:quality:playback:combination:2015 value='vt1'"> in which vt1 that is Representation id of the texture file (texture1 file) is described.

Similarly, as information representative of a texture image and a depth image to be used for reproduction of the reproduction pattern 3, <SupplementalProperty schemeIdUri="urn:mpeg:dash:quality:playback:combination:2015 value='vt1 vd1'"> in which vt1 that is Representation id of the texture file (texture1 file) and vd1 that is Representation id of the depth file (depth1 file) is value is described.

As information representing a texture image and a depth image to be used for reproduction of the reproduction pattern 4, <SupplementalProperty schemeIdUri="urn:mpeg:dash:quality:playback:combination:2015 value='vt1 vd2'"> in which vt1 that is Representation id of the texture file (texture1 file) and vd2 that is Representation id of the depth file (depth2 file) are value is described.

As information representative of a texture image, a depth image, and an occlusion image used for reproduction in the reproduction pattern 5, <SupplementalProperty schemeIdUri="urn:mpeg:dash:quality:playback:combination:2015 value='vt1 vd1 vo1'"> in which vt1 that is Representation id of the texture file (texture1 file), vd1 that is Representation id of the depth file (depth1 file), and vo1 that is Representation id of the occlusion file (occlusion file) are value is described.

As information representative of a texture image, a depth image, and an occlusion image used for reproduction in the reproduction pattern 6, <SupplementalProperty schemeIdUri="urn:mpeg:dash:quality:playback:combination:2015 value='vt1 vd2 vo1'"> in which vt1 that is Representation id of the texture file (texture1 file), vd2 that is Representation id of the depth file (depth2 file), and vo1 that is Representation id of the occlusion file (occlusion file) are value is described.

As information representative a texture image used for reproduction in the reproduction pattern 2, <SupplementalProperty schemeIdUri="urn:mpeg:dash:quality:playback:combination:2015"> in which vt2 that is Representation id of the texture file (texture1 file) is value is described.

As information representing a texture image and a depth image used for reproduction in the reproduction pattern 7, <SupplementalProperty schemeIdUri="urn:mpeg:dash:quality:playback:combination:2015"> in which vt2 that is Representation id of the texture file (texture2 file) and vd2 that is Representation id of the depth file (depth2 file) are value is described.

As described above, Representation id of images that configure a combination of images used in the pattern to be reproduced is described in the MPD file. Accordingly, the video reproduction terminal 14 can refer to the MPD file to perform reproduction such that reproduction is not performed with any other pattern than the pattern to be reproduced.

Further, in the adaptation set element for the quality file, representation elements individually corresponding to the quality file (quality1 file) group and the quality file (quality2 file) group are described. In the representation element corresponding to the quality file (quality1 file(depth)) group, vq1 is described as Representation id and "quality1.mp4" is described as BaseURL.

Further, quality information stored in the quality file (quality1 file) is quality information of depth images stored in the depth file (depth1 file) and the depth file (depth2 file). Accordingly, in the representation element corresponding to the quality file (quality1 file) group, vd1 that is Representation id of the depth file (depth1 file) and vd2 that is Representation id of the depth file (depth2 file) are described as associationID.

Consequently, the video reproduction terminal 14 can recognize that quality information stored in the quality file (quality1 file) group is quality information of depth images corresponding to the depth file (depth1 file) group and the depth file (depth2 file) group.

However, the video reproduction terminal 14 cannot recognize whether the quality information stored in one of two tracks of the quality file (quality1 file) is quality information of depth images stored in the depth file (depth1 file) group or the depth file (depth2 file) group.

Accordingly, in the MPD file of FIG. 10, a sub representation (SubRepresentation) element obtained by dividing a representation element for each level that can be associated with a track is expanded such that the sub representation element can have associationID similarly to the Representation element. Consequently, a corresponding relationship between the respective tracks of the quality file (quality1 file) and RepresentationID (depth-related image specification information) for specifying a depth image can be described.

In particular, in the example of FIG. 10, a track that stores quality information of a depth image to be stored into the depth file (depth1 file) is associated with the level 1 by a leva box (LevelAssignmentBox) disposed in the quality file (quality1 file). Further, a track that stores quality information of a depth image to be stored into the depth file (depth2 file) is associated with the level 2.

Accordingly, <SubRepresentation level="1" associationID="vd1"> that associates the level 1 and vd1 that is Representation id of the depth file (depth1 file) as associationID is described. Further, <SubRepresentation level="2" associationID="vd2"> that associates the level 2 and vd2 that is Representation id of the depth file (depth2 file) as associationID with each other is described.

Further, in the representation element corresponding to the quality file (quality2 file) group, vq2 is described as Representation id and "quality2.mp4" is described as BaseURL.

Quality information included in metadata stored in the quality file (quality2 file) is quality information of an occlusion image stored in the occlusion file (occlusion file). Accordingly, in the representation element corresponding to the quality file (quality1 file) group, vo1 that is Representation id of the occlusion file (occlusion file) group is described as associationID.

It is to be noted that, while, in the example of FIG. 10, bandwidth is not described in the adaptation set element for a quality file, it may otherwise be described.

(Description of Leva Box)

Figure 11:
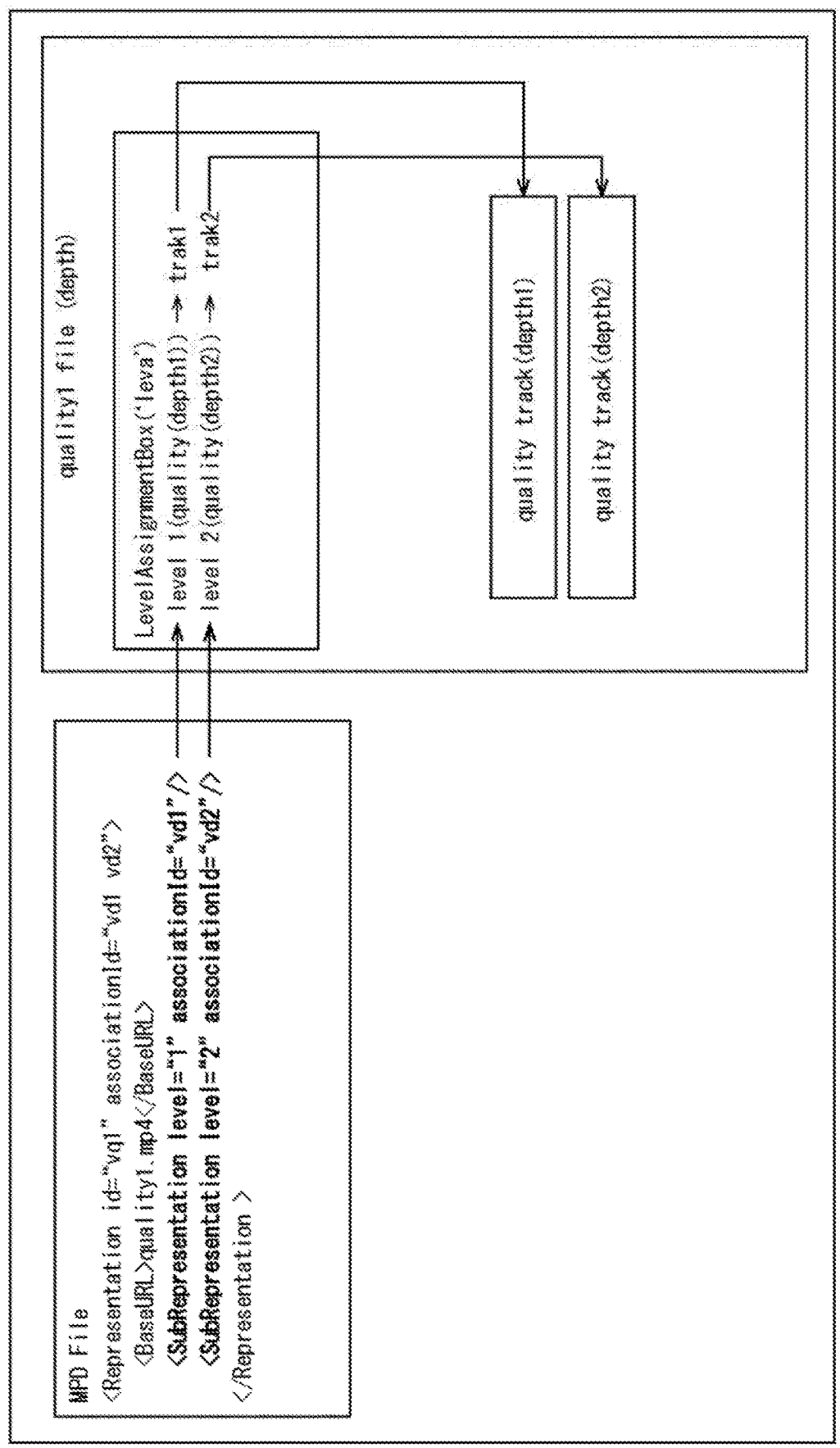
FIG. 11 is a view illustrating a leva box in the first embodiment.

FIG. 11 is a view illustrating a leva box disposed in the quality file (quality1 file) in the case where the MPD file is the MPD file of FIG. 10.

As depicted in FIG. 11, the leva box (Level assignment box) is disposed in the quality file (quality1 file) that has a plurality of tracks. In this leva box, information that specifies a track corresponding to each of levels is described in order beginning with the level 1 to describe a corresponding relationship between the levels and the tracks.

Accordingly, by the leva box, the video reproduction terminal 14 can specify a track corresponding to associationID a sub representation element of the MPD file has. In particular, the video reproduction terminal 14 can specify the track corresponding to associationID that is vd1 to the first track (quality track(depth1)) from the top corresponding to the level 1. Further, the video reproduction terminal 14 can specify the track corresponding to associationID that is vd2 to the second track (quality track(depth2)) from the top corresponding to the level 2.

(Description of Processing of File Reproduction Apparatus)

Figure 12:
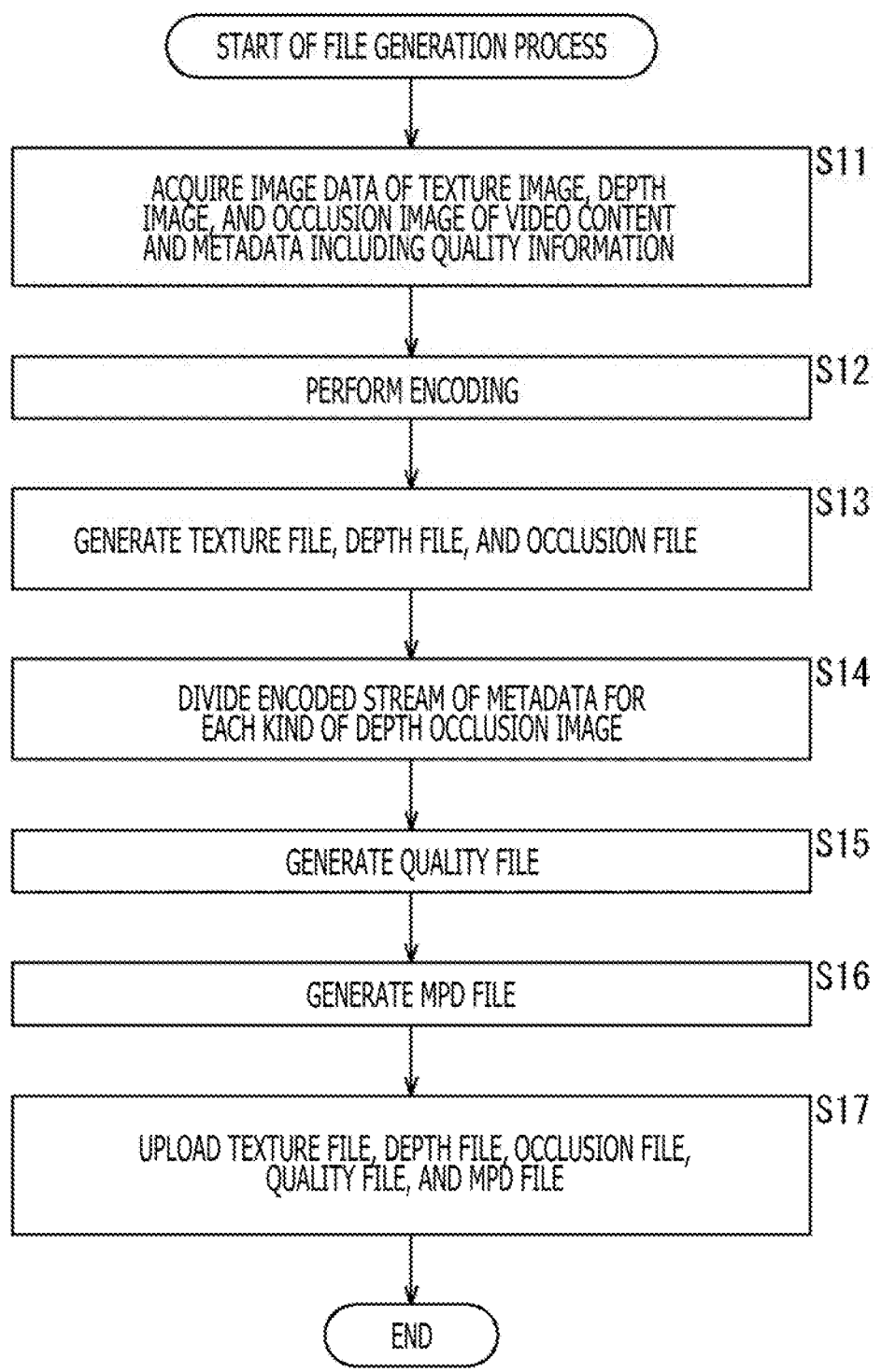
FIG. 12 is a flow chart depicting a file generation process.

FIG. 12 is a flow chart illustrating a file generation process of the file generation apparatus 11 of FIG. 1.

At step S11 of FIG. 12, the acquisition unit 81 of the file generation apparatus 11 acquires image data of a texture image, a depth image, and an occlusion image of a video content and metadata including quality information of encoded streams of depth images of 2 Mbps and 1 Mbps and an occlusion image of 1 Mbps. Then, the acquisition unit 81 supplies the acquired image data and metadata to the encoding unit 82.

At step S12, the encoding unit 82 encodes the image data of the texture image supplied from the acquisition unit 81 in 8 Mbps and 4 Mbps and encodes the image data of the depth image in 2 Mbps and 1 Mbps. Further, the encoding unit 82 encodes the image data of the occlusion image in 1 Mbps. Further, the encoding unit 82 encodes the metadata of the depth images of 2 Mbps and 1 Mbps and the occlusion image of 1 Mbps individually at predetermined bit rates. The encoding unit 82 supplies encoded streams generated as a result of the encoding to the segment file generation unit 83.

At step S13, the segment file generation unit 83 files the encoded streams of the texture image, the depth image, and the occlusion image supplied from the encoding unit 82 in a unit of a segment for each bit rate. The segment file generation unit 83 supplies a texture file, a depth file, and an occlusion file generated as a result of the filing to the upload unit 85.

At step S14, the segment file generation unit 83 divides the encoded streams of the metadata supplied from the encoding unit 82 into two for each of kinds of a depth occlusion image.

At step S15, the segment file generation unit 83 disposes the divisions of the encoded streams of the metadata into quality files different from each other in a unit of a segment to generate and supply a quality file to the upload unit 85.

At step S16, the MPD file generation unit 84 generates and supplies an MPD file to the upload unit 85. At step S17, the upload unit 85 uploads the texture file, the depth file, the occlusion file, the quality file, and the MPD file to the Web server 12.

As described above, the file generation apparatus 11 divides quality information of a depth occlusion image for each kind of depth occlusion image and disposes the divisions of the divided information into quality files different from each other. Accordingly, in comparison with an alternative case in which quality information is disposed into quality files different from each other for each depth occlusion image, the number of quality files can be reduced. Accordingly, it can be said that the quality information of the depth occlusion image can be stored efficiently. Further, the processing amount relating to acquisition of quality information by the video reproduction terminal 14 can be reduced.

Further, where the texture image and the depth image are used for reproduction, the video reproduction terminal 14 can acquire quality information from the quality file (quality1 file) in which only the quality information of the depth image is stored. Accordingly, the acquisition efficiency of quality information can be increased in comparison with that in an alternative case in which the quality information is acquired from the quality file in which quality information of all depth occlusion images is stored.

Further, the file generation apparatus 11 generates an MPD file in which associationId is described in the sub representation element. Consequently, the MPD file can manage a corresponding relationship between tracks of the quality file in which quality information of a plurality of depth occlusion images is divisionally disposed in tracks different from each other and the depth occlusion image. As a result, the video reproduction terminal 14 can extract quality information of the depth occlusion images from the quality file in which the quality information of a plurality of depth occlusion images is divisionally disposed in tracks different from each other.

Further, since the file generation apparatus 11 generates an MPD file in which a combination of images to be used for reproduction of a pattern to be used for reproduction is described, only reproduction of the pattern to be used for reproduction can be performed by the video reproduction terminal 14. As a result, for example, a producer of the video content can provide an image of quality desired by the producer to the user. Further, since only it is necessary for the video reproduction terminal 14 to select a reproduction pattern from the patterns to be used for reproduction, the processing load is reduced in comparison with that in an alternative case in which a reproduction pattern is selected from among all reproduction patterns capable of being used for reproduction.

(Example of Functional Configuration of Video Reproduction Terminal)

Figure 13:
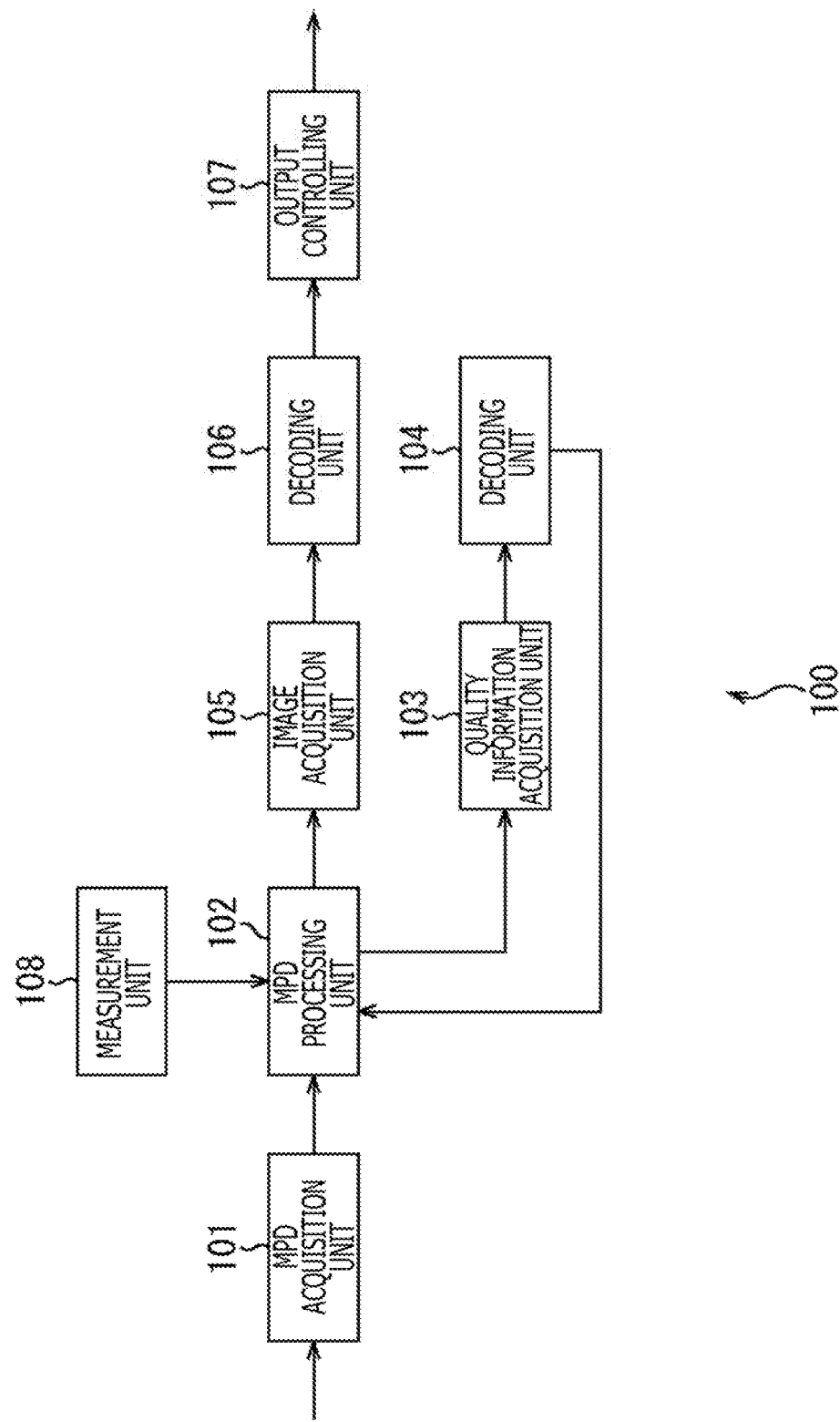
FIG. 13 is a block diagram depicting an example of a configuration of a streaming reproduction unit.

FIG. 13 is a block diagram depicting an example of a configuration of a streaming reproduction unit implemented by the video reproduction terminal 14 of FIG. 1 executing the controlling software 21, the video reproduction software 22, and the accessing software 23.

The streaming reproduction unit 100 is configured from an MPD acquisition unit 101, an MPD processing unit 102, a quality information acquisition unit 103, a decoding unit 104, an image acquisition unit 105, a decoding unit 106, an output controlling unit 107, and a measurement unit 108.

The MPD acquisition unit 101 of the streaming reproduction unit 100 requests the Web server 12 for acquires an MPD file. The MPD acquisition unit 101 supplies the acquired MPD file to the MPD processing unit 102.

The MPD processing unit 102 analyzes the MPD file supplied from the MPD acquisition unit 101. In particular, the MPD processing unit 102 acquires bandwidth each Representation element of the MPD file has as a bit rate of an image corresponding to the Representation element.

Further, the MPD processing unit 102 acquires a combination of images to be used for reproduction of the pattern to be used for reproduction from value of schemeIdUri="urn:mpeg:dash:quality:playback:combination:2015" of the MPD file and Representation id each Representation element has. Furthermore, the MPD processing unit 102 acquires acquisition information such as a file name of a segment file group corresponding to the Representation element, a level corresponding to quality information of the respective depth occlusion images and so forth from BaseURL each Representation element of the MPD file has, associationId of the sub representation element and so forth.

The MPD processing unit 102 selects candidates for a reproduction pattern from among the patterns to be used for reproduction. The MPD processing unit 102 creates a list of acquisition candidates for a depth occlusion image on the basis of the network bandwidth of the Internet 13 and the bit rate of the image supplied from the measurement unit 108. The MPD processing unit 102 supplies acquisition information of quality information of the depth occlusion image registered in the list to the quality information acquisition unit 103.

For example, in the case where a depth image is registered in the list of acquisition candidates for a depth occlusion image, the MPD processing unit 102 supplies acquisition information of quality information of the depth image registered in the list in the quality file (quality1 file) to the quality information acquisition unit 103. In the case where an occlusion image is registered in the list of acquisition candidates for a depth occlusion image, the MPD processing unit 102 supplies acquisition information of quality information of the occlusion image registered in the list in the quality file (quality2 file) to the quality information acquisition unit 103.

Further, the MPD processing unit 102 selects a reproduction pattern from candidates for a reproduction pattern on the basis of the quality information supplied from the decoding unit 104. The MPD processing unit 102 supplies the acquisition information of the texture image of the texture file to be used for reproduction of the selected reproduction pattern to the image acquisition unit 105. Further, where a file of the depth occlusion image is used for reproduction of the selected reproduction pattern, the MPD processing unit 102 supplies the acquisition information of the depth occlusion image to the image acquisition unit 105.

The quality information acquisition unit 103 requests the Web server 12 for and acquires an encoded stream of metadata including the quality information on the basis of the acquisition information supplied from the MPD processing unit 102. The quality information acquisition unit 103 supplies the acquired encoded stream to the decoding unit 104.

The decoding unit 104 decodes the encoded stream supplied from the quality information acquisition unit 103 and generates metadata including the quality information. The decoding unit 104 supplies the quality information to the MPD processing unit 102.

The image acquisition unit 105, the decoding unit 106, and the output controlling unit 107 function as a reproduction unit, and reproduce only the texture image or the texture image and the depth occlusion image on the basis of the acquired information supplied from the MPD processing unit 102.

In particular, the image acquisition unit 105 requests the Web server 12 for and acquires an encoded stream of a texture file or a file of the depth occlusion image on the basis of the acquisition information supplied from the MPD processing unit 102. The image acquisition unit 105 supplies the acquired encoded stream to the decoding unit 104.

The decoding unit 106 decodes the encoded stream supplied from the image acquisition unit 105 to generate image data. The decoding unit 106 supplies the generated image data to the output controlling unit 107.

In the case where the image data supplied from the decoding unit 106 is only image data of the texture image, the output controlling unit 107 causes a display unit not depicted such as a display the video reproduction terminal 14 has to display the texture image thereon on the basis of the image data of the texture image.

On the other hand, in the case where the image data supplied from the decoding unit 106 is image data of the texture image and the depth occlusion image, the output controlling unit 107 generates image data of a 3D image on the basis of the image data of the texture image and the depth occlusion image. Then, the output controlling unit 107 causes the displaying unit not depicted such as a display to display a 3D image on the basis of the generated image data of the 3D image.

The measurement unit 108 measures the network bandwidth of the Internet 13 and supplies the measured network bandwidth to the MPD processing unit 102.

(Description of First Example of Process of Streaming Reproduction Unit)

Figure 14:
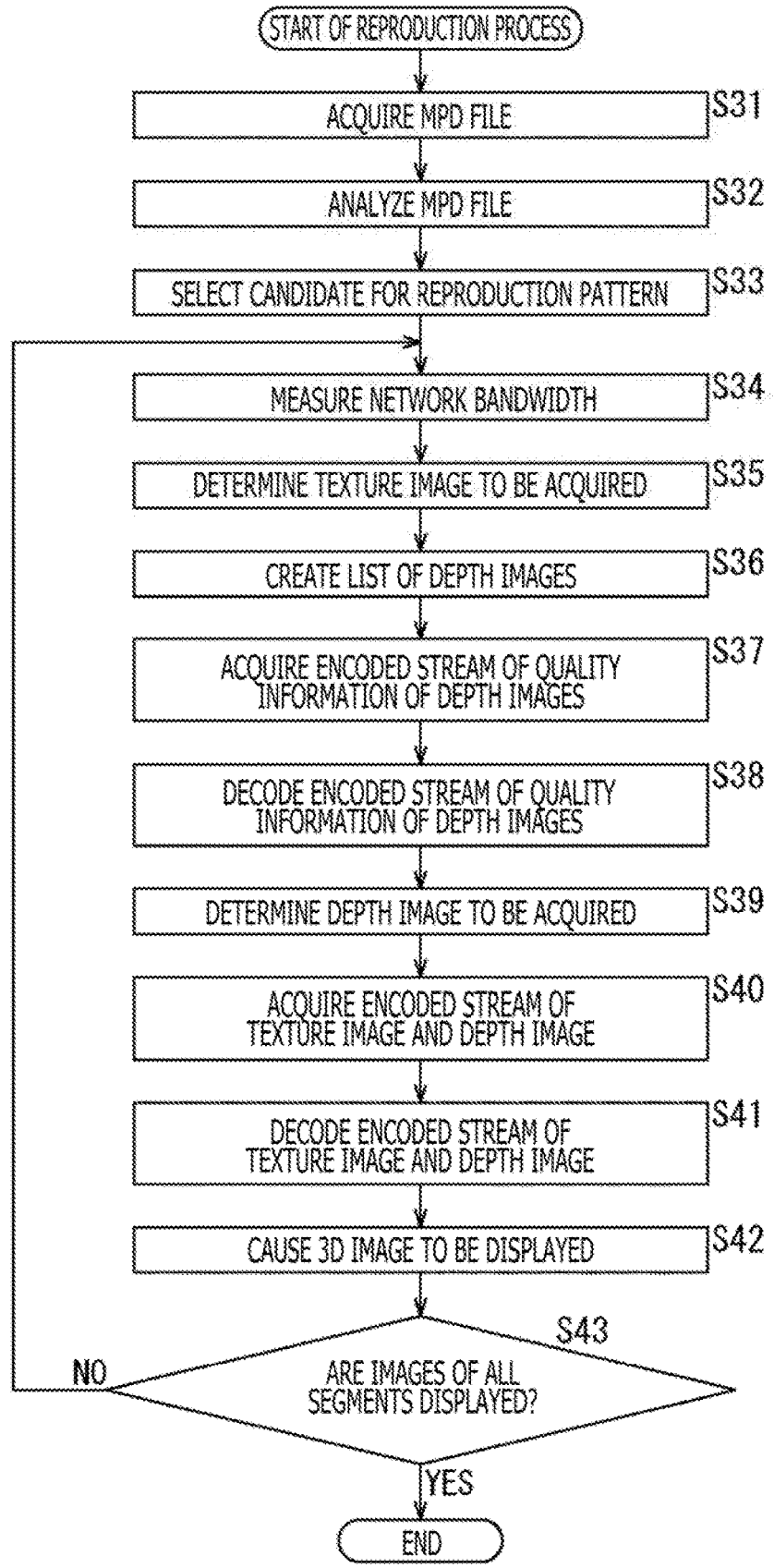
FIG. 14 is a flow chart illustrating a first example of a reproduction process in the first embodiment.

FIG. 14 is a flow chart illustrating a first example of a reproduction process of the streaming reproduction unit 100 of FIG. 13. It is to be noted that, in the reproduction process of FIG. 14, the streaming reproduction unit 100 performs reproduction of a 3D image that uses a texture image and a depth image.

At step S31 of FIG. 14, the MPD acquisition unit 101 requests the Web server 12 for and acquires an MPD file. The MPD acquisition unit 101 supplies the acquired MPD file to the MPD processing unit 102.

At step S32, the MPD processing unit 102 analyzes the MPD file supplied from the MPD acquisition unit 101. consequently, the MPD processing unit 102 acquires bit rates of the respective texture images and depth images, a combination of images to be used for reproduction in a pattern to be reproduced and acquisition information of a texture image, a depth image, and quality information.

At step S33, the MPD processing unit 102 selects, on the basis of the combination of images to be used for reproduction in the pattern to be reproduced, the reproduction patterns 3, 4, and 7 in which reproduction is performed using only a texture image and a depth image from among the patterns to be reproduced as candidates for a reproduction pattern. Processes at succeeding steps S34 to S43 are performed in a unit of a segment.

At step S34, the measurement unit 108 measures and supplies a network bandwidth of the Internet 13 to the MPD processing unit 102.

At step S35, the MPD processing unit 102 determines, on the basis of the network bandwidth and the bit rate of the texture images, a texture image to be acquired from among the texture images to be used for reproduction with the candidates for a reproduction pattern.

For example, the MPD processing unit 102 assumes that 80 percent of the network bandwidth is a maximum acceptable bit rate for a texture image and determines a texture image of a bit rate lower than the maximum acceptable bit rate from among the texture images to be used for reproduction with the candidates for a reproduction pattern as a texture image to be acquired.

At step S36, the MPD processing unit 102 creates a list of acquisition candidates for a depth image on the basis of the candidates for a reproduction pattern for reproducing a texture image to be acquired and the bit rate of the depth image.

For example, the MPD processing unit 102 determines that 20 percent of the network bandwidth is a maximum acceptable bit rate for a depth image. Then, in the case where the texture image to be acquired is a texture image of a texture file (texture1 file) and the bit rates of depth images of the depth file (depth1 file) and the depth file (depth2 file) are lower than the maximum acceptable bit rate, the MPD processing unit 102 creates a list in which the depth images of the depth file (depth1 file) and the depth file (depth2 file) are registered on the basis of the reproduction patterns 3 and 4.

On the other hand, in the case where the texture image to be acquired is a texture image of the texture file (texture2 file) and the bit rates of depth images of the depth file (depth2 file) and the depth file (depth2 file) are lower than the maximum acceptable bit rate, the MPD processing unit 102 creates a list in which the depth image of the depth file (depth2 file) is registered on the basis of the reproduction pattern 7.

Then, the MPD processing unit 102 supplies acquisition information of quality information of the depth images registered in the list to the quality information acquisition unit 103. It is to be noted that, in the case where all bit rates of the depth images to be reproduced together with the texture images to be acquired are equal to or higher than the maximum acceptable bit rate, nothing is registered into the list of acquisition candidates for a depth image, and only encoded streams of texture images are acquired, decoded, and displayed, and the process advances to step S43.

At step S37, the quality information acquisition unit 103 requests, on the basis of the acquisition information supplied from the MPD processing unit 102, the Web server 12 for an encoded stream of metadata including quality information of the depth images to acquire the encoded stream. The quality information acquisition unit 103 supplies the acquired encoded stream to the decoding unit 104.

At step S38, the decoding unit 104 decodes the encoded stream of the quality information of the depth images supplied from the quality information acquisition unit 103 to generate metadata including the quality information of the depth images. The decoding unit 104 supplies the quality information of the depth images to the MPD processing unit 102.

At step S39, the MPD processing unit 102 determines a depth image to be acquired from among the depth images registered in the list of depth images on the basis of the quality information supplied from the decoding unit 104.

For example, the MPD processing unit 102 determines a depth image whose quality represented by the quality information is best, a depth image whose quality represented by the quality information is nearest to the quality of a depth image of an immediately preceding segment (or sub segment), or a depth image whose quality represented by the quality information is acceptable quality and besides the bit rate is lowest as a depth image to be acquired.

In the case where a depth image whose quality represented by the quality information is nearest to the quality of a depth image of an immediately preceding segment (or sub segment) is determined as a depth image to be acquired, the sense of incongruity of the appearance of the 3D image to be reproduced can be reduced. The MPD processing unit 102 supplies acquisition information of the depth image to be acquired to the image acquisition unit 105.

At step S40, the image acquisition unit 105 requests the Web server 12 for an encoded stream of the texture image and the depth image on the basis of the acquisition information supplied from the MPD processing unit 102 to acquire encoded streams. The image acquisition unit 105 supplies the acquired encoded streams to the decoding unit 104.

At step S41, the encoded streams supplied from the image acquisition unit 105 are decoded to generate image data of the texture image and the depth image. The decoding unit 106 supplies the generated image data of the texture image and the depth image to the output controlling unit 107.

At step S42, the output controlling unit 107 generates image data for a 3D image on the basis of the image data of the texture image and the depth image supplied from the decoding unit 106 and controls the display unit not depicted to display a 3D image.

At step S43, the streaming reproduction unit 100 decides whether an image of the last segment of the video content is displayed. In the case where it is decided at step S43 that an image of the last segment of the video content is not displayed as yet, the process returns to step S34.

On the other hand, in the case where it is decided at step S43 that an image of the last segment of the video content is displayed, the process ends.

It is to be noted that, though not depicted, the first example of the reproduction process by which reproduction of a 3D image is performed by the streaming reproduction unit 100 using the texture image, the depth image, and the occlusion image is similar to the reproduction process of FIG. 14 except the following point.

In particular, the candidates for a reproduction pattern selected at step S33 of FIG. 14 are the reproduction patterns 5 and 6. Further, between step S39 and step S40, a process regarding quality information of the occlusion image is performed similarly to the processes at steps S36 to S39 for the quality information of the depth image.

However, in this case, the maximum acceptable bit rates for a texture image, a depth image, and an occlusion image are 70 percent, 15 percent, and 15 percent of the network bandwidth, respectively. Furthermore, the depth image in the processes at steps S40 to S42 is both a depth image and an occlusion image.

(Description of Second Example of Processing of Streaming Reproduction Unit)

Figure 15:
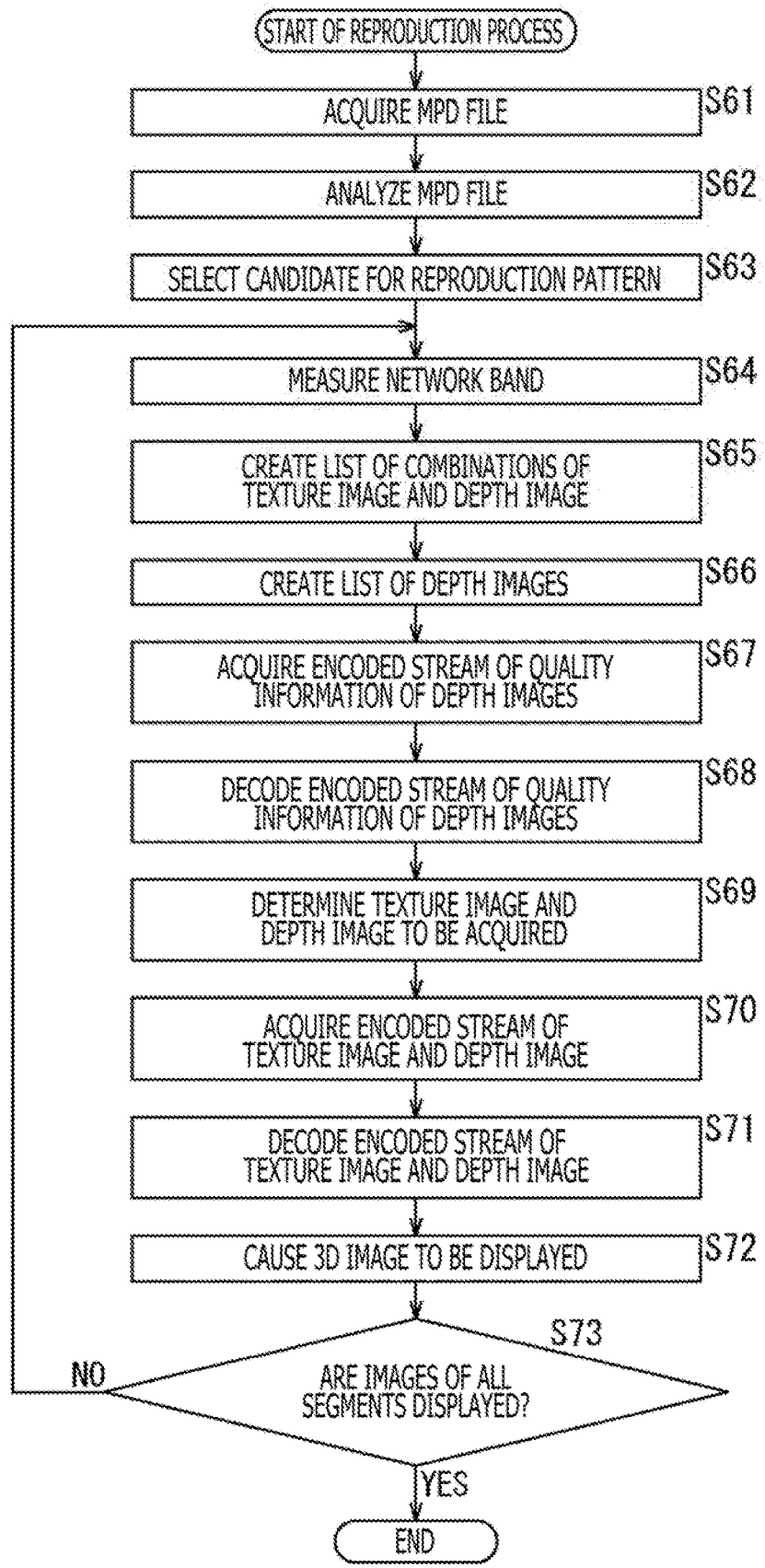
FIG. 15 is a flow chart illustrating a second example of the reproduction process in the first embodiment.

FIG. 15 is a flow chart illustrating a second example of the reproduction process of the streaming reproduction unit 100 of FIG. 13. It is to be noted that, in the reproduction process of FIG. 15, the streaming reproduction unit 100 performs reproduction of a 3D image in which a texture image and a depth image are used.

The reproduction process of FIG. 15 is different from the reproduction process of FIG. 14 in that the ratio of the maximum acceptable bit rates of the texture image and the depth image to the network bandwidth is not determined.

Steps S61 to S64 of FIG. 15 are similar to the processes at steps S31 to S34 of FIG. 14, respectively, and therefore, description of them is omitted. Processes at steps S64 to S73 are executed in a unit of a segment.

At step S65, the MPD processing unit 102 creates a list of acquisition candidates for a combination of a texture image and a depth image on the basis of the candidates for a reproduction pattern, network bandwidth of the Internet 13 supplied from the measurement unit 108, and bit rate of the texture image and the depth image.

In particular, a list is created in which, from among combinations of texture images and depth images used for reproduction in the reproduction patterns 3, 4, and 7, combinations in which the sum of bit rates of the texture image and the depth image does not exceed the network bandwidth are registered.

It is to be noted that a lower limit for the bit rates of the texture images and the depth images may be determined in advance such that, from among the combinations registered in the list, any combination in which at least one of the bit rates is lower than the lower limit is excluded.

Further, in the case where all of the sums of the bit rates of the texture images and the depth images that are used for reproduction in the reproduction patterns 3, 4, and 7 exceed the network bandwidth, nothing is registered into the list of acquisition candidates for a combination of a texture image and a depth image. Then, only the encoded stream of a texture image of a maximum bit rate that does not exceed the network bandwidth is acquired, decoded, and displayed, and the process advances to step S73.

At step S66, the MPD processing unit 102 creates a list of the depth images registered in the list created at step S65.

Then, the MPD processing unit 102 supplies acquisition information of quality information of the depth images registered in the list to the quality information acquisition unit 103.

Processes at steps S67 and S68 are similar to the processes at steps S37 and S38 of FIG. 14, respectively, and therefore, description of them is omitted.

At step S69, the MPD processing unit 102 determines, on the basis of the quality information, a combination of a texture image and a depth image to be acquired from among the combinations registered in the list of combinations of texture images and depth images.

For example, the MPD processing unit 102 determines a depth image to be acquired similarly as at step S39 of FIG. 14. Then, the MPD processing unit 102 determines a texture image of the highest bit rate from among the texture images whose combination with the depth image to be acquired is registered in the combination list as a texture image to be acquired.

Processes at steps S70 to S73 are similar to the processes at steps S40 to S43 of FIG. 14, respectively, and therefore, description of them is omitted.

It is to be noted that, though not depicted, the second example of the reproduction process in which the streaming reproduction unit 100 executes reproduction of a 3D image using a texture image, a depth image, and an occlusion image is similar to the reproduction process of FIG. 15 except the following point.

In particular, the candidates for a reproduction pattern selected at step S63 of FIG. 15 are the reproduction patterns 5 and 6. Further, the depth image in the processes at steps S65 to S72 includes both a depth image and an occlusion image.

Since the video reproduction terminal 14 acquires quality information of depth and occlusion images as described above, the video reproduction terminal 14 can acquire appropriate depth occlusion images on the basis of the quality information.

Second Embodiment (Example of Segment File)

The configuration of a second embodiment of the information processing system to which the present disclosure is applied is same as the configuration of the information processing system 10 of FIG. 1 principally except that an encoded stream of metadata including quality information is divided not for each kind of a depth-related image but for each texture image and is disposed into a different one of quality files. Accordingly, in the following description, description other than description of a quality file is omitted suitably.

Figure 16:
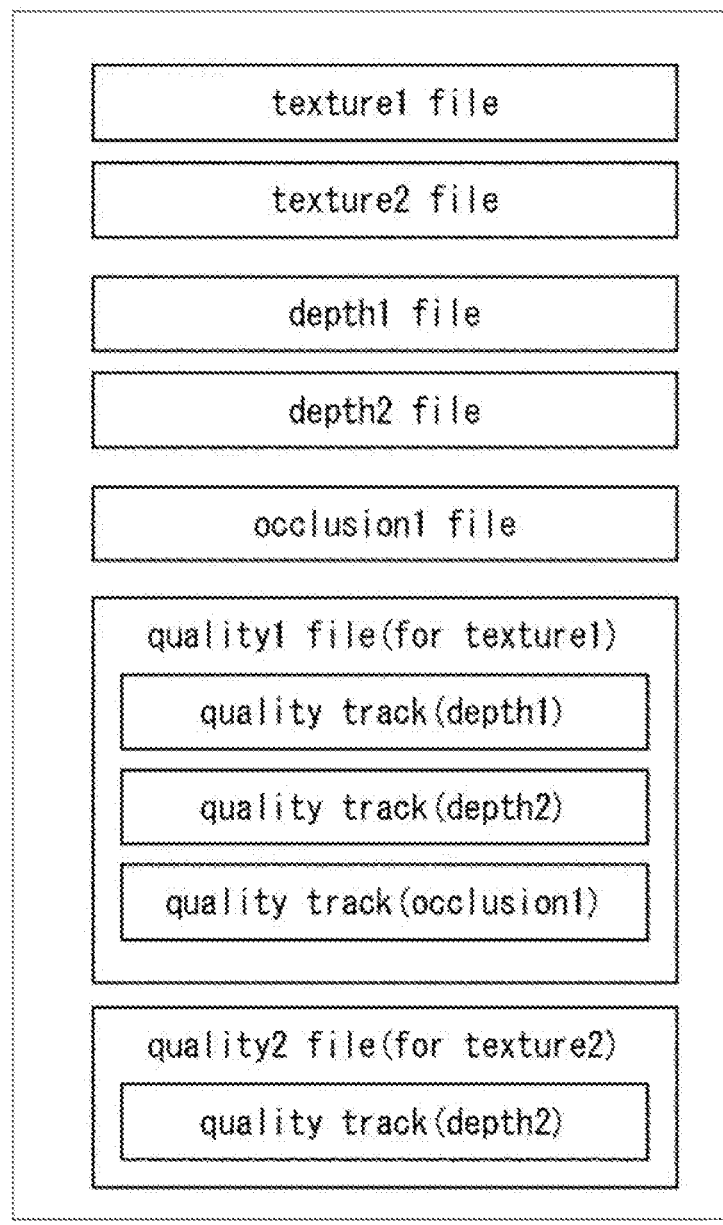
FIG. 16 is a view depicting an example of a segment file in a second embodiment of the information processing system to which the present disclosure is applied.

FIG. 16 depicts an example of a segment file generated by the segment file generation unit 83 of the second embodiment of the information processing system to which the present disclosure is applied.

The segment file of FIG. 16 is same as the segment file of FIG. 5 except a quality file.

As depicted in FIG. 16, the segment file generation unit 83 divides each of encoded streams of quality information of depth images of 2 Mbps and 1 Mbps and encoded streams of quality information of an occlusion image of 1 Mbps into two for each texture image to be reproduced with the encoded streams. Then, the segment file generation unit 83 disposes the divisions of the encoded streams of metadata in a unit of a segment into the different quality files to generate quality files.

In particular, a depth occlusion image used for reproduction together with a texture file (texture1 file) in reproduction with a pattern to be reproduced is depth images of 2 Mbps and 1 Mbps and an occlusion image of 1 Mbps. Accordingly, the segment file generation unit 83 generates a quality file (quality1 file) in which encoded streams of metadata including quality information of the depth images of 2 Mbps and 1 Mbps and encoded streams of metadata including quality information of the occlusion image of 1 Mbps are disposed in a unit of a segment.

In the quality file (quality1 file), the respective encoded streams are disposed in different tracks (quality track (depth1), quality track(depth2), and quality track(occlusion1)).

Further, a depth occlusion image used for reproduction together with the texture file (texture2 file) in reproduction of a pattern to be reproduced is a depth image of 1 Mbps. Accordingly, the segment file generation unit 83 generates the quality file (quality2 file) in which the encoded stream of metadata including quality information of the depth image of 1 Mbps is displayed in a unit of a segment.

In this manner, the segment file generation unit 83 files encoded streams of metadata including quality information separately into files for each texture image. Accordingly, by acquiring quality information from a quality file of texture images to be acquired, the video reproduction terminal 14 can readily acquire quality information of a depth occlusion image to be used for reproduction in a pattern to be reproduced together with the texture image.

In particular, in a quality file, quality information of a depth occlusion image to be used in reproduction in a pattern to be reproduced together with a texture image corresponding to the quality file is stored. Accordingly, in comparison with an alternative case in which encoded streams of quality information of all depth occlusion images are collectively filed, the quality information of depth occlusion images to be used for reproduction together with texture images to be acquired can be acquired readily.

Further, though not detected, the MPD file in the second embodiment is similar to the MPD file of FIG. 10 except the following point. In particular, in the MPD file in the second embodiment, associationID the representation element of the quality file (quality1 file) has includes not only vd1 and vd2 but also vo1. Further, the representation element of the quality file (quality1 file) further includes a sub representation element having the level 3 and vo1 as associationID. Furthermore, associationID the representation element of the quality file (quality2 file) has is not vo1 but vd2.

Further, though not depicted, the file reproduction process in the second embodiment is same as the file reproduction process of FIG. 12 except that an encoded stream of metadata including quality information is divided not for each kind of a depth-related image but for each texture image at step S14.

Further, though not depicted, at step S36, the reproduction process in the second embodiment is same as the reproduction process of FIG. 14 except that the MPD processing unit 102 supplies acquisition information of quality information stored in a quality file of texture images to be acquired from within the acquisition information of the quality information of depth images registered in the list to the quality information acquisition unit 103.

As described above, the file generation apparatus 11 in the second embodiment divides quality information of a depth occlusion image for each texture image to be reproduced together with the depth occlusion image and disposes the divisions of the quality information into different quality files. Accordingly, in comparison with an alternative case in which quality information is disposed in different quality files for different depth occlusion images, the number of quality files can be reduced. Therefore, it can be said that the quality information of depth occlusion images can be stored efficiently. Further, the processing amount relating to acquisition of the quality information by the video reproduction terminal 14 can be reduced.

Further, the video reproduction terminal 14 can acquire, from within a quality file in which quality information only of a depth occlusion image to be reproduced together with a texture image of a reproduction target is stored, the quality information. Accordingly, in comparison with an alternative case in which quality information is acquired from a quality file in which quality information of all depth occlusion images is stored, the acquisition efficiency of quality information can be improved.

Third Embodiment (Example of Segment File)

The configuration of a third embodiment of the information processing system to which the present disclosure is applied is same as the configuration of the information processing system 10 of FIG. 1 principally except that the quality information of a depth occlusion image is replaced by the quality information of a texture image or a 3D image reproduced in a pattern to be reproduced and that an encoded stream of quality information is divided for each kind of a reproduction pattern corresponding to the quality information and the divisions of the encodes stream are disposed in different quality files. Accordingly, in the following, description other than the description of a quality file is omitted suitably.

Figure 17:
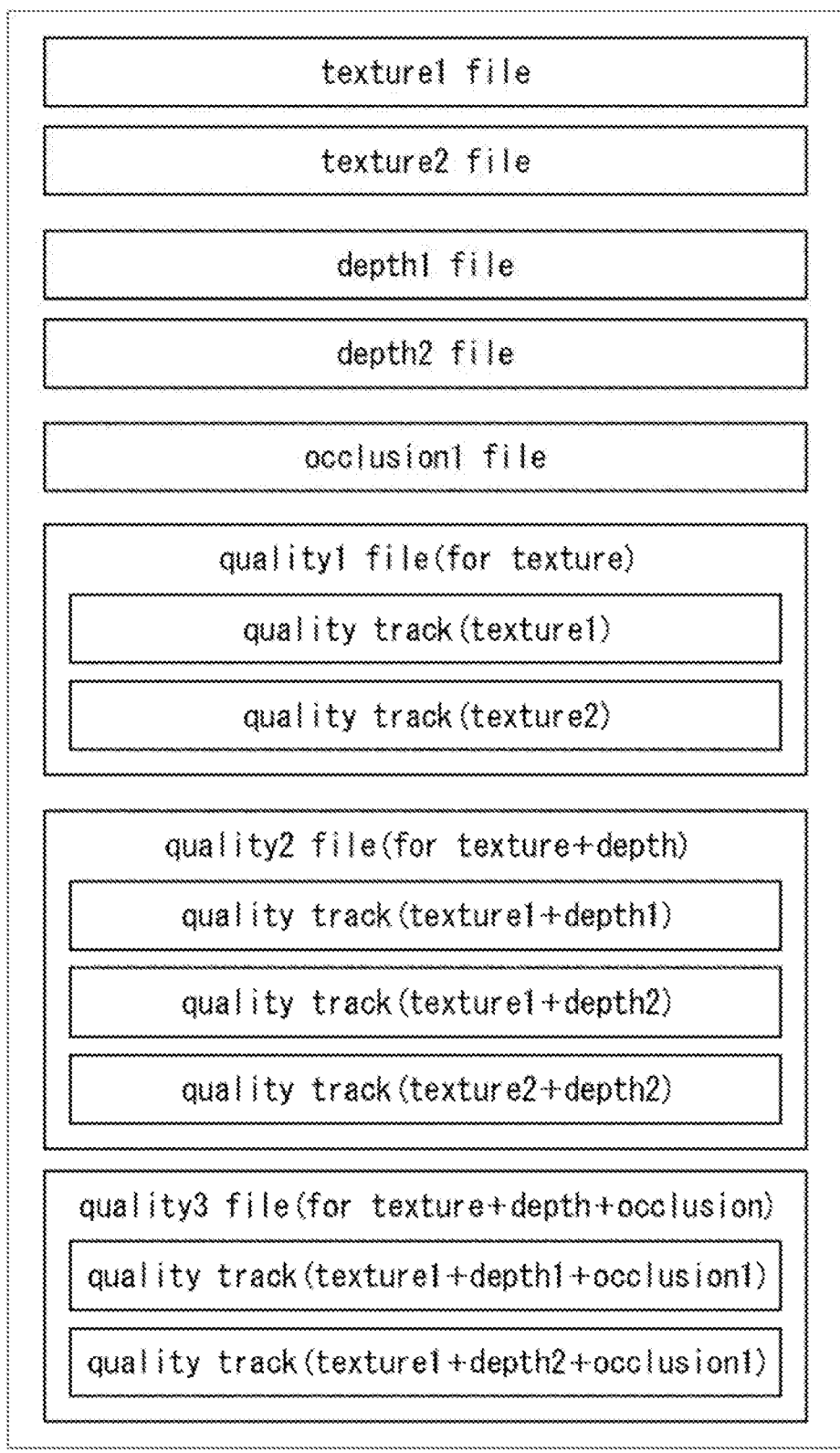
FIG. 17 is a view depicting an example of a segment file in a third embodiment of the information processing system to which the present disclosure is applied.

FIG. 17 is a view depicting an example of a segment file generated by the segment file generation unit 83 in the third embodiment of the information processing system to which the present disclosure is applied.

The segment file of FIG. 17 is same as the segment file of FIG. 5 except the quality file.

As depicted in FIG. 17, the segment file generation unit 83 divides an encoded stream of metadata including quality information of patterns 1 to 7 supplied from the encoding unit 82 into three for each kind of a reproduction pattern. Then, the segment file generation unit 83 disposes the divisions of the encoded stream in a unit of a segment into different quality files to generate quality files.

In particular, the segment file generation unit 83 generates a quality file (quality1 file) in which encoded streams of the quality information of the reproduction patterns 1 and 2 in which reproduction is performed using only a texture image are disposed in a unit of a segment. In the quality file (quality1 file), the respective encoded streams are disposed in different tracks (quality track(texture1) and quality track (texture2)).

Further, the segment file generation unit 83 generates a quality file (quality2 file) in which encoded streams of quality information of the reproduction patterns 3, 4, and 7 in which reproduction is performed using only a texture image and a depth image are disposed in a unit of a segment. In the quality file (quality2 file), the respective encoded streams are disposed on different tracks (quality track(texture1+depth1), quality track(texture1+depth2), and quality track(texture2+depth2)).

Furthermore, the segment file generation unit 83 generates a quality file (quality3 file) in which encoded streams of metadata including quality information of the reproduction patterns 5 and 6 in which reproduction is performed using a texture image, a depth image, and an occlusion image are disposed in a unit of a segment. In the quality file (quality3 file), the respective encoded streams are disposed in different tracks (quality track(texture1+depth1+occlusion1) and quality track(texture1+depth2+occlusion1)).

As described above, the segment file generation unit 83 disposes an encoded stream of metadata including quality information of a texture image or a 3D image to be reproduced in a pattern to be reproduced. Accordingly, the video reproduction terminal 14 can perform reproduction in which the quality of a texture image or a 3D image to be reproduced finally is high on the basis of quality information.

Further, the segment file generation unit 83 files encoded streams of quality information of a pattern to be reproduced separately for each kind of the reproduction pattern. Accordingly, the video reproduction terminal 14 can readily acquire quality information of reproduction patterns that become candidates from quality files of kinds of reproduction patterns that are made candidates.

In contrast, in the case where encoded streams of quality information of all reproduction patterns are filed collectively, it is necessary to acquire quality information of reproduction patterns that become candidates from files including also quality information of an unnecessary reproduction pattern that is not a kind of a reproduction pattern that becomes a candidate.

(Example of Description of MPD File)

FIG. 18 is a view depicting an example of a description of an MPD file in the third embodiment.

The description of the MPD file of FIG. 18 is same as the description of FIG. 10 except the adaptation set element for a quality file.

In the MPD file of FIG. 18, a quality file (quality1 file) group, another quality file (quality2 file) group, and a further quality file (quality3 file) group are grouped by one adaptation set element.

In the adaptation set element for quality files, representation elements individually corresponding to the quality file (quality1 file) group, quality file (quality2 file) group, and quality file (quality3 file) group are described.

In the representation element corresponding to the quality file (quality1 file) group, vq1 is described as Representation id and "quality1.mp4" is described as BaseURL.

Meanwhile, quality information stored in the quality file (quality1 file) is quality information of a texture file (texture1 file) and another texture file (texture2 file). Accordingly, in a representation element corresponding to the quality file (quality1 file), vt1 and vt2 that are Representation id of the texture file (texture1 file) group and the texture file (texture2 file) group are described as associationID.

Furthermore, in the example of FIG. 18, tracks corresponding to the level 1 and the level 2 have stored therein quality information of the texture file (texture1 file) and the texture file (texture2 file), respectively.

Accordingly, in the representation element corresponding to the quality file (quality1 file) group, <SubRepresentation level="1" associationID="vt1"> that associates the level 1 and vt1 that is Representation id of the texture file (texture1 file) as associationID is described. Further, <SubRepresentation level="2" associationID="vt2"> that associates the level 2 and vt2 that is Representation id of the texture file (texture2 file) as associationID is described. In other words, a corresponding relationship between the respective tracks of the quality file (quality1 file) and Representation (texture image specification information) that specifies the texture images is described.

Meanwhile, in the representation element corresponding to the quality file (quality2 file) group, vq2 is described as Representation id and "quality2.mp4" is described as BaseURL.

Further, quality information stored in the quality file (quality2 file) is quality information of a 3D image to be reproduced using the texture file (texture1 file) and the depth file (depth1 file), another 3D image to be reproduced using the texture file (texture1 file) and the depth file (depth2 file), and a further 3D image to be reproduced using the texture file (texture2 file) and the depth file (depth2 file).

Accordingly, in the representation element corresponding to the quality file (quality2 file) group, vt1, vt2, vd1, and vd2 that are Representation id of the texture file (texture1 file), the texture file (texture2 file), the depth file (depth1 file), and the depth file (depth2 file) are described as associationID.

Furthermore, in the example of FIG. 18, a track corresponding to the level 1 has stored therein quality information of a 3D image to be reproduced using the texture file (texture1 file) and the depth file (depth1 file). A track corresponding to the level 2 has stored therein quality information of a 3D image to be reproduced using the texture file (texture1 file) and the depth file (depth2 file). A track corresponding to the level 3 has stored therein quality information of a 3D image to be reproduced using the texture file (texture2 file) and the depth file (depth2 file).

Accordingly, in the representation element corresponding to the quality file (quality2 file) group, <SubRepresentation level="1" associationID="vt1 vd1"> that associates the level 1 and vt1 and vd1 that are Representation id of the texture file (texture1 file) and the depth file (depth1 file) as associationID with each other is described. Further, <SubRepresentation level="2" associationID="vt1 vd2"> that associates the level 2 and vt1 and vd2 that are Representation id of the texture file (texture1 file) and the depth file (depth2 file) as associationID with each other is described.

Furthermore, <SubRepresentation level="3" associationID="vt2 vd2"> that associates the level 3 and vt2 and vd2 that are Representation id of the texture file (texture2 file) and the depth file (depth2 file) as associationID with each other is described.

Further, in the representation element corresponding to the quality file (quality3 file), vq3 is described as Representation id, and "quality3.mp4" is described as BaseURL.

Further, quality information stored in the quality file (quality3 file) is quality information of a 3D image to be reproduced using the texture file (texture1 file), the depth file (depth1 file), and the occlusion file (occlusion file) and another 3D image to be reproduced using the texture file (texture1 file), the depth file (depth2 file), and the occlusion file (occlusion file).

Accordingly, in the representation element corresponding to the quality file (quality3 file) group, vt1, vd1, vd2, and vo1 that are Representation id of the texture file (texture1 file), the depth file (depth1 file), the depth file (depth2 file), and the occlusion file (occlusion file) are described as associationID.

Further, in the example of FIG. 18, a track corresponding to the level 1 has stored therein quality information of a 3D image to be reproduced using the texture file (texture1 file), the depth file (depth1 file), and the occlusion file (occlusion file). A track corresponding to the level 2 has stored therein quality information of a 3D image to be reproduced using the texture file (texture1 file), the depth file (depth2 file), and the occlusion file (occlusion file)).

Accordingly, in the representation element corresponding to the quality file (quality3 file) group, <SubRepresentation level="1" associationID="vt1 vd1 vo1"> that associates the level 1 and vt1, vd1, and vo1 that are Representation id of the texture file (texture1 file), the depth file (depth1 file), and the occlusion file (occlusion file) is described as associationID. Further, <SubRepresentation level="2" associationID="vt1 vd2 vo1"> that associates the level 2 and vt1, vd2, and vo1 that are Representation id of the texture file (texture1 file), the depth file (depth2 file), and the occlusion file (occlusion file) is described as associationID.

It is to be noted that, in the example of FIG. 18, although bandwidth is not described in the adaptation set element for a quality file, it may otherwise be described.

Further, though not depicted, the file generation process in the third embodiment is same as the file reproduction process of FIG. 12 except that the quality information acquired at step S11 is quality information of a texture image or a 3D image reproduced in the reproduction pattern and that an encoded stream of metadata including quality information is divided not for each kind of a depth-related image but for each kind of a reproduction pattern at step S14.

(Description of First Example of Process of Streaming Reproduction Unit)

Figure 19:
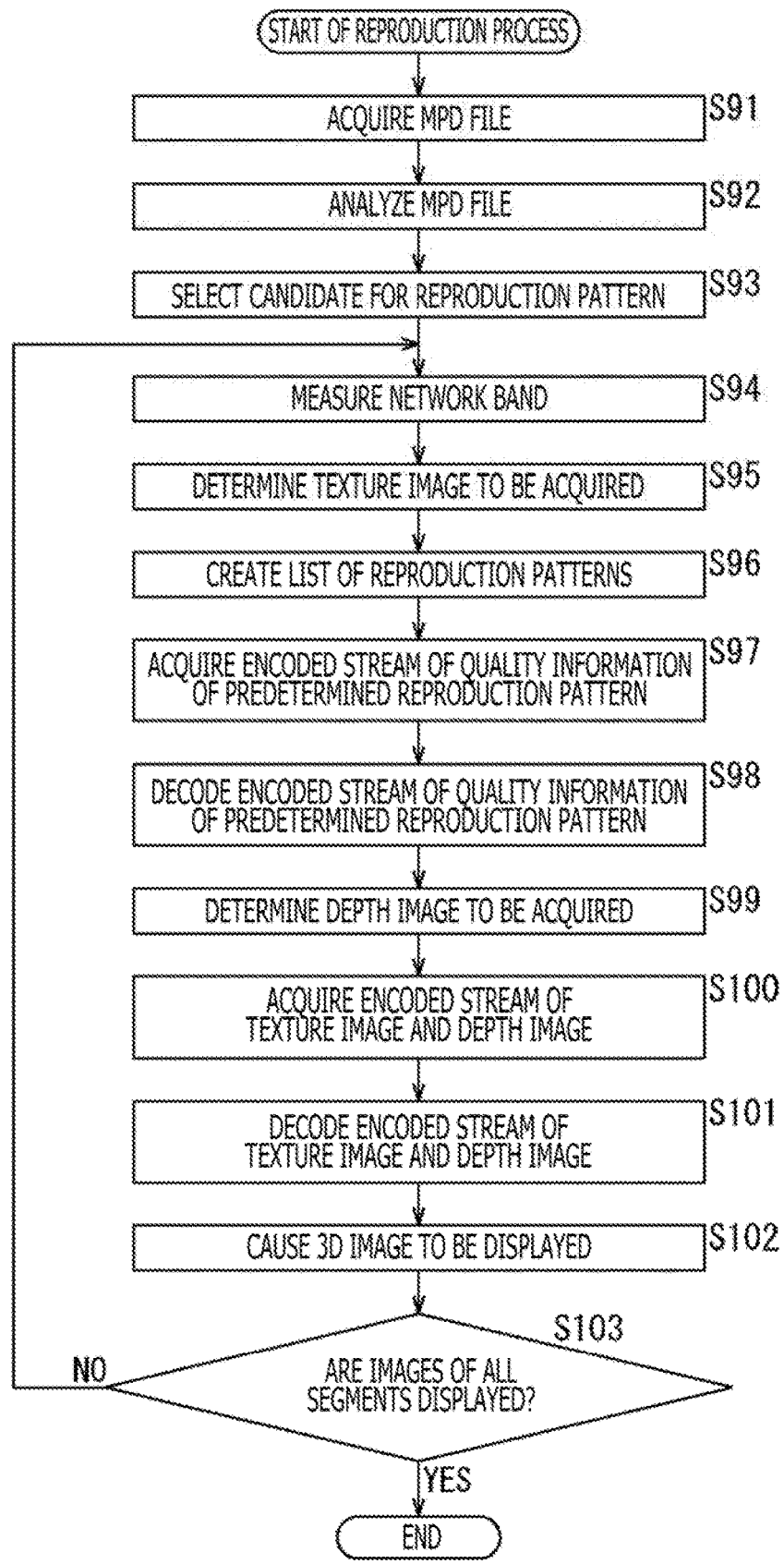
FIG. 19 is a flow chart illustrating a first example of a reproduction process in the third embodiment.

FIG. 19 is a flow chart illustrating a first example of the reproduction process of the streaming reproduction unit 100 in the third embodiment. It is to be noted that, in the reproduction process of FIG. 19, the streaming reproduction unit 100 performs reproduction of a 3D image in which a texture image and a depth image are used.

Processes at steps S91 to S95 of FIG. 19 are similar to the processes at steps S31 to S35 of FIG. 14, respectively, and therefore, description of them is omitted. Processes at steps S94 to S103 are performed in a unit of a segment.

At step S96, the MPD processing unit 102 creates a list of reproduction patterns for reproducing a texture image to be acquired.

For example, it is assumed that the maximum acceptable bit rate of a depth image in the MPD processing unit 102 is 20 percent of a network bandwidth. Then, in the case where the texture image to be acquired is a texture image of the texture file (texture1 file) and the bit rate of depth images of the depth file (depth1 file) and the depth file (depth2 file) is lower than the maximum acceptable bit rate, the MPD processing unit 102 creates a list in which the reproduction patterns 3 and 4 are registered.

On the other hand, in the case where the texture image to be acquired is a texture image of the texture file (texture2 file) and the bit rate of a depth image of the depth file (depth2 file) is lower than the maximum acceptable bit rate, the MPD processing unit 102 creates a list in which the reproduction pattern 7 is registered. Then, the MPD processing unit 102 supplies acquisition information of quality information of the reproduction patterns registered in the list to the quality information acquisition unit 103.

It is to be noted that, in the case where the bit rates of all depth images to be reproduced together with a texture image to be acquired is equal to or higher than the maximum acceptable bit rate, nothing is registered into the list of acquisition candidates for a depth image and only an encoded stream of the texture image is acquired, decoded, and displayed, whereafter the process advances to step S103.

At step S97, the quality information acquisition unit 103 requests, on the basis of the acquisition information supplied from the MPD processing unit 102, the Web server 12 for an encoded stream of metadata including quality information of a predetermined reproduction pattern to acquire the encoded stream. The quality information acquisition unit 103 supplies the acquired encoded stream to the decoding unit 104.

At step S98, the decoding unit 104 decodes the encoded stream of quality information of the predetermined reproduction pattern supplied from the quality information acquisition unit 103 and generates metadata including the quality information of the predetermined reproduction pattern. The decoding unit 104 supplies the quality information of the predetermined reproduction pattern to the MPD processing unit 102.

At step S99, the MPD processing unit 102 determines, on the basis of the quality information supplied from the decoding unit 104, a depth image to be acquired from among depth images registered in the list and to be used for reproduction of a reproduction pattern.

For example, the MPD processing unit 102 determines a depth image to be used in reproduction in a reproduction pattern in which the quality represented by the quality information is best, a reproduction pattern whose quality represented by the quality information is nearest to the quality of a reproduction pattern of the immediately preceding segment (or sub segment), or a reproduction pattern in which the quality represented by the quality information is acceptable quality and besides the bit rate is lowest as a depth image to be acquired.

In the case where a depth image to be used in reproduction in a reproduction pattern whose quality represented by the quality information is nearest to the quality of a reproduction pattern of the immediately preceding segment (or sub segment) is determined as a depth image to be acquired, the sense of incongruity of the appearance of the reproduced 3D image can be reduced. The MPD processing unit 102 supplies acquisition information of the depth image to be acquired to the image acquisition unit 105.

Processes at steps S100 to S103 are similar to the processes at steps S40 to S43 of FIG. 14, respectively, and therefore, description of them is omitted.

It is to be noted that, though not depicted, the reproduction process when the streaming reproduction unit 100 performs reproduction of a 3D image using a texture image, a depth image, and an occlusion image is similar to the reproduction process of FIG. 19 except the following point.

In particular, candidates for a reproduction pattern selected at step S93 of FIG. 19 are the reproduction patterns 5 and 6. Further, the depth image in the processes at steps S99 to S102 is replaced by a depth image and an occlusion image. It is to be noted that, in this case, the maximum acceptable bit rates of the texture image, the depth image, and the occlusion image are, for example, 70 percent, 15 percent, and 15 percent of the network bandwidth, respectively.

(Description of Second Example of Process of Streaming Reproduction Unit)

Figure 20:
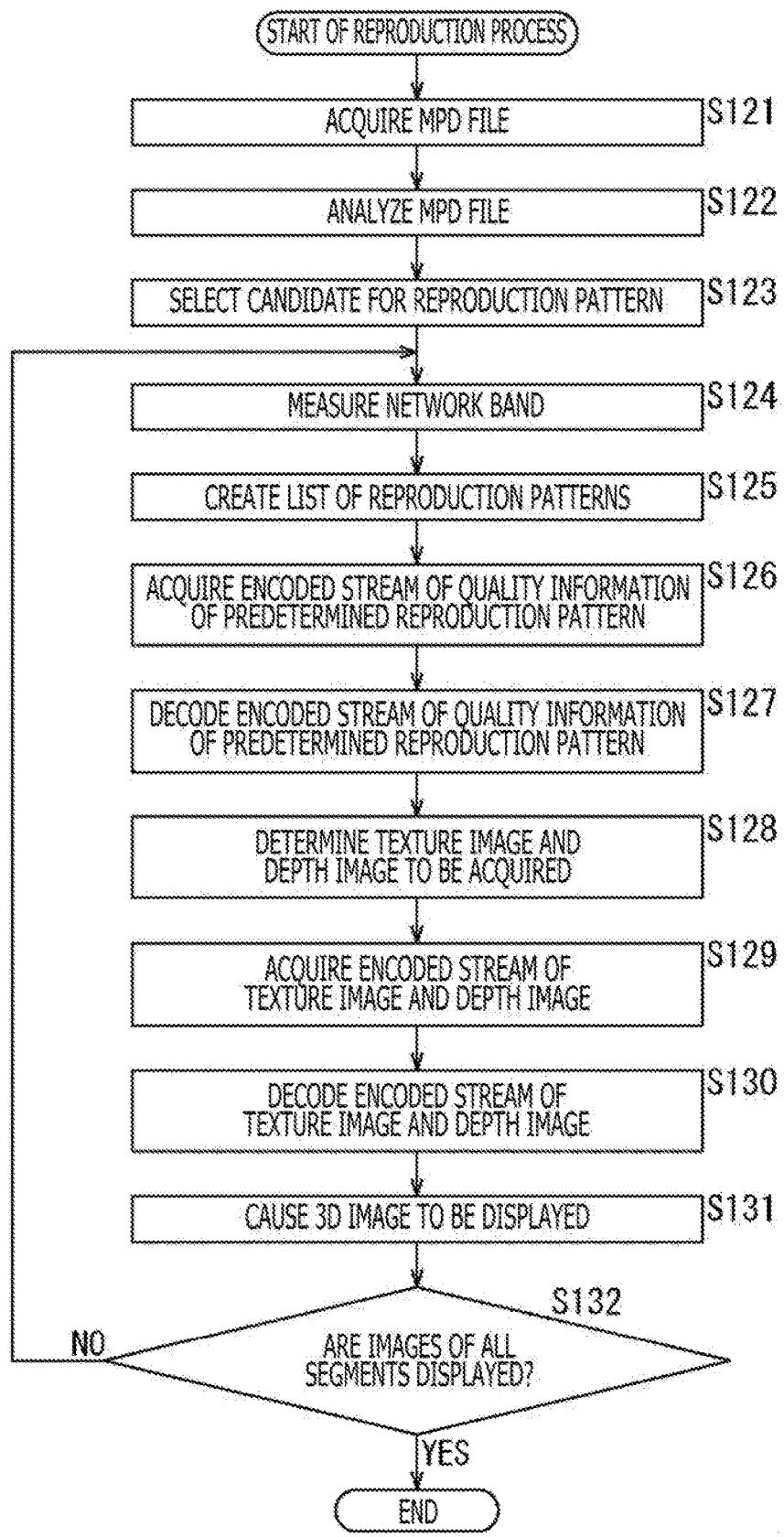
FIG. 20 is a flow chart illustrating a second example of the reproduction process in the third embodiment.

FIG. 20 is a flow chart illustrating a second example of the reproduction process of the streaming reproduction unit 100 in the third embodiment. It is to be noted that, in the reproduction process of FIG. 20, the streaming reproduction unit 100 performs reproduction of a 3D image using a texture image and a depth image.

The reproduction process of FIG. 20 is different from the reproduction process of FIG. 19 principally in that the ratio of the maximum acceptable bit rates for a texture image and a depth image to the network bandwidth is not determined.

Processes at steps S121 to S124 of FIG. 20 are similar to the processes at steps S91 to S94 of FIG. 19, respectively, and therefore, description of them is omitted. Processes at steps S124 to S132 are performed in a unit of a segment.

At step S125, the MPD processing unit 102 creates a list of reproduction patterns on the basis of candidates for a reproduction pattern, the network bandwidth of the Internet 13 supplied from the measurement unit 108, and the bit rates for a texture image and a depth image.

In particular, the MPD processing unit 102 creates a list in which, from among the reproduction patterns 3, 4, and 7, reproduction patterns in which the sum of the bit rates for a texture image and a depth image to be used for reproduction does not exceed the network bandwidth are registered.

It is to be noted that lower limits for the bit rates for a texture image and a depth image may be determined in advance such that, from among the reproduction patterns registered in the list, any reproduction pattern in which at least one of the bit rates for a texture image and a depth image to be used for reproduction is lower than the lower limit therefor is excluded.

Further, in the case where all of the sums of the bit rates for a texture image and a depth image that are used for reproduction in the reproduction patterns 3, 4, and 7 exceed the network bandwidth, nothing is registered to the list of reproduction patterns. Then, only an encoded stream of a texture image of a maximum bit rate that does not exceed the network bandwidth is acquired, decoded, and displayed, and the process advances to step S132.

Processes at steps S126 and S127 are similar to the processes at steps S97 and S98 of FIG. 19, respectively, and therefore, description of them is omitted.

At step S128, the MPD processing unit 102 determines a combination of a texture image and a depth image to be acquired similarly as in the process at S69 of FIG. 15 from among the combinations of a texture image and a depth image to be used for reproduction in the reproduction patterns registered in the list on the basis of the quality information.

Processes at steps S129 to S132 are similar to the processes at steps S100 to S103 of FIG. 19, respectively, and therefore, description of them is omitted.

It is to be noted that, though not depicted, the second example of the reproduction process when the streaming reproduction unit 100 performs reproduction of a 3D image using a texture image, a depth image, and an occlusion image is similar to the reproduction process of FIG. 20 except the following point.

In particular, the candidates for a reproduction pattern selected at step S123 of FIG. 20 are the reproduction patterns 5 and 6. Further, the depth image in the processes at steps S128 to S131 includes both a depth image and an occlusion image.

As described above, the file generation apparatus 11 in the third embodiment divides quality information of a pattern to be reproduced into quality information for each kind of a reproduction pattern and disposes the divisional quality information into different quality files. Accordingly, the number of quality files can be reduced in comparison with that in an alternative case in which quality information is disposed in quality files different among different patterns to be reproduced. Therefore, it can be said that quality information can be stored efficiently. Further, the processing amount relating to acquisition of quality information of the video reproduction terminal 14 can be reduced.

Further, the video reproduction terminal 14 can acquire quality information from a quality file in which only quality information of a reproduction pattern of a kind to be made a candidate is stored. Accordingly, the acquisition efficiency of quality information of a reproduction pattern of a candidate can be improved in comparison with that in an alternative case in which quality information is acquired from quality files in which the quality information of all reproduction patterns is stored.

Fourth Embodiment (Example of Segment File)

The configuration of a fourth embodiment of the information processing system to which the present disclosure is applied is same as the configuration of the third embodiment principally except that an encoded stream of metadata including quality information is divided not for each kind of reproduction pattern but for each texture image used for reproduction and each of the divisions is disposed into a different one of quality files. Accordingly, in the following description, description other than description of a quality file is omitted suitably.

Figure 21:
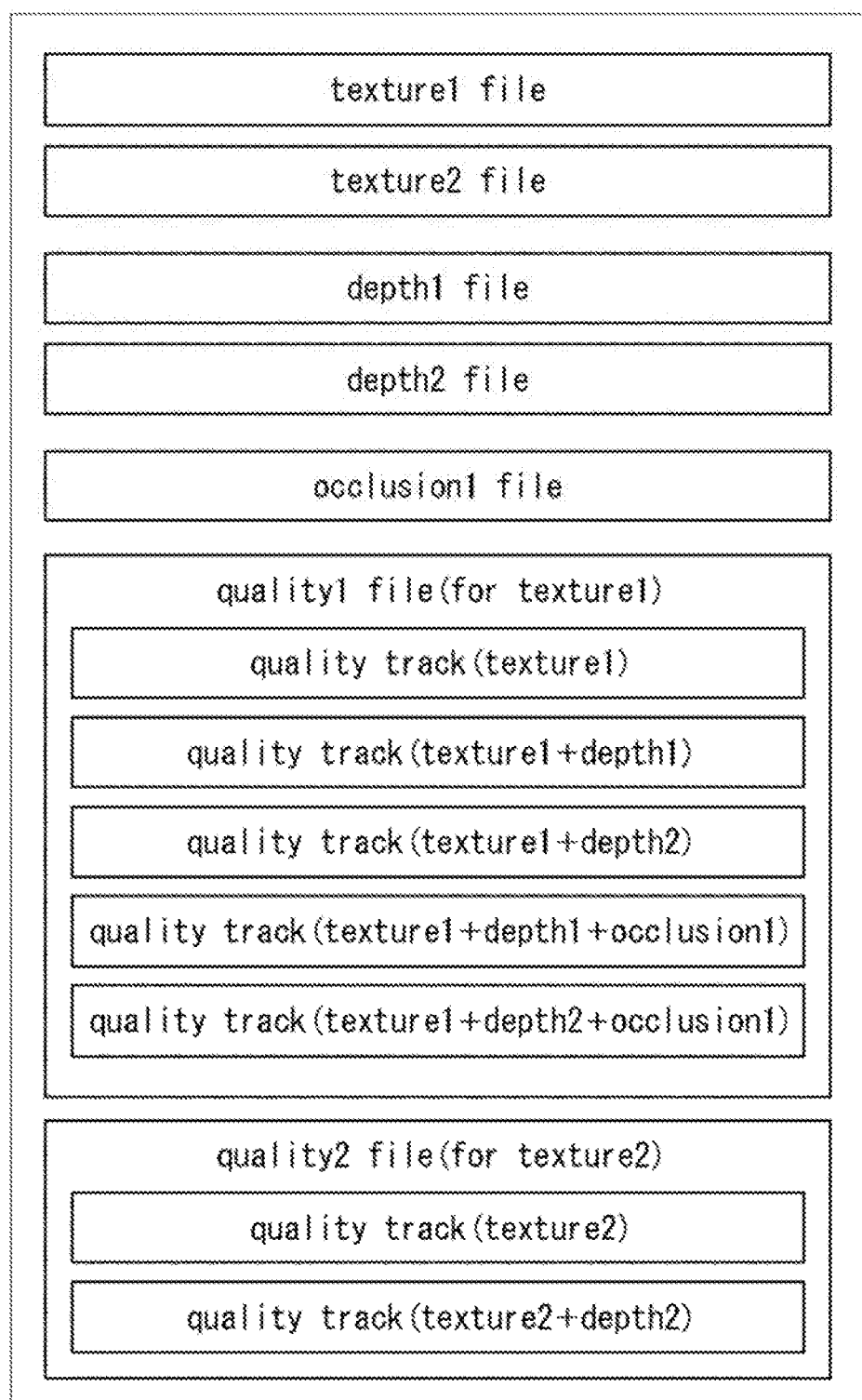
FIG. 21 is a view depicting an example of a segment file in a fourth embodiment of the information processing system to which the present disclosure is applied.

FIG. 21 depicts an example of a segment file generated by the segment file generation unit 83 of the fourth embodiment of the information processing system to which the present disclosure is applied.

The segment file of FIG. 21 is same as the segment file of FIG. 5 except a quality file.

As depicted in FIG. 21, the segment file generation unit 83 divides an encoded stream of metadata including quality information of reproduction patterns 1 to 7 supplied from the encoding unit 82 into two for each texture image to be reproduced in the reproduction patterns. Then, the segment file generation unit 83 disposes the divisions of the encoded stream of metadata in a unit of a segment into the different quality files to generate quality files.

In particular, the segment file generation unit 83 generates a quality file (quality1 file) in which encoded streams of quality information of the reproduction patterns 1 to 5 to be reproduced using a texture file (texture1 file) are disposed in a unit of a segment. In the quality file (quality1 file), the respective encoded streams are disposed in different tracks (quality track(texture1), quality track(texture1+depth1), quality track(texture1+depth2), quality track(texture1+depth1+occlusion), and quality track(texture1+depth2+occlusion)).

Further, the segment file generation unit 83 generates a quality file (quality2 file) in which encoded streams of quality information of the reproduction patterns 6 and 7 to be reproduced using a texture file (texture2 file) are disposed in a unit of a segment. In the quality file (quality2 file), the respective encoded streams are disposed in different tracks (quality track(texture2) and quality track(texture2+depth2)).

As described above, the segment file generation unit 83 files encoded streams of quality information of a reproduction pattern separately for each texture image. Accordingly, by acquiring quality information of a quality file of a texture image to be acquired, the video reproduction terminal 14 can easily acquire quality information of patterns to be reproduced for performing reproduction using the texture image.

Further, though not depicted, the MPD file in the fourth embodiment is similar to the MPD file of FIG. 18 except the following point. In particular, in the MPD file in the fourth embodiment, the number of representation elements included in the adaptation set element for a quality file is two.

associationID a representation element of the first quality file (quality1 file) group has is vt1, vt2, vd1, vd2, and vo1. Further, a representation element of the quality file (quality1 file) includes five sub representation elements having vt1 as the level 1 and associationID, vt1 and vd1 as the level 2 and associationID, vt1 and vd2 as the level 3 and associationID, vt1, vd1, and vo1 as the level 4 and associationID, and vt1, vd2, and vo1 as the level 5 and associationID.

associationID the representation element of the second quality file (quality2 file) has is vt2 and vd2. Further, the representation element of the quality file (quality1 file) includes two sub representation elements individually having the level 1 and vt2 as associationID and the level 2 and vt2 and vd2 as associationID.

Further, though not depicted, the file generation process in the fourth embodiment is same as the file generation process in the third embodiment except that an encoded stream of metadata including quality information is divided not for each kind of reproduction pattern but for each texture image.

Further, though not depicted, the reproduction process in the fourth embodiment is same as the reproduction process of FIG. 19 or FIG. 20.

As described above, the file generation apparatus 11 in the fourth embodiment divides quality information of a pattern to be reproduced for each texture image and disposes the divisions of the quality information into individually different quality files. Accordingly, in comparison with an alternative case in which quality information is disposed in quality files different among different patterns to be reproduced. Therefore, it can be said that quality information of a pattern to be reproduced can be stored efficiently. Further, the processing amount relating to acquisition of quality information of the video reproduction terminal 14 can be reduced.

Further, the video reproduction terminal 14 can acquire quality information from a quality file in which only quality information of a pattern to be reproduced in which reproduction is performed using a texture image of a reproduction target is stored. Accordingly, in comparison with an alternative case in which quality information is acquired from a quality file in which quality information of all reproduction patterns is stored, the acquisition efficiency of quality information of a pattern to be reproduced in which reproduction is performed using a texture image of a reproduction target can be improved.

Fifth Embodiment (Example of Segment File)

The configuration of a fifth embodiment of the information processing system to which the present disclosure is applied is same as the configuration of the third configuration principally except that an encoded stream of metadata including quality information is divided not only for each kind of reproduction pattern but also for each texture image is disposed into a different one of quality files. In particular, the fifth embodiment is a combination of the third embodiment and the fourth embodiment. Accordingly, in the following description, description other than description of a quality file is omitted suitably.

Figure 22:
FIG. 22 is a view depicting an example of a segment file in a fifth embodiment of the information processing system to which the present disclosure is applied.

FIG. 22 depicts an example of a segment file generated by the segment file generation unit 83 of the fifth embodiment of the information processing system to which the present disclosure is applied.

The segment file of FIG. 22 is same as the segment file of FIG. 5 except a quality file.

As depicted in FIG. 22, the segment file generation unit 83 divides encoded streams of metadata including quality information of reproduction patterns 1 to 7 supplied from the encoding unit 82 into five for each kind of reproduction pattern and for each texture image to be used for reproduction in each reproduction pattern. Then, the segment file generation unit 83 disposes the divisions of the encoded streams in a unit of a segment into the different quality files to generate quality files.

In particular, the segment file generation unit 83 generates a quality file (quality1 file) in which an encoded stream of quality information of the reproduction pattern 1 to be reproduced using a texture file (texture1 file) is disposed in a unit of a segment.

Further, the segment file generation unit 83 generates a quality file (quality2 file) in which encoded streams of quality information of the reproduction patterns 3 and 4 to be reproduced using only the texture file (texture1 file) and a depth file are disposed in a unit of a segment. In the quality file (quality2 file), the respective encoded streams are disposed in different tracks (quality track(texture1+depth1) and quality track(texture1+depth2)).

Furthermore, the segment file generation unit 83 generates a quality file (quality3 file) in which encoded streams of quality information of the reproduction patterns 5 and 6 to be reproduced using only the texture file (texture1 file), the depth file, and the occlusion file are disposed in a unit of a segment. In the quality file (quality3 file), the respective encoded streams are disposed on different tracks (quality track(texture1+depth1+occlusion) and quality track(texture1+depth2+occlusion)).

Further, the segment file generation unit 83 generates a quality file (quality4 file) in which an encoded stream of quality information of the reproduction pattern 2 to be reproduced using only the texture file (texture2 file) is disposed in a unit of a segment.

Furthermore, the segment file generation unit 83 generates a quality file (quality5 file) in which an encoded stream of quality information of the reproduction pattern 7 to be reproduced using only the texture file (texture2 file) and the depth file is disposed in a unit of a segment.

As described above, the segment file generation unit 83 files an encoded stream of quality information of a reproduction pattern separately for each kind of reproduction pattern and for each texture image. Accordingly, from a quality file of a pattern to be reproduced in which reproduction is performed using a texture image of a reproduction target, which is a kind of reproduction patterns that become candidates, quality information of a plurality of patterns that become candidates and are to be reproduced in which reproduction is performed using a texture image of the quality file.

Further, though not depicted, the MPD file in the fifth embodiment is similar to the MPD file of FIG. 18 except the following point. In particular, in the MPD file in the fifth embodiment, the number of representation elements included in an adaptation set element for a quality file is five.

associationID a representation element of the first quality file (quality1 file) has is vt1, and associationID a representation element of the fourth quality file (quality4 file) has is vt2. associationID a representation element of the fifth quality file (quality5 file) has is vt2 and vd2.

associationID a representation element of the second quality file (quality2 file) has is vt1, vd1, and vd2. Meanwhile, a representation element of the quality file (quality1 file) includes sub representation elements individually having the level 1 and vt1 and vd1 as associationID and the level 2 and vt1 and vd2 as associationID.

associationID a representation element of the third quality file (quality3 file) has is vt1, vd1, vd2, and vo1. Meanwhile, a representation element of the quality file (quality1 file) includes sub representation elements individually having the level 1 and vt1, vd1, and vo1 as association ID and the level 2 and vt1, vd2, and vo1 as association ID.

Further, though not depicted, the file generation process in the fifth embodiment is same as the file generation process in the third embodiment except that an encoded stream of metadata including quality information is divided not only for each kind of a reproduction pattern but also for each texture image. Further, though not depicted, the reproduction process in the fifth embodiment is same as the reproduction process of FIG. 19 or FIG. 20.

As described above, the file generation apparatus 11 in the fifth embodiment divides quality information of a pattern to be reproduced for each kind of reproduction pattern and for each texture image and disposes the divisions of the quality information into different quality files. Accordingly, in comparison with an alternative case in which quality information is disposed in quality files different among different patterns to be reproduced, the number of quality files can be reduced. Therefore, it can be said that quality information of a pattern to be reproduced can be stored efficiently. Further, the processing amount relating to acquisition of quality information by the video reproduction terminal 14 can be reduced.

Further, the video reproduction terminal 14 can acquire quality information from a quality file in which only quality information of a pattern to be reproduced, which is a kind of reproduction pattern that becomes a candidate and in which reproduction is performed using a texture image of a reproduction target. Accordingly, in comparison with an alternative case in which quality information is acquired from a quality file in which quality information of all reproduction patterns is stored, the acquisition efficiency of quality information of a pattern to be reproduced in which reproduction is performed using a texture image of a reproduction target can be improved.

Sixth Embodiment (Example of Segment File)

The configuration of a sixth embodiment of the information processing system to which the present disclosure is applied is same as the configuration of the information processing system 10 of FIG. 1 principally except that encoded streams of metadata including quality information are disposed collectively into a single quality file. Accordingly, in the following description, description other than description of a quality file is omitted suitably.

Figure 23:
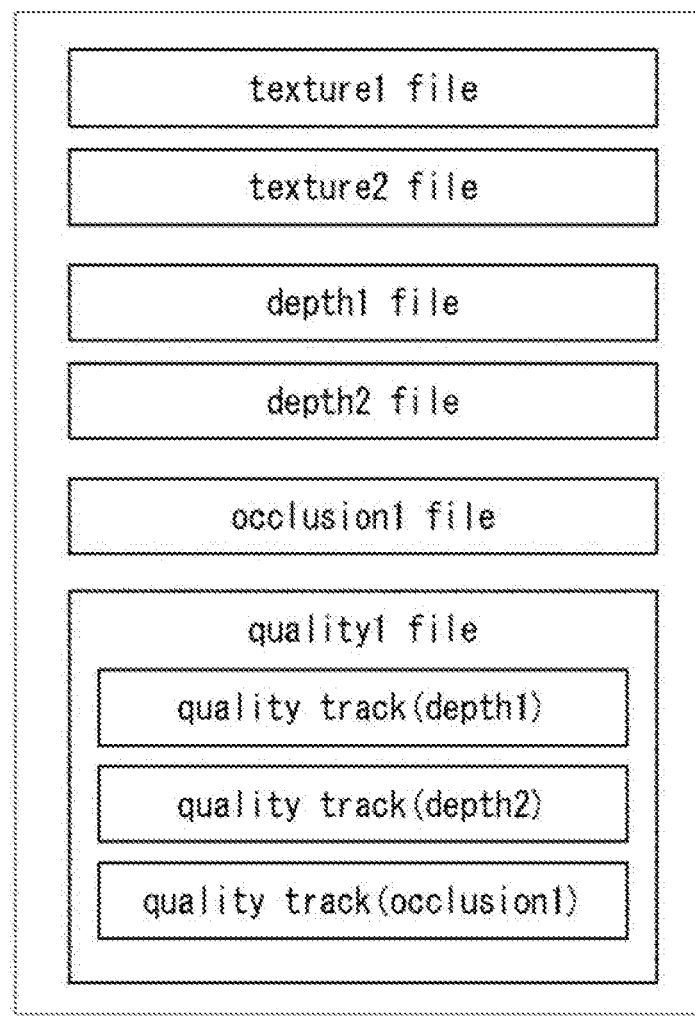
FIG. 23 is a view depicting an example of a segment file in a sixth embodiment of the information processing system to which the present disclosure is applied.

FIG. 23 is a view depicting an example of a segment file generated by the segment file generation unit 83 in the sixth embodiment of the information processing system to which the present disclosure is applied.

The segment file of FIG. 23 is same as the segment file of FIG. 5 except a quality file.

As depicted in FIG. 23, the segment file generation unit 83 generates one quality file (quality1 file) by disposing encoded streams of metadata including quality information of depth images of 2 Mbps and 1 Mbps and an encoded stream of metadata including quality information of an occlusion image of 1 Mbps into one quality file (quality1 file) in a unit of a segment.

In the quality file (quality1 file), different tracks (quality track(depth1), quality track(depth2), and quality track(Occlusion1)) are allocated to the different encoded streams.

(Example of Description of MPD File)

FIG. 24 is a view depicting an example of a description of an MPD file in the sixth embodiment.

The configuration of the MPD file of FIG. 24 is same as the configuration of FIG. 10 except an adaptation set (AdaptationSet) element for a quality file.

In the MPD file of FIG. 24, a quality file (quality1 file) group is grouped by one adaptation set element.

In the adaptation set element for a quality file, a representation element corresponding to the quality file (quality1 file) is described. In the representation element corresponding to the quality file (quality1 file), vq1 is described as Representation id, and "quality1.mp4" is described as BaseURL.

Further, the quality information stored in the quality file (quality1 file) is quality information of the depth file (depth1 file), the depth file (depth2 file), and the occlusion file (occlusion1 file). Accordingly, in the representation element corresponding to the quality file (quality1 file), vd1, vd2, and vo1 that are Representation id of the depth file (depth1 file) group, the depth file (depth2 file), and the occlusion file (occlusion1 file) group are described as associationID.

Further, in the example of FIG. 24, tracks corresponding to the level 1 to the level 3 have stored individually therein quality information of the depth file (depth1 file), the depth file (depth2 file), and the occlusion file (occlusion1 file).

Accordingly, in the representation element corresponding to the quality file (quality1 file) group, <SubRepresentation level="1" associationID="vd1"> that associates the level 1 and vd1 that is Representation id of the depth file (depth1 file) as associationID with each other is described. <SubRepresentation level="2" associationID="vd2"> that associates the level 2 and vd2 that is Representation id of the depth file (depth2 file) as associationID with each other is described. <SubRepresentation level="3" associationID="vo1"> that associates the level 3 and vo1 that is Representation id of the occlusion file (occlusion1 file) as associationID with each other is described.

It is to be noted that, although, in the example of FIG. 24, bandwidth is not described in the adaptation set element for a quality file, it may otherwise be described.

Further, though not depicted, the file generation process in the sixth embodiment is same as the file generation process of FIG. 12 except that the process at step S14 is not performed and encoded streams of metadata including quality information are disposed into one quality file in a unit of a segment at step S15.

Further, though not depicted, the reproduction process in the sixth embodiment is same as the reproduction process in FIG. 14 or FIG. 15.

It is to be noted that, while, in the first and sixth embodiments, a combination of images in a pattern to be reproduced is described in an MPD file, it may not be described. In this case, candidates for a reproduction pattern are selected from among reproduction patterns in which all combinations of images that can be combined are used.

Further, encoded streams of quality information may be disposed in quality files different for the individual encoded streams.

Seventh Embodiment (Example of Configuration of Segment File)

The configuration of a seventh embodiment of the information processing system to which the present disclosure is applied is same as the configuration of the information processing system 10 of FIG. 1 principally except that encoded streams of depth occlusion images and encoded streams of quality information of depth occlusion images are divided for each kind of depth occlusion image and disposed in different segment files and that the encoded streams of quality information within the same segment file are disposed on the same track. Accordingly, in the following description, description other than description of a segment file for each kind of depth occlusion image is omitted suitably.

Figure 25:
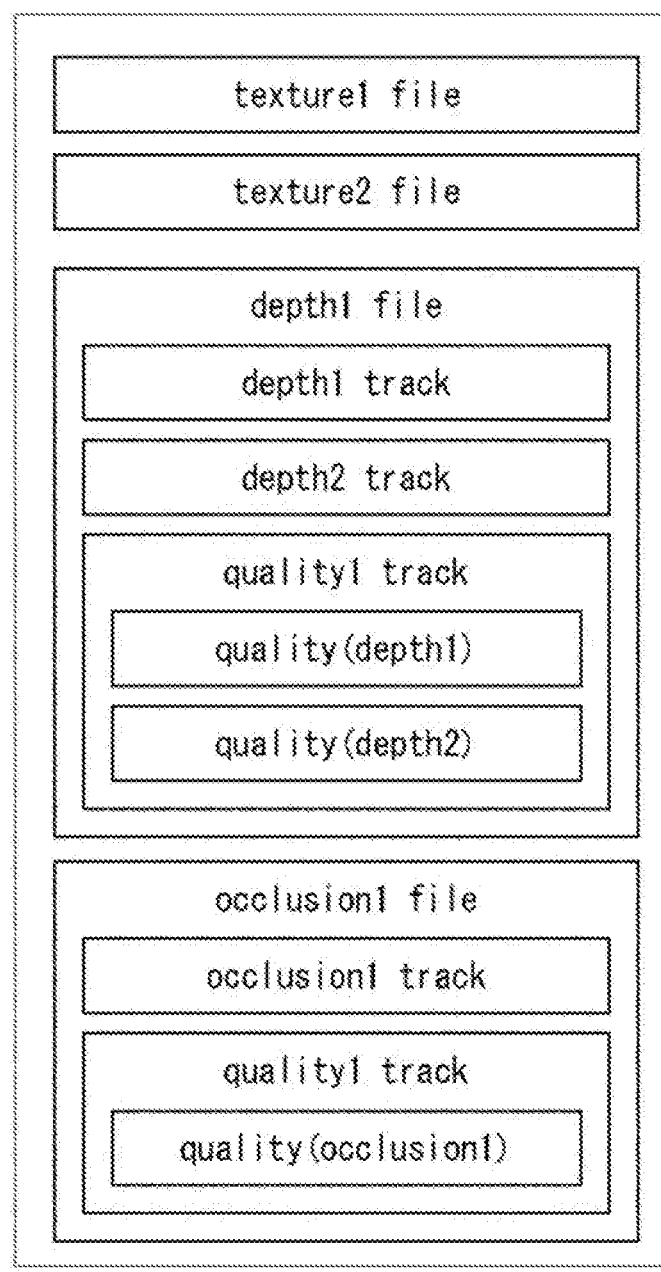
FIG. 25 is a view depicting an example of a segment file in a seventh embodiment of the information processing system to which the present disclosure is applied.

FIG. 25 is a view depicting an example of a segment file generated by the segment file generation unit 83 of the seventh embodiment of the information processing system to which the present disclosure is applied.

The texture file of FIG. 25 is same as the texture file of FIG. 5. As depicted in FIG. 25, the segment file generation unit 83 divides encoded streams of quality information of depth images of 2 Mbps and 1 Mbps and occlusion image of 1 Mbps and encoded streams of depth images of 2 Mbps and 1 Mbps and occlusion image of 1 Mbps into two for each kind of depth occlusion image.

Then, the segment file generation unit 83 generates, in a unit of a segment, a segment file in which encoded streams of divisions of depth images of 2 Mbps and 1 Mbps and an encoded stream of quality information of divisions of a depth image of 1 Mbps are disposed.

In particular, the segment file generation unit 83 generates a depth file (depth1 file) in which encoded streams of depth images of 2 Mbps and 1 Mbps and an encoded stream of quality information of depth images of 2 Mbps and 1 Mbps are disposed.

In the depth file (depth1 file), encoded streams of quality information of depth images of 2 Mbps and 1 Mbps are disposed on the same track (quality1 track), and an encoded stream of a depth image of 2 Mbps and an encoded stream of a depth image of 1 Mbps are disposed on tracks separate from each other (depth1 track, depth2 track).

Accordingly, in the track (quality1 track) of the encoded streams of quality information of the depth images of 2 Mbps and 1 Mbps, both of the encoded streams of the quality information of the depth images of 2 Mbps and 1 Mbps are collectively sampled.

Further, the segment file generation unit 83 generates an occlusion file (occlusion1 file) in which an encoded stream of occlusion image of 1 Mbps and an encoded stream of quality information of occlusion image of 1 Mbps are disposed.

As described above, in the seventh embodiment, encoded streams of quality information disposed in a segment file of the same depth occlusion image are disposed on the same track. Accordingly, in comparison with an alternative case in which encoded streams of quality information disposed on a segment file of the same depth occlusion image are disposed on tracks different from each other for different encoded streams, the track number in a segment file of depth occlusion images can be reduced. As a result, the size of segment files of depth occlusion images can be reduced. Further, the load on the video reproduction terminal 14 can be reduced.

(Example of Configuration of Sample)

FIG. 26 is a view depicting an example of a configuration of a sample of a track (quality1 track) of FIG. 25.

As depicted in FIG. 26, the sample of the track (quality1 track) is divided into two subsamples, into each of which encoded streams of depth images of 2 Mbps and 1 Mbps are disposed in a divided form.

In the example of FIG. 26, in the first subsample of the ith (i=1, 2, . . . , n) sample, an encoded stream (Depth1 Quality i) of a depth image of 2 Mbps is disposed, and in the second subsample, an encoded stream (Depth2 Quality i) of a depth image of 1 Mbps is disposed. Details of the subsample are described in ISO/IEC 23001-10.

(Example of Configuration of Moov Box of Depth File)

Figure 27:
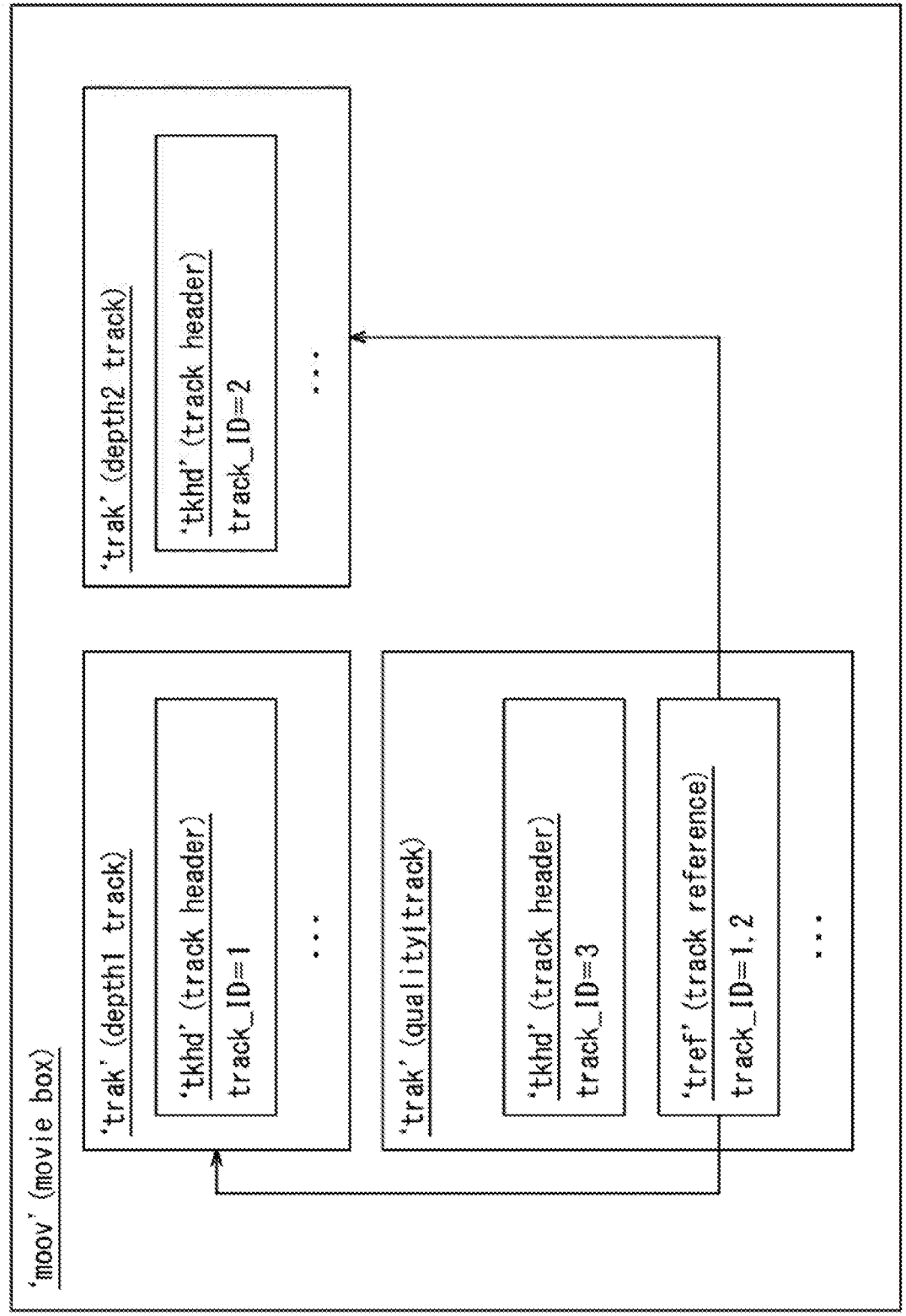
FIG. 27 is a view depicting an example of a configuration of a moov box of a depth file.

FIG. 27 is a view depicting an example of a configuration of a moov box (movie box) of the depth file (depth1 file).

As depicted in FIG. 27, in the moov box of the depth file (depth1 file), a trak box is disposed for each track. In the trak box, a tkhd box (track header box) in which a track ID (track_ID) that is an ID unique to the track is described is disposed.

In the example of FIG. 27, the track ID of the track (depth1 track) in which an encoded stream of a depth image of 2 Mbps is disposed is 1, and the track ID of the track (depth2 track) in which an encoded stream of a depth image of 1 Mbps is disposed is 2. Further, the track ID of the track (quality1 track) in which an encoded stream of quality information of the depth images of 2 Mbps and 1 Mbps is disposed is 3.

Further, in the trak box, a tref box (track reference) in which the track ID of a different track having a relation to the own track is described can be disposed. In particular, the track (quality1 track) is a track on which an encoded stream of quality information of the encoded streams of the depth image disposed on the track (depth1 track) and the track (depth2 track) is stored. Accordingly, on the track (quality1 track), a tref box in which 1 and 2 that are the track IDs of the track (depth1 track) and the track (depth2 track) are described is disposed.

Consequently, the video reproduction terminal 14 can recognize that the track (quality1 track) has accommodated therein an encoded stream of quality information of encoded streams of depth images disposed on the track (depth1 track) and the track (depth2 track).

However, the video reproduction terminal 14 cannot recognize which subsample of the track (quality1 track) stores the encoded stream of the quality information of an encoded stream of the depth image accommodated on the track (depth1 track) or the track (depth2 track).

Accordingly, in the seventh embodiment, a corresponding relationship (hereinafter referred to as subsample track correspondence relationship) between a subsample and a track ID (track specification information) for specifying the track of a depth occlusion image corresponding to the encoded stream of the quality information disposed in the subsample is described. Consequently, the video reproduction terminal 14 can recognize the quality information of an encoded stream of a depth occlusion image stored in each subsample. As a result, the video reproduction terminal 14 can acquire an encoded stream of quality information of each depth occlusion image from the track (quality1 track).

Although, in the seventh embodiment, a subsample track correspondence relationship is described in QualityMetricsConfigurationBox, QualityMetricsSampleEntry, SubsampleInformationBox, or SubsampleReferenceBox, it may otherwise be described in any box other than those described above.

(Example of Description of QualityMetricsConfigurationBox)

FIG. 28 is a view depicting an example of a description of QualityMetricsConfigurationBox in the case where a subsample track correspondence relationship is described in QualityMetricsConfigurationBox disposed in the trak box of the track (quality1 track).

In QualityMetricsConfigurationBox of FIG. 28, field_size_bytes and metric_count are described, and the number of metric_code equal to metric_count is described. field_size_bytes, metric_count, and metric_count are similar to those in the case of FIG. 6 except that the quality file is replaced by the track (quality1 track).

In the seventh embodiment, in the quality file, encoded streams of two kinds of quality information of the track (depth1 track) and the track (depth2 track) are stored in a sample of the track (quality1 track). Accordingly, metric_count is 2.

Meanwhile, in QualityMetricsConfigurationBox, 1 indicating that a subsample track correspondence relationship can be described is set as a flag.

In the case where flag is 1, in QualityMetricsConfigurationBox, referenced_track_in_file_flag indicative of whether a track to be referred to exists in the depth file (depth1 file) including the track (quality1 track) is described for each metric_code.

In the case where referenced_track_in_file_flag of each metric_code is 1, in QualityMetricsConfigurationBox, reference_track_id_num of a subsample corresponding to metric_code and the number of track_id equal to reference_track_id_num are described.

reference_track_id_num is the number of tracks in the depth file (depth1 file) to be referred to. track_id is a track ID of a track in the depth file (depth1 file) to be referred to.

In the seventh embodiment, the first subsample in a sample of the track (quality1 track) corresponds to the track (quality1 track) in the depth file (depth1 file), and the second subsample corresponds to the track (depth2 track). Accordingly, referenced_track_in_file_flag of metric_code corresponding to each subsample is set to 1 that indicates that a track to be referred to exists in the depth file (depth1 file) including the track (quality1 track).

Further, reference_track_id_num of metric_code corresponding to each subsample is 1. Furthermore, track_id of metric_code corresponding to the first subsample is 1 that is the track ID (track specification information) that specifies the track (depth1 track) of a depth image corresponding to an encoded stream of quality information disposed in the subsample. Meanwhile, track_id of metric_code corresponding to the second subsample is 2 that is the track ID of the track (depth2 track) of the depth image corresponding to the encoded stream of quality information disposed in the subsample.

In this manner, in QualityMetricsConfigurationBox, track IDs of depth images corresponding to subsamples are described in an order in which the subsamples are disposed in a sample thereby to describe a subsample track correspondence relationship.

(Example of Description of QualityMetricsSampleEntry)

FIG. 29 is a view depicting an example of a description of QualityMetricsSampleEntry in the case where a subsample track correspondence relationship is described in QualityMetricsSampleEntry disposed in the trak box of the track (quality1 track).

In QualityMetricsSampleEntry of FIG. 29, QualityMetricsReferenceBox is disposed. In QualityMetricsReferenceBox, metric_count is described similarly as in QualityMetricsConfigurationBox of FIG. 28. Further, referenced_track_in_file_flag is described in order of metric_code of QualityMetricsConfigurationBox, and in the case where referenced_track_in_file_flag of each metric_code is 1, reference_track_id_num of this metric_code and the number of track_id equal to reference_track_id_num are described.

(Example of Description of SubsampleInformationBox)

FIG. 30 is a view depicting an example of a description of SubsampleInformationBox in the case where a subsample track correspondence relationship is described in SubsampleInformationBox is disposed in the trak box of the track (quality1 track).

SubsampleInformationBox is a box that describes information relating to a subsample. The trak box can have a plurality of SubSampleInformationBox having values of flags different from each other. In SubsampleInformationBox of FIG. 30, 2 indicating that a subsample track correspondence relationship can be described is set as version.

In the case where version is greater than 1, in SubsampleInformationBox, track_reference_is_exist_flag and referenced_track_in_file_flag are described for each subsample. track_reference_is_exist_flag is a flag indicative of whether there is the necessity for expansion to make it possible to describe a subsample track correspondence relationship. This makes it possible to prevent, when a value equal to or greater than 3 is set as version, expansion that makes it possible to describe a subsample track correspondence relationship from being performed uselessly.

In the seventh embodiment, since it is necessary to expand to make it possible to describe a subsample track correspondence relationship, track_reference_is_exist_flag is set to 1 indicating that it is necessary to expand to make it possible to describe a subsample track correspondence relationship.

In the case where both track_reference_is_exist_flag and referenced_track_in_file_flag of each subsample are 1, in SubsampleInformationBox, reference_track_id_num of the subsample and the number of track_id equal to reference_track_id_num are described.

(Example of Description of SubsampleReferenceBox)

FIG. 31 is a view depicting an example of a description of SubsampleReferenceBox in the case where a subsample track correspondence relationship is described in SubsampleReferenceBox is disposed in the trak box of the track (quality1 track).

In SubsampleReferenceBox of FIG. 31, referenced_track_in_file_flag is described for each subsample, and in the case where referenced_track_in_file_flag of each subsample is 1, the reference_track_id_num of the subsample and the number of track_id equal to reference_track_id_num are described.

(Example of Description of MPD File)

FIG. 32 is a view depicting an example of a description of an MPD file in the seventh embodiment.

The configuration of the MPD file of FIG. 32 is same as the configuration of the MPD file of FIG. 10 except the configuration of the adaptation set element for a depth file and the adaptation set element for an occlusion file and except that the adaptation set element for a quality file is not provided.

In the adaptation set element for a depth file of FIG. 32, a representation element corresponding to a depth file (depth1 file) group is described.

In the representation element corresponding to the depth file (depth1 file), vd1 is described as Representation id, and "depth1.mp4" is described as BaseURL. It is to be noted that, although bandwidth is not described in the example of FIG. 32, bandwidth may otherwise be described.

Further, the texture file to be reproduced together with the depth file (depth1 file) is the texture file (texture1 file) or the texture file (texture2 file). Accordingly, in the representation element corresponding to the depth file (depth1 file), vt1 and vt2 that are Representation id of the texture file (texture1 file) and the texture file (texture2 file) are described.

Furthermore, in the example of FIG. 32, the track (depth1 track) and the track (depth2 track) are associated with the levels 1 and 2, respectively, by a leva box.

Accordingly, in the representation element corresponding to the depth file (depth1 file) group of FIG. 32, <SubRepresentation level="1" associationID="vt1"> that associates the level 1 and vt1 as associationID that is Representation id of the texture file (texture1 file) to be reproduced together with the track (depth1 track) is described.

Similarly, <SubRepresentation level="2" associationID="vt1 vt2"> that associates the level 2 and vt1 and vt2 as associationID that are Representation id of the texture file (texture1 file) and the texture file (texture2 file) to be reproduced together with the track (depth2 track).

In the representation element corresponding to the occlusion file (occlusion1 file) group, vo1 is described as Representation id and "occlusion1.mp4" is described as BaseURL. It is to be noted that, although bandwidth is not described in the example of FIG. 32, bandwidth may otherwise be described.

Further, the depth file to be reproduced together with the occlusion file (occlusion1 file) is the depth file (depth1 file). Accordingly, in the representation element corresponding to the occlusion file (occlusion1 file), vd1 that is Representation id of the depth file (depth1 file) is described as associationID.

It is to be noted that, while, in the example of FIG. 32, the combination of images to be used in a pattern to be reproduced is not described in the MPD file, it may otherwise be described.

Further, though not depicted, the file generation process in the seventh embodiment is same as the file generation process of FIG. 12 except that, in the depth file and the occlusion file generated at step S13, corresponding quality information is disposed and the processes at steps S14 and S15 are not performed.

Furthermore, though not depicted, the reproduction process in the seventh embodiment is same as the reproduction process of FIG. 14 or FIG. 15 except that an encoded stream is acquired referring also to a subsample track correspondence relationship.

In this manner, the file generation apparatus 11 according to the seventh embodiment collectively disposes a plurality of encoded streams of quality information disposed in the segment file of depth occlusion images into one track. Accordingly, in comparison with an alternative case in which encoded streams of different kinds of quality information are disposed on different tracks, the number of tracks that configure a segment file of depth occlusion images can be reduced. In other words, quality information of depth occlusion images can be stored efficiently. Consequently, the size of the segment file of depth occlusion images is reduced. As a result, the transmission amount when the file generation apparatus 11 uploads a segment file of depth occlusion images is reduced.

It is to be noted that, while, in the seventh embodiment, the quality information is quality information of occlusion images, the quality information may otherwise be quality information of a 3D image that is reproduced using a texture image or a texture image and a depth occlusion image.

In this case, for example, a track of a texture image and a track of quality information of the texture image are disposed in a texture file, and a track of a depth image and a track of quality information of a 3D image reproduced using a texture image and the depth image are disposed in a depth file. Further, a track of an occlusion image and a track of quality information of a 3D image reproduced using a texture image, a depth image, and an occlusion image are disposed in an occlusion file.

Eighth Embodiment (Example of Configuration of Segment File)

The configuration of an eighth embodiment of the information processing system to which the present disclosure is applied is same as the configuration of the information processing system 10 of FIG. 1 principally except that encoded streams of quality information in a same quality file are disposed on the same track. Accordingly, in the following description, description other than description of a quality file (quality1 file) is omitted suitably.

Figure 33:
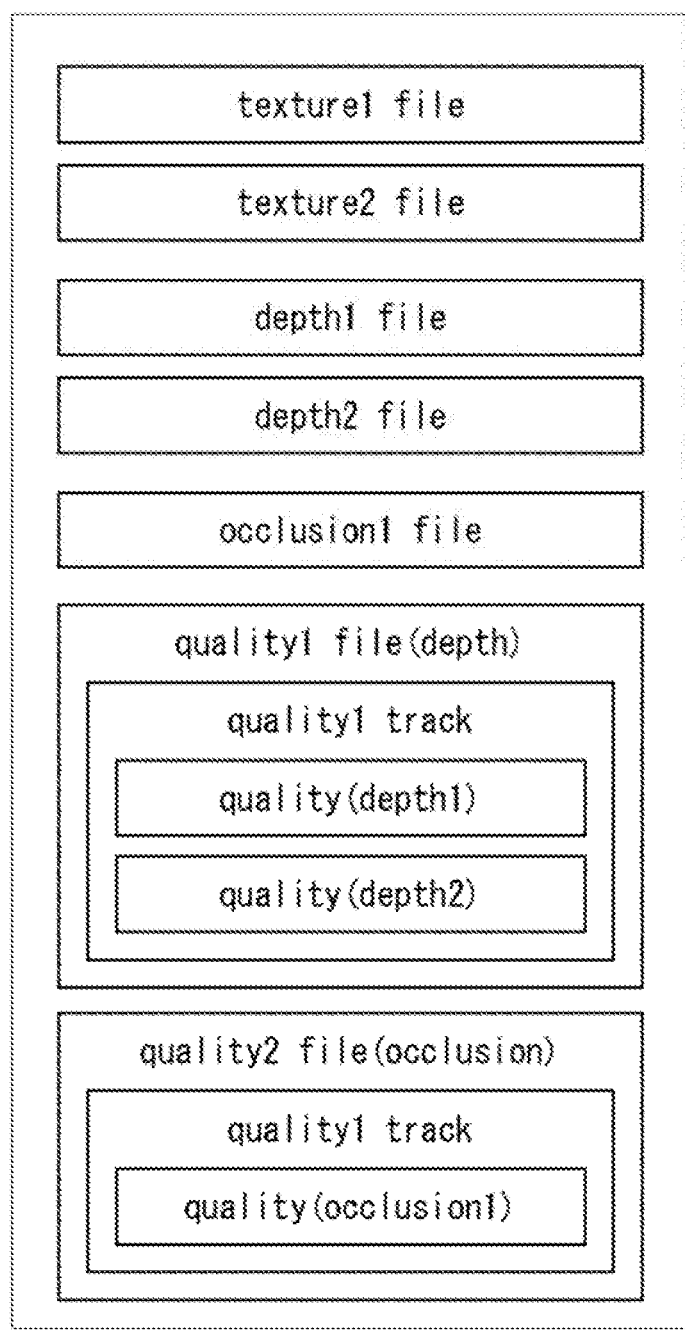
FIG. 33 is a view depicting an example of a segment file in an eighth embodiment of the information processing system to which the present disclosure is applied.

FIG. 33 is a view depicting an example of a segment file generated by the segment file generation unit 83 of the eighth embodiment of the information processing system to which the present disclosure is applied.

The segment file of FIG. 33 is same as the segment file of FIG. 5 except a quality file (quality1 file) of depth images.

As depicted in FIG. 33, the segment file generation unit 83 generates a quality file (quality1 file) in which encoded streams of quality information of depth images of 2 Mbps and 1 Mbps are collectively disposed on one track (quality1 track). On the track (quality1 track), both of the encoded streams of quality information of depth images of 2 Mbps and 1 Mbps are sampled collectively.

The MPD file in the eighth embodiment is same as the MPD file of FIG. 10. In particular, in the MPD file in the eighth embodiment, a correspondence relationship between each level and associationID that specifies a depth occlusion image is described in a representation element corresponding to the quality file (quality1 file).

(First Example of Description of Leva Box)

FIG. 34 is a view depicting a first example of a description of the leva box of the quality file (quality file).

As depicted in FIG. 34, in the leva box of the quality file (quality file), level_count indicative of the number of levels a sub representation element, which corresponds to a quality file (quality file) described in the MPD file, has is described.

Further, in the leva box of the quality file (quality file), the number, equal to level_count, of track_id, assignment_type and so forth of each level are described in order beginning with the level 1. assignment_type is a type of something associated with the level.

In the leva box of FIG. 34, 5 can be set as assignment_type. In the example of FIG. 34, 5 as assignment_type represents that the type associated with the level is metric_code described in QualityMetricsConfigurationBox. In particular, in the case where assignment_type is 5, the level i (i=1, 2) and the ith metric_code from the top describe in QualityMetricsConfigurationBox are associated with each other.

(Description of First Example of Level and Subsample Associated by Leva Box)

Figure 35:
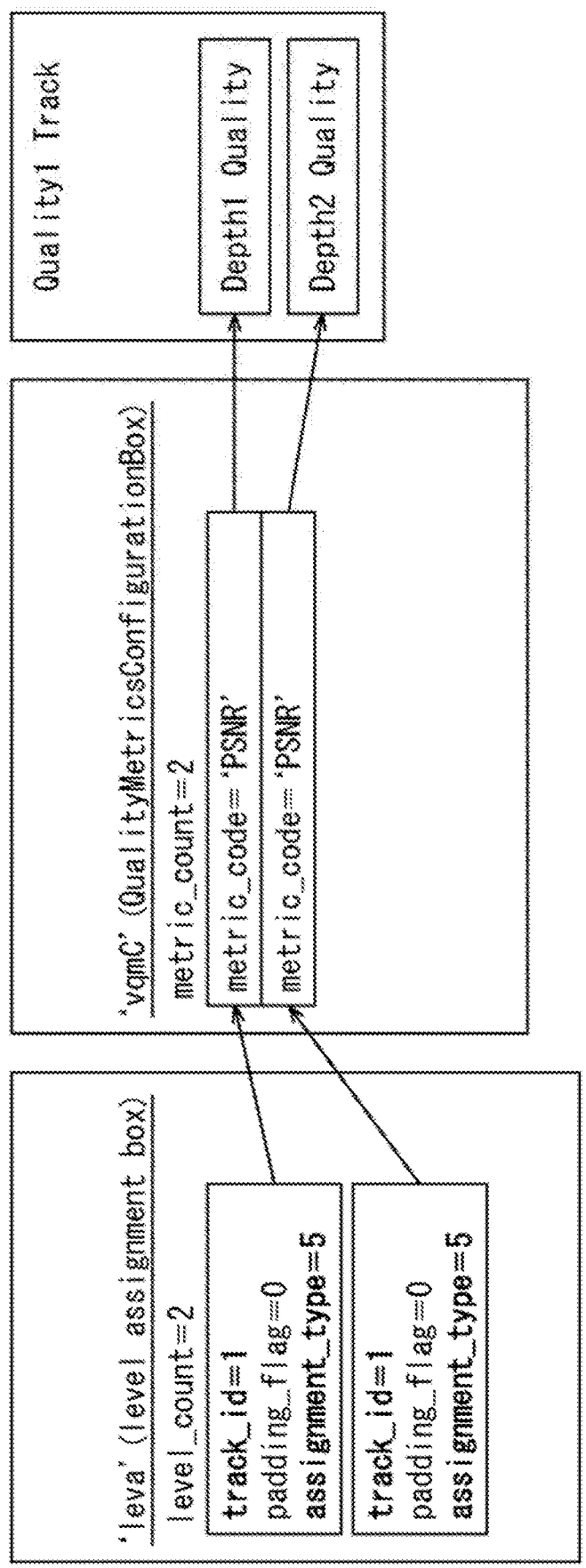
FIG. 35 is a view illustrating a first example of a level and a subsample associated with each other by the leva box of FIG. 34.

FIG. 35 is a view illustrating a first example of the level and the subsample in the quality file (quality1 file) associated with each other by the leva box of FIG. 34.

In the MPD file of the eighth embodiment, the number of levels the sub representation element corresponding to the quality file (quality1 file) has is two. Accordingly, as depicted in FIG. 35, 2 is described as level_count in the leva box of the quality file (quality file).

Further, the track corresponding to the two levels is the track (quality1 track) whose track ID is 1. Accordingly, in the leva box of the quality file (quality file), 1 is described as track_id of the two levels. Further, 5 is described as assignment_type of the two levels.

Accordingly, by the leva box of FIG. 35, the level i each sub representation element has can be associated with the ith metric_code from the top described in QualityMetricsConfigurationBox. Further, by the description of QualityMetricsConfigurationBox, the ith metric_code from the top described in QualityMetricsConfigurationBox and the ith subsample from the top can be associated with each other.

As described above, by describing 5 as assignment_type of the leva box, the level 1 described in the MPD file and the ith subsample can be associated with each other. Accordingly, 5 as assignment_type can be said as information that associates a level and a subsample with each other.

(Second Example of Description of Leva Box)

FIG. 36 is a view depicting a second example of a description of the leva box of the quality file (quality file).

The leva box of the quality file (quality file) of FIG. 36 has a configuration same as that of FIG. 34 except a case in which 5 is set as assignment_type.

In the example of FIG. 36, 5 as assignment_type represents that the type of something associated with a level is a subsample in which information is described in a subs box (Sub-Sample Information Box). In particular, in the case where assignment_type is 5, the level i and the ith subsample from the top in which information is described in the subs box. Further, in the leva box of FIG. 36, in the case where assignment_type is 5, flags of the subs box associated with the level i is described.

(Description of Second Example of Level and Subsample Associated by Leva Box)

Figure 37:
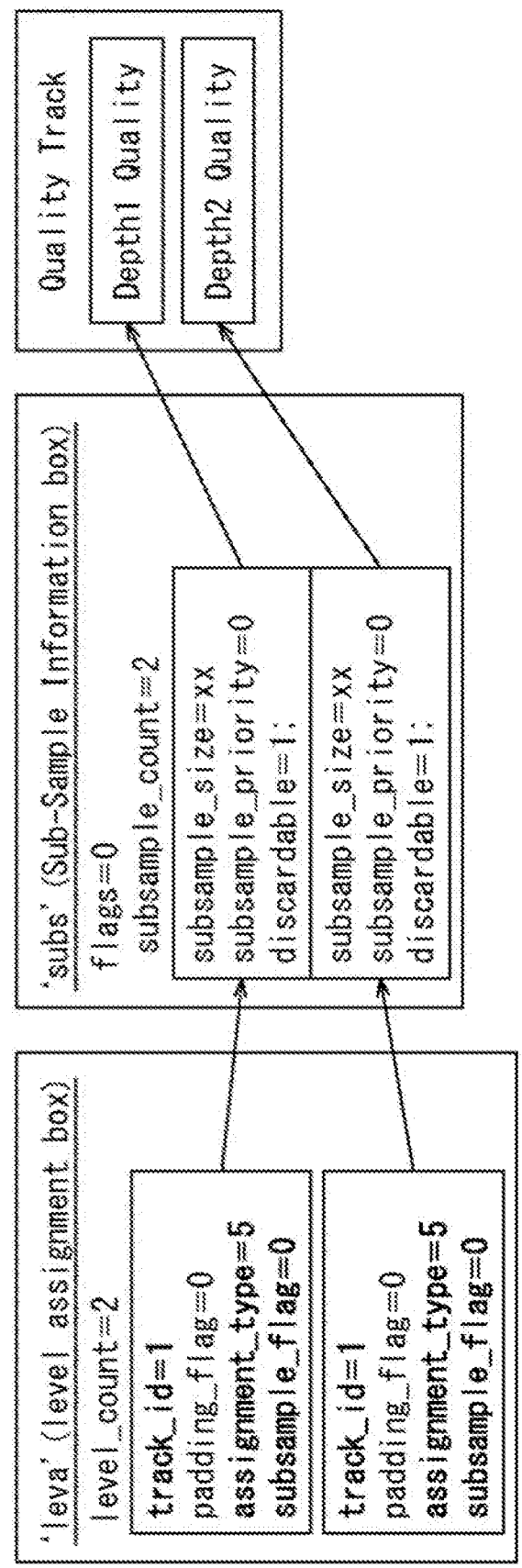
FIG. 37 is a view illustrating a second example of a level and a subsample associated with each other by the leva box of FIG. 36.

FIG. 37 is a view illustrating a second example of a level and a subsample in the quality file (quality1 file) associated with each other by the leva box of FIG. 36.

The leva box of FIG. 37 is same as the leva box of FIG. 35 except that 0 is described as subsample_flag of each level.

Accordingly, by the leva box of FIG. 37, the level i each sub representation element has can be associated with the ith subsample from the top in which information is described in the subs box whose flags is 0. Further, by the description of the subs box, the ith subsample from the top in which information is described in the subs box can be specified.

By describing 5 as assignment_type of the leva box in such a manner as described above, a level and a subsample described in the MPD file can be associated with each other. Accordingly, 5 as assignment_type can be said as information that associates a level and a subsample with each other.

It is to be noted that two subsamples disposed on the track (quality1 track) may be grouped into one group. In this case, a subsample group entry (Sub-SampleGroupEntry) depicted in FIG. 38 is disposed in the trak box of the track (quality1 track).

The subsample group entry of FIG. 38 is an expanded one of SampleGroupDescriptionEntry on which not only a subsample in which an image is to be stored but a subsample group entry of a subsample in which any other than an image is to be stored are based.

In the subsample group entry of FIG. 38, a type (in the example of FIG. 38, sgss) of the group of the subsample is described. Further, in the subsample group entry of FIG. 38, code_parameter that is a name of a sample entry of a subsample belonging to the group and sub_sample_flags that is flags of the subs box are described.

Figure 39:
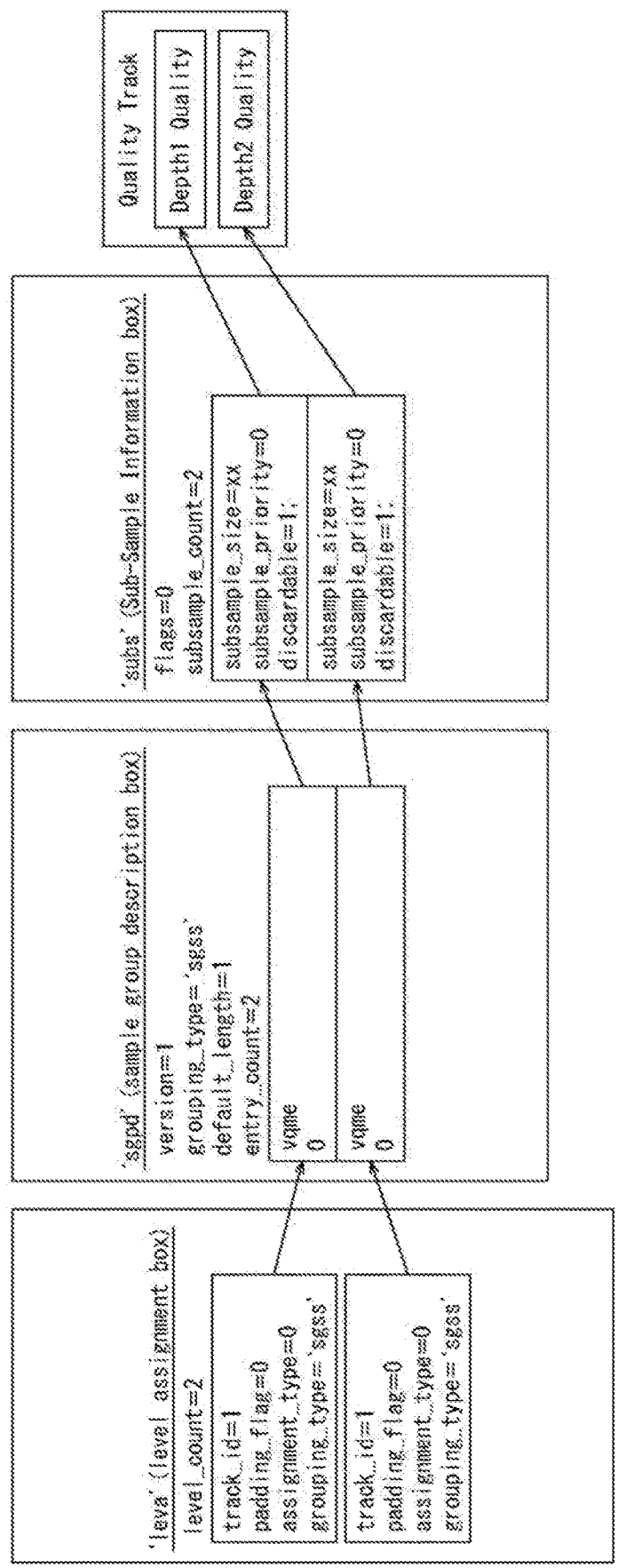
FIG. 39 is a view illustrating a third example of a level and a subsample associated with each other by the leva box.
Figure 40:
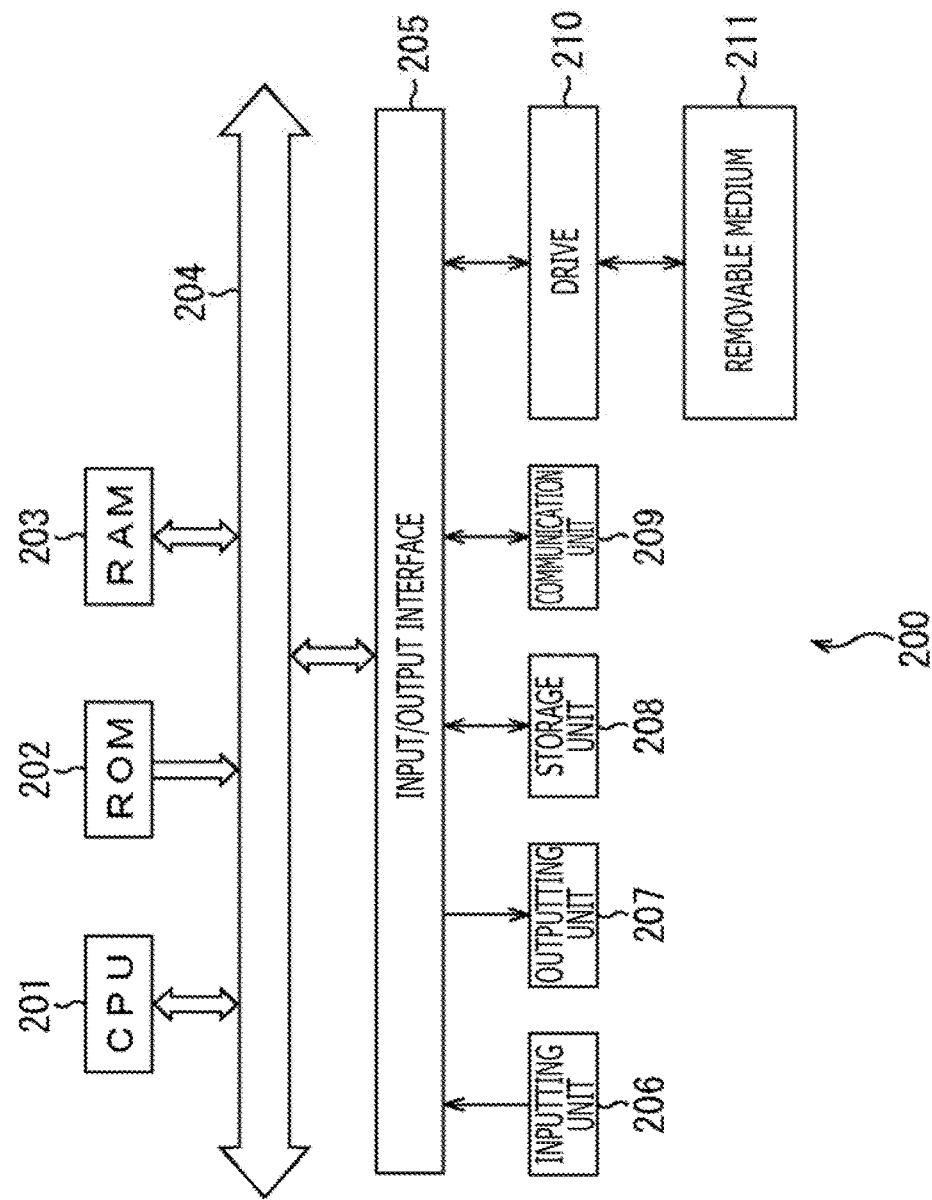
FIG. 40 is a block diagram depicting an example of a configuration of hardware of a computer.

Further, as depicted in FIG. 39, assignment_type of the leva box is set to 0 that represents that the type of a thing associated with the level is information relating to a sample belonging to a predetermined group described in an sgpd box (sample group description box).

Furthermore, in the leva box, not subsample_flag but grouping_type described in the sgpd box associated with the level i (i=1, 2) is described. grouping_type is a type of a group of a sub subsample corresponding to the sgpd box. In the example of FIG. 36, the type of a group to which two subsamples disposed on the track (quality1 track) belong is sgss, and grouping_type corresponding to each level of the leva box is sgss for both of them.

By the leva box of FIG. 39, the level i each sub representation element has is associated with information described in the sgpd box and relating to the ith subsample from the top in the information relating to a subsample belonging to a group whose grouping_type is sgss.

As the information relating to a subsample, the name of the sample entry of the sample configuring the subsample and flags of the subs box are described. In the example of FIG. 36, both of the names of the sample entries of the sample configuring the two subsamples disposed on the track (quality1 track) are vqme, and flags of both of them is zero. Accordingly, in the sgpd box, vqme and 0 are described as the information relating to each subsample.

By the description of the sgpd box, the level i each sub representation element has can be associated with the ith subsample from the top whose flag is 0 and in which information is described in the subs box of the sample in which the name of the sample entry is vqme. Then, by the description of the subs box, the ith subsample from the top in which information is described in the subs box can be specified.

In this manner, a level and a subsample described in an MPD file can be associated with each other by the leva box of FIG. 39.

It is to be noted that, in the eighth embodiment, a quality file may be divided as in the second to sixth embodiments.

Further, although, in the first to eighth embodiments, a sub representation element is expanded such that associationID can be described, the sub representation element may be expanded such that an attribute other than associationId can be described.

For example, an attribute such as SubassociationId or the like in which RepresentationID corresponding to a sub representation element is described may be defined newly and the sub representation element may be expanded such that such attribute can be described.

For example, the sub representation element may be expanded such that dependencyId that is attribute indicative of an ID of a track that requires reference upon decoding can be described also in the sub representation element, and RepresentationID corresponding to the sub representation element may be described as dependencyId of the sub representation element.

It is to be noted that attribute of the sub representation element indicative of a correspondence relationship between the sub representation element and RepresentationID can be used also when a relationship between a texture image and a depth occlusion image or a relationship other than the relationship between a depth occlusion image and quality information is to be represented.

Ninth Embodiment (Description of Computer to which Present Disclosure is Applied)

While the series of processes described above can be executed by hardware, it may otherwise be executed by software. Where the series of processes is executed by software, a program that constructs the software is installed into a computer. Here, the computer includes a computer incorporated in hardware for exclusive use, for example, a personal computer for universal use that can execute various functions by installing various programs, and so forth.

FIG. 40 is a block diagram depicting an example of a configuration of hardware of a computer that executes the series of processes described hereinabove in accordance with a program.

In a computer 200, a CPU (Central Processing Unit) 201, a ROM (Read Only Memory) 202, and a RAM (Random Access Memory) 203 are connected to each other by a bus 204.

To the bus 204, an input/output interface 205 is connected further. To the input/output interface 205, an inputting unit 206, an outputting unit 207, a storage unit 208, a communication unit 209, and a drive 210 are connected.

The inputting unit 206 is configured from a keyboard, a mouse, a microphone and so forth. The outputting unit 207 is configured from a display, a speaker and so forth. The storage unit 208 is configured from a hard disk, a nonvolatile memory and so forth. The communication unit 209 is configured from a network interface and so forth. The drive 210 drives a removable medium 211 such as a magnetic disk, an optical disk, a magneto-optical disk, a semiconductor memory or the like.

In the computer 200 configured in such a manner as described above, the CPU 201 loads a program stored, for example, in the storage unit 208 into the RAM 203 through the input/output interface 205 and the bus 204 and executes the program to perform the series of processes described hereinabove.

The program executed by the computer 200 (CPU 201) can be recorded on and provided as the removable medium 211, for example, as a package medium or the like. Further, the program can be provided through a wired or wireless transmission medium such as a local area network, the Internet, or a digital satellite broadcast.

In the computer 200, the program can be installed into the storage unit 208 through the input/output interface 205 by loading the removable medium 211 into the drive 210. Further, the program can be received by the communication unit 209 through a wired or wireless transmission medium and installed into the storage unit 208. Furthermore, it is possible to install the program in advance into the ROM 202 or the storage unit 208.

It is to be noted that the program executed by the computer 200 may be a program by which processes are performed in a time series in accordance with an order described in the present specification or a program in which processes are performed in parallel or are performed at a timing at which the program is called or the like.

It is to be noted that, in the present specification, the term system signifies a set of a plurality of components (apparatus, modules (parts) and so forth) and it does not matter whether or not all components are provided in the same housing. Accordingly, either of a plurality of apparatuses accommodated in separate housings and connected to each other through a network and one apparatus in which a plurality of modules are accommodated in one housing configures a system.

Further, the effects described in the present specification are exemplary only and shall not be restrictive, and other effects may be available.

Furthermore, the embodiment of the present disclosure is not limited to the embodiments described hereinabove and can be altered in various manners without departing from the subject matter of the present disclosure.

For example, the segment file of occlusion images may not be generated. In particular, the present disclosure can be applied to an information processing system in which a segment file including only depth images or depth-related images including both depth images and occlusion images, namely, depth-related images including at least depth images, is generated.

It is to be noted that the present disclosure can have such configurations as described below (1)

A file generation apparatus including:

a file generation unit configured to generate a management file that manages a file in which quality information representative of quality of a plurality of depth-related images including at least a depth image is disposed in a form divided in a plurality of tracks or subsamples and the management file in which a correspondence relationship between the respective tracks or subsamples and depth-related image specification information for specifying the depth-related images is described.

(2)

The file generation apparatus according to (1) above, in which the file generation apparatus is configured such that the file generation apparatus describes combinations of, from among texture images corresponding to the plurality of depth-related images and the plurality of depth-related images, the texture images and the depth-related images that become use candidates upon reproduction into the management file.

(3)

The file generation apparatus according to (1) or (2) above, in which the file generation apparatus is configured such that the depth-related images include an occlusion image that is a texture image of an occlusion region corresponding to the depth image.

(4)

The file generation apparatus according to any one of (1) to (3) above, in which the file generation apparatus is configured such that the quality information of the depth-related images is information representative of quality of a 3D image to be generated using texture images corresponding to the depth-related images and the depth-related images, and in the management file, a correspondence relationship between the respective tracks and the depth-related image specification information and texture image specification information for specifying the texture images is described.

(5)

The file generation apparatus according to (4) above, in which the file generation apparatus is configured such that, in the file, quality information of the texture images corresponding to the depth-related images is disposed on a track different from a track of the quality information of the depth-related images, and in the management file, a correspondence relationship between the track of the quality information of the texture images and texture image specification information for specifying the texture images is described.

(6)

The file generation apparatus according to any one of (1) to (3) above, in which the file generation apparatus is configured such that, in the file, information that associates the subsamples and levels with each other is described, and in the management file, a correspondence relationship between the levels and the depth-related image specification information is described.

(7)

A file generation method, in which a file generation apparatus includes a file generation step of generating a management file that manages a file in which quality information representative of quality of a plurality of depth-related images including at least a depth image is disposed in a form divided in a plurality of tracks or subsamples and the management file in which a correspondence relationship between the respective tracks or subsamples and depth-related image specification information for specifying the depth-related images is described.

(8)

A reproduction apparatus including:

an acquisition unit configured to acquire, on a basis of a management file that manages a file in which quality information representative of quality of a plurality of depth-related images including at least a depth image is disposed in a form divided in a plurality of tracks or subsamples and the management file in which a correspondence relationship between the respective tracks or subsamples and depth-related image specification information for specifying the depth-related images is described, the quality information of at least part of the plurality of depth-related images.

(9)

The reproduction apparatus according to (8) above, in which the reproduction apparatus is configured such that bit rates of the plurality of depth-related images are different from each other, in the management file, the bit rates of the plurality of depth-related images are described, and the acquisition unit acquires the quality information of at least part of the plurality of depth-related images on a basis of the bit rates of the plurality of depth-related images and the correspondence relationship.

(10)

The reproduction apparatus according to (9) above, in which the reproduction apparatus is configured such that, in the file, texture images corresponding to the plurality of depth-related images are disposed, in the management file, bit rates of the texture images are described, and the acquisition unit acquires the quality information of at least part of the plurality of depth-related images on a basis of the bit rates of the texture images.

(11)

The reproduction apparatus according to (10) above, in which the reproduction apparatus is configured such that in the file, a plurality of the texture images having different bit rates from each other are disposed and in the management file, the bit rates of the plurality of texture images are described.

(12)

The reproduction apparatus according to (8) or (9) above, in which the reproduction apparatus is configured such that the acquisition unit selects a texture image of a reproduction target from among the plurality of texture images on a basis of bit rates of a plurality of the texture images whose bit rates are different from each other.

(13)

The reproduction apparatus according to any one of (8) to (12) above, in which the reproduction apparatus is configured such that the quality information is information representative of quality of a 3D image to be generated using texture images corresponding to the depth-related images and the depth-related images.

(14)

The reproduction apparatus according to any one of (8) to (13) above, in which the reproduction apparatus is configured such that combinations of, from among texture images corresponding to the plurality of depth-related images and the plurality of depth-related images, the texture images and the depth-related images that become use candidates upon reproduction are described in the management file, and the acquisition unit acquires the quality information of at least part of the plurality of depth-related images on a basis of the combinations and the correspondence relationship.

(15)

The reproduction apparatus according to any one of (8) to (14) above, further including:

a reproduction unit configured to reproduce a given depth-related image from among the plurality of depth-related images on a basis of the quality information acquired by the acquisition unit.

(16)

A reproduction method, in which a reproduction apparatus includes:

an acquisition step of acquiring, on a basis of a management file that manages a file in which quality information representative of quality of a plurality of depth-related images including at least a depth image is disposed in a form divided in a plurality of tracks or subsamples and the management file in which a correspondence relationship between the respective tracks or subsamples and depth-related image specification information for specifying the depth-related images is described, the quality information of at least part of the plurality of depth-related images.

REFERENCE SIGNS LIST

11 File generation apparatus, 14 Video reproduction terminal, 83 Segment file generation unit, 84 MPD file generation unit, 103 Quality information acquisition unit, 105 Image acquisition unit, 106 Decoding unit, 107 Output controlling unit

The invention claimed is:

1. A file generation apparatus comprising:
a file generation unit configured to
    generate a Media Presentation Description (MPD) file in which link information that specifies a plurality of tracks included in a quality file is described, wherein the MPD file is configured by assigning the plurality of tracks to respective plurality of quality information regarding quality of two or more depth images, and
    generate a plurality of AssociationIDs for the respective plurality of tracks as access information, wherein a respective AssociationID of the plurality of AssociationIDs is information to specify a respective depth image of the two or more depth images associated with a respective quality information of the plurality of quality information corresponding to a respective track of the plurality of tracks,
wherein the file generation unit is implemented via at least one processor.

2. The file generation apparatus according to claim 1, wherein
the MPD file describes combinations of, from among the two or more depth images and texture images corresponding to the two or more depth images, the texture images and the depth images of the two or more depth images that become use candidates upon reproduction into the MPD file.

3. The file generation apparatus according to claim 1, wherein
the two or more depth images include an occlusion image that is a texture image of an occlusion region corresponding to the depth image.

4. The file generation apparatus according to claim 1, wherein
the plurality of quality information of the two or more depth images is information representative of quality of a 3D image to be generated using the two or more depth images and texture images corresponding to the two or more depth images, and
in the MPD file, a correspondence relationship between the respective track and the respective AssociationID and texture image specification information for specifying the texture images is described.

5. The file generation apparatus according to claim 4, wherein
in the MPD file, quality information of the texture images corresponding to the two or more depth images is disposed on a track different from a track of the plurality of quality information of the two or more depth images, and
in the MPD file, a correspondence relationship between the track of the quality information of the texture images and texture image specification information for specifying the texture images is described.

6. The file generation apparatus according to claim 1, wherein
the plurality of quality information representative of the two or more depth images is disposed in a form divided in the plurality of tracks or subsamples,
in the MPD file, information that associates the subsamples and levels with each other is described, and
in the MPD file, a correspondence relationship between the levels and the plurality of AssociationIDs is described.

7. A file generation method, wherein the method includes:
generating a Media Presentation Description (MPD) file in which link information that specifies a plurality of tracks included in a quality file is described, wherein the MPD file is configured by assigning the plurality of tracks to respective plurality of quality information regarding quality of two or more depth images; and
generating a plurality of AssociationIDs for the respective plurality of tracks as access information, wherein a respective AssociationID of the plurality of AssociationIDs is information to specify a respective depth image of the two or more depth images associated with a respective quality information of the plurality of quality information corresponding to a respective track of the plurality of tracks.

8. A reproduction apparatus comprising:
an acquisition unit configured to acquire, on a basis of a Media Presentation Description (MPD) file in which link information that specifies a plurality of tracks included in a quality file is described and configured by assigning the plurality of tracks to respective plurality of quality information regarding quality of two or more depth images, the quality information of at least part of the two or more depth images, wherein the MPD file includes a plurality of Association-IDs for the respective plurality of tracks as access information, wherein a respective Association ID of the plurality of Association IDs is information to specify a respective depth image of the two or more depth images associated with a respective quality information of the plurality of quality information corresponding to a respective track of the plurality of tracks, and wherein the acquisition unit is implemented via at least one processor.

9. The reproduction apparatus according to claim 8, wherein bit rates of the two or more depth images are different from each other, in the MPD file, the bit rates of the two or more depth images are described, and the acquisition unit acquires the quality information of at least part of the two or more depth images on a basis of the bit rates of the two or more depth images and the correspondence relationship.

10. The reproduction apparatus according to claim 9, wherein in the MPD file, texture images corresponding to the two or more depth images are disposed, in the MPD file, bit rates of the texture images are described, and the acquisition unit acquires the quality information of at least part of the two or more depth images on a basis of the bit rates of the texture images.

11. The reproduction apparatus according to claim 10, wherein in MPD the file, a plurality of the texture images having different bit rates from each other are disposed, and in the MPD file, the bit rates of the plurality of texture images are described.

12. The reproduction apparatus according to claim 8, wherein the acquisition unit selects a texture image of a reproduction target from among the plurality of texture images on a basis of bit rates of a plurality of the texture images whose bit rates are different from each other.

13. The reproduction apparatus according to claim 8, wherein the quality information is information representative of quality of a 3D image to be generated using texture images corresponding to the two or more depth images and the two or more depth images.

14. The reproduction apparatus according to claim 8, wherein combinations of, from among texture images corresponding to the two or more depth images and the two or more depth images, the texture images and the depth images of the two or more depth images that become use candidates upon reproduction are described in the MPD file, and the acquisition unit acquires the quality information of at least part of the two or more depth images on a basis of the combinations and the correspondence relationship.

15. The reproduction apparatus according to claim 8, further comprising:

a reproduction unit configured to reproduce a given depth image from among the two or more depth images on a basis of the quality information acquired by the acquisition unit, wherein the reproduction unit is implemented via at least one processor.

16. A reproduction method, wherein the method includes:

acquiring, on a basis of a Media Presentation Description (MPD) file in which link information that specifies a plurality of tracks included in a quality file is described and configured by assigning the plurality of tracks to respective plurality of quality information regarding quality of two or more depth images, the quality information of at least part of the two or more depth images, wherein the MPD file includes a plurality of Association-IDs for the respective plurality of tracks as access information, and wherein a respective Association ID of the plurality of Association IDs is information to specify a respective depth image of the two or more depth images associated with a respective quality information of the plurality of quality information corresponding to a respective track of the plurality of tracks.

17. The file generation apparatus according to claim 1, wherein the respective AssociationID is included in a respective sub representation element.

* * * * *